United States Patent
Yashita et al.

[19]

[11] Patent Number: 5,874,817
[45] Date of Patent: Feb. 23, 1999

[54] MOTOR DRIVING CIRCUIT FOR A THREE-PHASE BRUSHLESS MOTOR

[75] Inventors: Takahiro Yashita; Keisuke Kawakita; Hiroyuki Tamagawa, all of Tokyo, Japan

[73] Assignees: Mitsubishi Denki Kabushiki Kaisha; Mitsubishi Electric Engineering Co., Ltd., both of Tokyo, Japan

[21] Appl. No.: 729,504

[22] Filed: Oct. 11, 1996

[30] Foreign Application Priority Data

Apr. 5, 1996 [JP] Japan .................................. 8-084079

[51] Int. Cl.⁶ ...................................................... H02P 7/62
[52] U.S. Cl. ........................... 318/439; 318/138; 318/254; 318/370; 360/74.1; 360/90
[58] Field of Search ..................... 318/138, 139, 318/245, 254, 439, 811, 807, 599; 388/867, 811, 904, 813, 907.5; 360/71, 74.1, 90; 363/41, 98, 37, 56, 147, 132

[56] References Cited

U.S. PATENT DOCUMENTS

| | | | |
|---|---|---|---|
| 4,208,621 | 6/1980 | Hipkins et al. | 318/138 |
| 4,641,066 | 2/1987 | Nagata et al. | 318/254 |
| 4,888,533 | 12/1989 | Gotoh et al. | 318/524 |
| 4,926,099 | 5/1990 | Ricker et al. | 318/254 |
| 5,193,146 | 3/1993 | Kohno | 388/811 |
| 5,264,775 | 11/1993 | Namuduri et al. | 318/811 |
| 5,412,558 | 5/1995 | Sakurai et al. | 363/98 |
| 5,426,355 | 6/1995 | Zweighaft | 318/364 |
| 5,602,452 | 2/1997 | Underhill | 318/439 |
| 5,717,298 | 2/1998 | Tang et al. | 318/254 |

FOREIGN PATENT DOCUMENTS 7184391   7/1995   Japan .

*Primary Examiner*—Paul Ip
*Attorney, Agent, or Firm*—Leydig, Voit & Mayer, Ltd.

[57] ABSTRACT

A switching signal generator outputs a switching signal which indicates either an accelerating mode or a decelerating mode by comparing a motor control signal and reference voltage. A first activation signal generator and a second activation signal generator output a first activation signal and a second activation signal, respectively, according to the switching signal from the switching signal generator. A switching control signal generator outputs either a switching control signal based on a motor location signal or a desired electric potential according to the switching signal from switching signal generator, a first activation signal from the first activation signal generator and a motor location signal. When a power-supply side controller and an earth side controller are in a decelerating mode, power-supply side first, second, and third output transistors are non-conductive and first second and third earth side output transistors are conductive by supplying a base current based on a predetermined electric potential from the switching control signal generator.

18 Claims, 47 Drawing Sheets

[CASE5]

BRAKING EXPIRE (REVERSE : MINIMUM ROTATION)

$Rs*IL + \underline{VCE2\ (Vsat)} + Ra*IL - VBEMF \leq -Vd$

VBEMF = MIN, IL : MIN (in BRAKE)

$Pd = IL * VCE2 + IL*Vd + Io*VCE6\ (VCC - IL* Rs - 1VBE)$

[CASE5]
BRAKING EXPIRE (REVERSE : MINIMUM ROTATION)
Rs*IL + VCE2 + Ra*IL - VBEMF ≦ -Vd
VBEMF = MIN, IL : MIN (in BRAKE)

Pd = IL* VCE2 + IL*Vd + Io*VCE6 (VCC - IL* Rs - 1VBE)

| MCU out | H | | L | |
|---|---|---|---|---|
| AMP 18 OUT | H | L | H | L |
| SW22 | off | on | on | on |
| SW23 | OPEN | SHORT | SHORT | SHORT |
| MODE | REVERSE | FORWARD | REVERSE | FORWARD |

FIG. 17B

| BRAKE MODE | | | |
|---|---|---|---|
| out a \ out b | H | H | L |
| H | | ALL SHORT | COM SHORT |
| L | | — | REVERSE |

FIG. 17C

| MCU out | H | | L | |
|---|---|---|---|---|
| | H | L | H | L |
| AMP 18 OUT | off | on | on | on |
| SW22 | OPEN | SHORT | OPEN | SHORT |
| SW23 | | | | |

| MODE | REVERSE | FORWARD | REVERSE | FORWARD |
|---|---|---|---|---|

FIG. 20B

| MCU out | | |
|---|---|---|
| | H | L |
| BRAKE MODE | ALL SHORT | COM SHORT |

FIG. 20C

| MCU out | H | | L | |
|---|---|---|---|---|
| AMP 18 OUT | H | L | H | L |
| SW23 | OPEN | SHORT | SHORT | SHORT |

| MODE | REVERSE | FORWARD | REVERSE | FORWARD |
|---|---|---|---|---|

FIG. 22B

| MCU out | H | L |
|---|---|---|
| BRAKE MODE | COM SHORT | REVERSE |

| VO out | H | | L | |
|---|---|---|---|---|
| AMP 18 OUT | H | H | H | L |
| SW22 | off | on | on | on |
| SW23 | OPEN | SHORT | SHORT | SHORT |
| MODE | REVERSE | FORWARD | REVERSE | FORWARD |

FIG. 24C

| VO MATRIX | | | |
|---|---|---|---|
| c | H | M | L |
| a | H | L | L |
| b | H | H | L |
| BRAKE | ALL SHORT | COM SHORT | REVERSE |

| AMP 25 OUT | H | | L | |
|---|---|---|---|---|
| AMP 18 OUT | H | L | H | L |
| SW22 | on | on | off | on |
| SW23 | SHORT | SHORT | OPEN | SHORT |

| MODE | REVERSE | FORWARD | REVERSE | FORWARD |

FIG. 26B

| AMP 25 OUT | H | L |
|---|---|---|
| BRAKE MODE | REVERSE | ALL SHORT |

FIG. 26C

| AMP 25 OUT | H | | L | |
|---|---|---|---|---|
| AMP 18 OUT | H | L | H | L |
| SW22 | on | on | off | on |
| SW23 | SHORT | SHORT | OPEN | SHORT |

| MODE | REVERSE | FORWARD | REVERSE | FORWARD |
|---|---|---|---|---|

FIG. 28B

| AMP 25 OUT | | H | L |
|---|---|---|---|
| BRAKE MODE | | REVERSE | COM SHORT |

FIG. 28C

LIMIT CURRENT VALUE

MOTOR POWER SUPPLY VOLTAGE

[CASE3] VBEMF REDUCE →
BRAKE START (REVERSE)
Rs*IL + VCE2 + Ra*IL - VBEMF ≦ -Vd
IL: LIMIT

Pd = IL* VCE2 + IL*Vd + Io*VCE6 (VCC - IL* Rs - 1VBE)

[CASE5]
BRAKE EXPIRE (REVERSE : MINIMUM ROTATION)
VBEMF = MIN
IL : LIMIT

Pd = IL* VCE2 + IL* VCE3 + Io*VCE6 (VCC - IL* Rs - 1VBE)

[CASE6]
FORWARD RE-START
VBEMF = MIN
IL: LIMIT $Pd = IL*VCE1 + IL*VCE4 + Io*VCE5$

MOTOR DRIVING CIRCUIT FOR A THREE-PHASE BRUSHLESS MOTOR

BACKGROUND OF THE INVENTION

1. Field of the Invention

The invention relates to a brushless motor for rotating a recording medium such as CD-ROM, DVD, and DVD-ROM to which data is written at a constant line density so that a constant amount of data is written and read per unit time. More particularly, it relates to a driving circuit for a three-phase brushless motor.

2. Description of the Prior Art

FIG. 30 shows a configuration of a generally known reproducing equipment having an optical disc such as CD-ROM as a recording medium, whose main circuit is integrated into a semiconductor integrated circuit apparatus.

In FIG. 30, a CD-ROM loader 100 comprises a driving system as well as a reading system which are used mainly for reading data stored in the above-mentioned recording medium, such as a spindle motor for rotating a recording medium to which data is stored at a constant line density, a location detector comprising a Hall effect sensor and so on for detecting a rotating location of this spindle motor, a light pick-up for reading out data stored in the recording medium, and a light pick-up driving system for driving this light pick-up along the recording medium.

A motor driving circuit 200 drives and controls the spindle motor in the above-mentioned CD-ROM. The motor driving circuit 200 to which the present invention relates is described in detail below. A DSP 300 comprises a control signal generator for giving a motor control signal (EC) and reference voltage (ECR) to this motor driving circuit. An actuator driving circuit 400 drives and controls the light pick-up driving system in the CD-ROM loader. A controller 600 comprises a microprocessor for giving various kinds of control signals to the motor driving circuit 200, the DSP 300 and the actuator driving circuit 400.

In the data reproducing equipment constructed as mentioned above, the rotating speed of a disk body (recording medium) is controlled so that data (stored information) is written at a constant line density on the disk track of the recording medium and a constant amount (constant line speed) of data is read out per unit time when the data written in the recording medium is reproduced.

In other words, in order to take out a data written on a certain track of the recording medium, the rotating speed of the recording medium is required to be controlled in accordance with the location of the track where the data is stored.

The recording medium is rotated by a small DC motor, namely, a spindle motor. With regard to a structure, the spindle motor is roughly classified into the following two types according to the difference in the reproducing equipment in which the spindle motor is installed. One of the types is a single phase brush motor whose motor rotating speed varies in the range of approximately 200~500 rpm, which is often installed in a reproducing equipment having a relatively lower speed range for controlling a rotating speed. The other is a three-phase brushless motor which is often installed in a reproducing equipment such as a CD-ROM where data is processed in a high speed and the motor rotating speed is controlled in a relatively faster speed range. FIG. 31 shows a relationship between the track location of the recording medium and the rotating speed in an eight-times speed CD-ROM reproducing equipment, for example, in which the three-phase brushless motor is used.

Referring to FIG. 32, the following explains on a motor driving circuit, in case that a three-phase brushless motor is used as a spindle motor for rotating a recording medium such as CD-ROM where recording is done at a constant line speed.

In FIG. 32, a three-phase brushless motor main body 11 (spindle motor main body) rotates a recording medium (not illustrated) where recording is done at a constant line density according to the relationship between the track location and the rotating speed, as shown in FIG. 31, for example. The three-phase brushless motor comprises motor coils of U phase, V phase and W phase.

Location detection Hall effect sensors 12~14 are provided for the U phase, V phase and W phase, corresponding to the motor coils of these U phase, V phase and W phase in the three-phase brushless motor main body 11. A power supply 15 is provided for driving the motor.

A power supply electric potential node Vcc and an earth electric potential node GND are connected to the power supply 15. These Vcc and GND are power-supply terminals connected to a semiconductor integrated circuit apparatus comprising the motor driving circuit 200. A motor control signal (EC) from the DSP 300 and reference voltage (ECR) are inputted respectively into a control signal input node EC and an reference electric potential node ECR in a semiconductor integrated circuit apparatus comprising the motor driving circuit 200, respectively.

Location detection signal input nodes Hu+, Hu− of the U phase, Hv+, Hv− of V phase and Hw+, Hw− of W phase are connected to the location detection Hall effect sensors 12~14 of the corresponding phases of the semiconductor integrated circuit apparatus which is comprising the motor driving circuit 200. Output nodes U, V and W supply currents from the semiconductor integrated circuit apparatus comprising the motor driving circuit 200 to the motor coils of the respective U, V and W phases of the three-phase brushless motor main body 11.

Power-supply side output power transistors 1~3 are connected between the power supply electric potential node Vcc and the corresponding one of the output nodes U, V, and W in correspondence to respective U, V and W phases. In this case, respective power-supply side output power transistors consist of NPN bipolar transistors whose collector electrodes are connected to the power supply electric potential node Vcc, whose respective emitter electrodes are connected to the corresponding output nodes U, V and W.

Respective ground side output power transistors 4~6 are connected between the corresponding output nodes U, V, and W and a common node in correspondence to respective U, V and W phases. In this case, respective earth side output power transistors consist of NPN bipolar transistors whose collector electrodes are connected to the corresponding output nodes U, V and W, whose emitter electrodes are connected to the common node.

Parasitic diodes 7~9 appear between the earth electric potential node and respective output nodes U, V and W, when a motor output decreases to less than earth electric potential in case of applying a reverse torque to the spindle motor and so on (for example, in case of motor braking). The parasitic diodes are formed by the earth side output power transistors 4~6, namely, by PN junction of a semiconductor substrate (generally at the earth electric potential) where these transistors 4~6 are defined and the collector regions of these transistors 4~6.

A detection resistor 10 detects current flowing in the motor coils of the spindle motor main body 11. The detection resistor 10 is connected between a common node to which the earth side output power transistors 4~6 are connected and the above-mentioned earth electric potential node.

An absolute value circuit 16, whose pair of input nodes are connected to the reference electric potential node ECR and the control signal input node EC, calculates the difference between the control signal (EC) inputted to the control signal input node EC and the reference voltage (ECR) inputted to the reference voltage node ECR, for outputting an absolute value of the arithmetic result, |EC–ECR|.

An output current controller 17 comprises an amplifier which receives an output signal from the absolute value circuit 16 for providing current multiplied by a predetermined gain of the received output with both the power-supply side output power transistors 1~3 and the earth side output power transistors 4~6. The output current controller 17 consists of a comparator. An inverting input terminal (−) of the comparator is connected to the common node to which the emitters of the respective earth side output power transistors 4~6 are connected. A non-inverting input terminal (+) of the comparator is connected to the output terminal of the absolute value circuit 16. The comparator outputs a first output, which is a differential voltage between the electric potential inputted to the non-inverted input terminal (+) and the electric potential inputted to the inverted input terminal (−), to the first output terminal. The comparator outputs a second output which is an inverted first output to the second output terminal.

A switching signal generator 18 consists of a comparator and outputs a switching signal which is made in accordance with a difference between the motor control signal (EC) inputted to the control signal input node EC and the reference voltage (ECR) inputted to the reference electric potential node ECR. A non-inverted input terminal (+) of the comparator is connected to the control signal input node EC, and an inverted input terminal (−) of the comparator is connected to the reference electric potential node ECR. When the potential of the motor control signal (EC) is lower than the reference voltage (ECR), the comparator outputs "L" level switching signal which shows an accelerating mode. When the potential of the motor control signal (EC) is higher than the reference voltage (ECR), the comparator outputs "H" level switching signal which shows a decelerating mode.

A switching control signal generator 19 outputs a switching signal for deciding a switching state of both the power-supply side and the earth side output power transistors 1~6 in the next timing in accordance with the motor location signal from the location detection Hall effect sensors 12~14 and the switching signal from the switching signal generator 18. The switching control signal generator 19 comprises input nodes connected to the location detection signal input nodes Hu+, Hu−, Hv+, Hv−, Hw+ and Hw−, and three output nodes corresponding to respective U, V and W phases.

A power-supply side controller 20 comprises a pre-driver circuit. The pre-driver circuit receives a switching control signal from the switching signal generator 19 and the first output current from the output current controller 17. According to a switching state decided according to the received switching signal, the pre-driver circuit supplies a current, which is multiplied with the first output current and the received predetermined gain, to the power-supply side output transistors 1~3 as a base current.

A power-supply side controller 21 comprises a pre-driver circuit. The pre-driver circuit receives a switching control signal from the switching signal generator 19 and the second output current from the output current controller 17. According to a switching state decided according to the received switching signal, the pre-driver circuit supplies a current, which is multiplied with the second output current and a predetermined gain, to the earth side output transistors 4~6 as a base current.

Referring to FIGS. 33(*a*)–33(*c*) and FIG. 34, the operation of the motor driving circuit constructed as mentioned above is explained below. FIG. 33(*a*), FIG. 33(*b*), and FIG. 33(*c*), respectively; show relationships among the motor rotating speed (disc rotating speed), coil current of the motor, and output voltage of the motor, when a recording medium such as the CD-ROM of FIG. 33(*a*) is driven. FIG. 34 is a timing chart showing the motor control signal WC) and the reference voltage (ECR) when the state is changed from an accelerating mode to a decelerating mode, the motor location signals (hole sensor signal) from the location detection hole sensors 12~14, the switching state of both the power-supply side and the earth side output power transistors 1~6, and the coil current of the motor.

Referring to FIGS. 33(*a*)–33(*d*), an operation of the motor driving circuit is outlined as follows. In FIG. 33(*a*), section A is a section in which a light pick-up on each track on the recording medium reads out or writes data by one by one, which section is abbreviated to a read-out period. Section B is a section in which the light pick-up moves from a track at the outer circumference to another track at an inner circumference by skipping the tracks therebetween (abbreviated to an accelerating moving period). The section A and the section B are referred to as accelerating moving periods or decelerating mode periods. Section C is a section in which the light pick-up moves from a track at the inner circumference to the track at an outer circumference by skipping the tracks therebetween. Section C is abbreviated to a decelerating moving period or a decelerating mode period.

Section A

In this section A, the motor control signal (EC) inputted to the control signal input node EC is at "L" level, as shown in the accelerating mode in FIG. 34. During the section A, a switching signal is therefore given from the switching signal generator 18 to the switching control signal generator 19 so that the current flows in the direction to generate a forward direction torque (forward torque) to the motor coils of the spindle motor main body 11.

The location detection Hall effect sensors 12~14 give electric potential to the location detection signal input nodes Hu−, Hv+, Hv−, Hw+ and Hw− so that the electric potential between Hu+ and Hu−([Hu+]−[Hu−]), the electric potential between Hv+ and Hv−([Hv+]−[Hv−]) and the electric potential between Hw+ and Hw−([Hw+]−[Hw−]) show switching state signals for the respective U, V and W phases, which are shown as approximate sign curves whose phase are shifted by 120 degrees to each other, as shown in FIG. 34.

Accordingly, receiving a switching signal from the switching signal generator 18 and a switching state signals given to the location detection signal input nodes Hu−, Hv+, Hv−, Hw+ and Hw−, the switching control signal generator 19 gives a switching control signal which generates a forward torque in the motor to both the power-supply side controller 20 and the earth side controller 21.

In accordance with the current value according to the first and the second outputs form the output current controller 17, the power-supply side controller 20 and the earth side controller 21 give respective base currents corresponding to the received switching control signals to the respective power-supply side and the earth side output power transistors 1~6.

Accordingly, the power-supply side and the earth side output power transistors 1~6 are on/off controlled as shown in FIG. 34.

As a result, the current flows from the power supply 15 to the electric potential node GND, via the power supply electric potential node Vcc, either one of the power-supply side output power transistors 1~3, either one of the output nodes U, V, W, the motor coils of the spindle motor main body 11, either one of the output nodes U, V, W, either one of the earth side output power transistors 4~6 and the detection resistor 10 according to the on/off of respective output power transistors 1~6 of the power-supply side and the earth side. That is, the coil current of the motor flows as the currents Iu, Iv, Iw as shown in FIG. 34, which generate forward torques and the motor rotates in the forward direction.

Since this section A is a read-out period, the light pick-up moves toward an inner track one by one. As shown in FIG. 33($b$), the rotating speed of the motor is gradually raised according to the location detection signal from the location detection Hall effect sensors 12~14.

However, as shown in FIG. 33($d$), the output voltage of the motor does not increase significantly due to a slow motor rotating speed. In other words, a large ratio of voltage is applied to the motor driving circuit. However, since the load of the motor is very small, currents flowing in the coils of the motor are also very small as shown in FIG. 33($e$). In other words, the power consumption of the motor driving circuit is relatively small.

Section B

Since this section B is also the accelerating moving period as well as the section A, the motor driving circuit is driven so that a forward torque is generated in the motor. In other words, according to the location detection signal from the location detection Hall effect sensors 12~14, the coil currents Iu, Iv, Iw of the motor flow in the directions as shown in FIG. 34 from the power supply 15 to the electric potential node GND, via the power supply electric potential node Vcc, either one of the power-supply side output power transistors 1~3, either one of the output nodes U, V, W, the motor coils of the spindle motor main body 11, either one of the output nodes U, V, W, either one of the earth side output power transistors 4~6 and the detection resistor 10. Receiving a forward torque, the motor rotates in the forward direction.

However, since this section B is the accelerating moving period, the rotating speed of the motor is raised, compared to that in the section A. As shown in FIG. 33($d$), the output voltage of the motor is increased and a small ratio of voltage is applied to the motor driving circuit. However, since the load of the motor is large, currents flowing in the coils of the motor are relatively large as shown in FIG. 33($e$). Accordingly, the power consumption of the motor driving circuit becomes larger than that in the section A.

Section C

The section C is the decelerating moving period. As shown in the decelerating mode in FIG. 34, the motor control signal (EC) inputted to the control signal input node EC changes to "H" level. Then, a switching signal is applied from the switching signal generator 18 to the signal switching control signal generator 19 so that the currents flow in the direction to generate a reverse torque in the motor coils of the spindle motor main flame 11.

The location detection Hall effect sensors 12~14 give electric potential to the location detection signal input nodes Hu−, Hv+, Hv−, Hw+ and Hw− so that the electric potential between Hu+ and Hu−([Hu+]−[Hu−]), the electric potential between Hv+ and Hv−([Hv+]−[Hv−]) and the electric potential between Hw+ and Hw−([Hw+]−[Hw−]) show switching state signals for the respective U, V and W phases, which are shown as approximate sign curves whose phase are shifted by 120 degrees to each other, as shown in FIG. 34.

Accordingly, receiving a switching signal from the switching signal generator 18 and a switching state signals given to the location detection signal input nodes Hu−, Hv+, Hv−, Hw+ and Hw−, the switching control signal generator 19 gives a switching control signal which generates a forward torque in the motor to both the power-supply side controller 20 and the earth side controller 21.

In accordance with the current value according to the first and the second outputs form the output current controller 17, the power-supply side controller 20 and the earth side controller 21 give respective base currents corresponding to the received switching control signals to the respective power-supply side and the earth side output power transistors 1~6.

Accordingly, the power-supply side and the earth side output power transistors 1~6 are on/off controlled as shown in FIG. 34.

As a result, the current flows from the power supply 15 to the electric potential node GND, via the power supply electric potential node Vcc, either one of the power-supply side output power transistors 1~3, either one of the output nodes U, V, W, the motor coils of the spindle motor main body 11, either one of the output nodes U, V, W, either one of the earth side output power transistors 4~6 and the detection resistor 10 according to the on/off of respective output power transistors 1~6 of the power-supply side and the earth side. That is, the coil current of the motor flows as the currents Iu, Iv, Iw as shown in FIG. 34, which generate reverse torques and the rotating speed of the motor is lowered, namely, decelerated as shown in FIG. 33($b$).

In this section C, the rotating speed of the motor is lowered, the output voltage of the motor is not raised significantly as shown in FIG. 33($d$), and the coil current of the motor flows until it reaches the limit current value of the motor driving circuit.

Accordingly, the power consumption of the motor driving circuit is significantly larger than those in the sections A and B.

Referring to FIG. 34, the switching timing from the accelerating mode to the decelerating mode is explained in detail as follows.

Since the motor control signal (EC) changes from (EC)<(ECR) to (EC)>(ECR) in reference to the reference voltage (ECR), the mode changes from the accelerating mode to a decelerating mode. At this time, the power-supply side and the earth side output power transistors 1~6 are on/off controlled according to the switching signal from the switching signal generator 18 so that the output power transistors 1~6 are switched in a reverse sequential order than before, by means of the signal generator 19, the power-supply side controller 20 and the earth side controller 21, as shown in FIG. 34

Accordingly, the motor coil currents Iu, Iv, Iw flow reversely than before, as shown in FIG. 34. In other words, this generates a reverse torque in the motor, which gives braking on the motor and decelerates the motor.

The current flow around the output stage of the motor and the motor driving circuit, during entering the acceleration mode and changing to the decelerating mode, and again entering the accelerating mode after the motor is started, is explained below using FIG. 35~FIG. 41. To make the explanation simple, the following explanation focuses on the current flow between arbitrarily chosen two outputs in the motor, namely, between the output nodes U–V, for example.

When the motor is started (accelerating mode), the motor control signal (EC) becomes lower than the reference voltage (ECR), as shown in FIG. 41. The respective power-supply side and the earth side output power transistors 1~6 are on/off controlled so that a forward torque is generated in the motor.

It is assumed now that the power-supply side output power transistor 1 and the earth side output power transistor 5 are on, and the rest of the transistors are off.

As shown in FIG. 35 [CASE 1], the motor coil current IL flows from the power supply 15 to the earth electric potential node GND via the power supply electric potential node Vcc, the power-supply side output power transistor 1, the output node U, the motor coils of the spindle motor main body 11, the output node V, the earth side output power transistor 5, and the detection resistor 10.

At the start of the motor, the back electromotive voltage (VBEMF) induced in the coils of the motor is zero.

However as shown in FIG. 41, the back electromotive voltage (VBEMF) induced in the coils of the motor is raised as the motor rotating speed increases. At the maximum point of the motor rotating speed (4000 rpm in case of an eight-times speed CD-ROM, the back electromotive voltage (VBEMF) also reaches the maximum.

The current flowing in the coils of the motor at this moment is shown in FIG. 36 [CASE 2]. The current IL flows via the same current path as shown in FIG. 35.

FIG. 37 and FIG. 38 show two stages of the decelerating mode. As shown in FIG. 41, since the motor control signal (EC) is higher than the reference voltage (ECR), the respective power-supply side and the earth side output power transistors 1~6 are on/off controlled so that a reverse torque is generated in the motor.

The following equation (1) is satisfied immediately after the mode is switched to the decelerating mode. The power-supply side output power transistor 2 and the earth side output power transistor 4 are controlled so that they turn on and the rest of the transistors turn off.

$$Rs \times IL + VCE2 + Ra \times IL - VBEMF < -Vd \quad (1)$$

In a section where the condition of the equation (1) is satisfied, the current IL flows from the coil (resistance value Ra) of motor via the output node U, the earth side output power transistor 4, the detection resistor (resistance value Rs), the parasitic transistor 8, and the output node V, and back to the motor coil again, as shown in FIG. 37 [CASE 3], where the back electromotive force (VBEMF) is getting consumed.

The current IL at this time, takes a predetermined threshold current value (LIMIT decided by the motor driving circuit. Since the current IL is controlled to the limited current value, namely, the constant current state, the VCE 2 of the earth side output power transistor 4 is not saturated. Accordingly, the power consumption by the current IL is large.

As the current flows in this way and the back electromotive force (VBEMF) is consumed, the condition of the following equation (2) is satisfied.

$$Rs \times IL + VCE2 + Ra \times IL - VBEMF > -Vd \quad (2)$$

When the condition of the equation (2) is satisfied, the current path through which current flows via the parasitic diodes 8 is intercepted. The regenerative current of the back electromotive force (VBEMF) flows as shown in FIG. 37 [CASE 4].

In other words, the current IL flows from the power supply 15 via the power-supply electric potential node Vcc, the power-supply side output power transistor 2, the output node V, the coil (resistance value Ra) of the motor, the output node U, the earth side output power transistor 4, the detection resistor (resistance value Rs), and the earth electric potential node GND, and backs to the power supply 15, where the back electromotive force (VBEMF) is getting consumed.

The power-supply side output power transistor 2 is not saturated as same as the [CASE 3] shown in FIG. 37. Besides, since the electric potential of the emitter electrode of the earth side output power transistor 4 connected in parallel with the parasitic diodes 8 is close to the earth electric potential, the inter-collector-emitter voltage VCE 3 of the power-supply side output power transistor 2 takes a value close to the power supply voltage Vcc. Accordingly, the power consumption by the VCE 3 and the current IL reaches a considerably large amount of value as shown in the decelerating mode in FIG. 41.

This state is continued until the motor rotating speed is decelerated to a desired rotating speed. Even if this desired rotating speed reaches the minimum (1600 rpm in case of eight-times speed CD-ROM), this regenerative current IL continues to flow until the deceleration is terminated as that shown in FIG. 39 [CASE 5], as the same path as shown in FIG. 39 [CASE 4]. As a result, a considerable amount of heat is generated in the motor driving circuit.

The above-mentioned brake system is generally called a reverse rotation brake. As shown in FIG. 40 [CASE 6], when the acceleration is started after the termination of the deceleration, the state becomes the same as that shown in FIG. 35 [CASE 1].

However, a large amount of electric power is consumed in the motor driving circuit constructed in this way due to the reverse rotation brake during the decelerating mode, and a considerable amount of heat is generated.

The heat constitutes a problem especially for a package, when this motor driving circuit is integrated into a semiconductor integrated circuit.

FIG. 41 shows a result of power consumption in the motor driving circuit measured under the severest heat condition (full stroke accelerating/decelerating) in case the motor driving circuit is applied to a reproducing equipment comprising an eight-times speed CD-ROM, for example. It is evident from FIG. 41 that the power consumption is considerably large as much as 5~10 (W) in the decelerating period, especially during the section [CASE 4]~[CASE 5] shown in FIG. 38 and FIG. 39, respectively.

The heat generated as a result of this amount of the power consumption constitutes a problem for a package in case the circuit is integrated into a semiconductor integrated circuit.

An object of the present invention is to reduce power consumption in the motor decelerating period, which reduces thermal effect and obtains a suitably integrated driving circuit in the semiconductor integrated circuit, for the driving circuit for driving a spindle motor (brushless motor) to rotate a recording medium when data is recorded or read out thereon at a constant line density.

It is another object of the present invention to provide a motor driving circuit which is able to control current flow during the decelerating period.

It is still another object of the present invention to provide a motor driving circuit to reduce power consumption, which reduces thermal effect and obtains a suitably integrated driving circuit in the semiconductor integrated circuit, without lengthening the seek time and the time necessary for stopping the motor during the decelerating period.

It is still further object of the invention to provide a motor driving circuit suitably made for being integrated into a semiconductor integrated circuit, which is characterized in that power consumption and thermal effect are decreased using a simple circuit configuration.

SUMMARY OF THE INVENTION

According to one aspect of the present invention, a control signal generation circuit is provided in the motor driving circuit, for outputting a control signal, which makes all of power-supply side output transistors non-conductive state and all of earth side output transistors conductive during a deceleration of a brushless motor, to both the power-supply side output transistors and the earth side output transistors both of which constitute an output current generation circuit, when a brushless motor is decelerated.

According to another aspect of the present invention, a control signal generation circuit is provided in the motor driving circuit, for outputting a control signal, which makes all of power-supply side output transistors non-conductive state and the earth side output transistors conductive so that a torque is generated in a direction opposite to that of forward torque in accordance with a location detection signal of a brushless motor, to both the power-supply side output transistors and the earth side output transistors which constitute an output current generation circuit, when the brushless motor is decelerated.

According to further aspect of the present invention, a control signal generation circuit is provided in the motor driving circuit, for outputting either a first control signal or a second control signal to the power-supply side output transistors and the earth side output transistors both of which constitute an output current generation circuit, in accordance with an inputted selection signal, when the brushless motor is decelerated, where the first control signal makes all of power-supply side output transistors non-conductive state and all of earth side output transistors conductive, and the second control signal makes the power-supply side output transistors and the earth side output transistors conductive so that a torque is generated in a direction opposite to that of forward torque in accordance with a location detection signal of a brushless motor.

According to further aspect of the present invention, a control signal generation circuit is provided in the motor driving circuit, for outputting either a first control signal or a second control signal to the power-supply side output transistors and the earth side output transistors both of which constitute an output current generation circuit, in accordance with an inputted selection signal, when the brushless motor is decelerated, where the first control signal makes all of power-supply side output transistors non-conductive state and all of earth side output transistors conductive, the second control signal makes all of power-supply side output transistors non-conductive state and the earth side output transistors conductive so that a torque is generated in a direction opposite to that of forward torque in accordance with a location detection signal of a brushless motor, and the third control signal makes said power-supply side output transistors and said earth side output transistors conductive so that a torque is generated in a direction opposite to that of forward torque in accordance with a location detection signal of a brushless motor.

According to further aspect of the present invention, a control signal generation circuit is provided in the motor driving circuit, for outputting either a first control signal or a second control signal to the power-supply side output transistors and the earth side output transistors both of which constitute an output current generation circuit, in accordance with an inputted selection signal, when the brushless motor is decelerated, where the first control signal makes all of power-supply side output transistors non-conductive state and the earth side output transistors conductive so that a torque is generated in a direction opposite to that of a forward torque in accordance with a location detection signal of a brushless motor, and the second control signal makes said power-supply side output transistors and said earth side output transistors conductive so that a torque is generated in a direction opposite to that of forward torque in accordance with a location detection signal of a brushless motor.

According to further aspect of the present invention, a control signal generation circuit is provided in the motor driving circuit, for outputting either a first control signal or a second control signal to the power-supply side output transistors and the earth side output transistors both of which constitute an output current generation circuit, in accordance with an inputted selection signal, when the brushless motor is decelerated, where the first control signal makes all of power-supply side output transistors non-conductive state and all of earth side output transistors conductive, and the second control signal makes all of power-supply side output transistors non-conductive state and the earth side output transistors conductive so that a torque is generated in a direction opposite to that of forward torque in accordance with a location detection signal of a brushless motor.

DETAILED DESCRIPTION OF PREFERRED EMBODIMENTS

Embodiment 1

Figure 1:
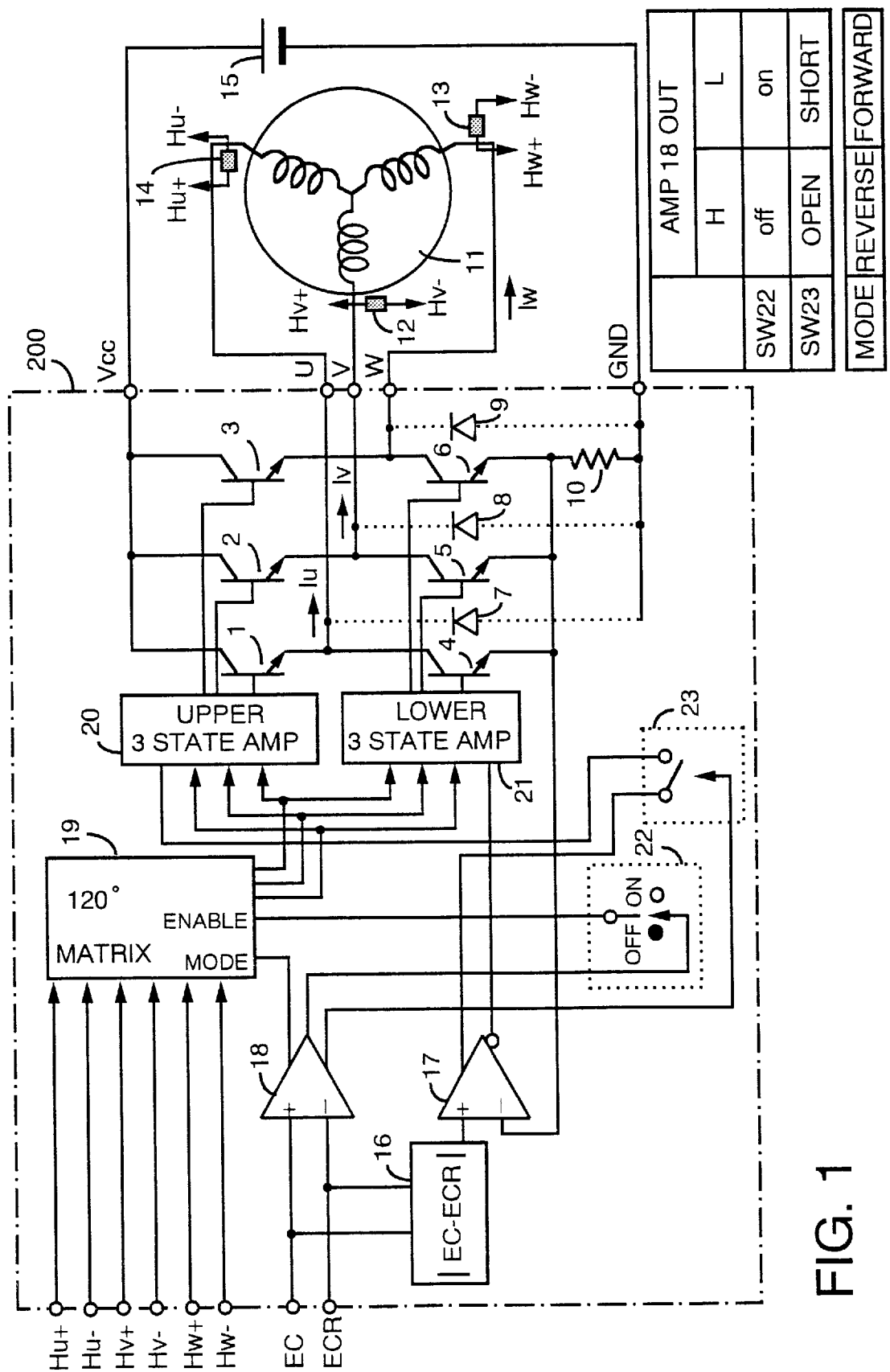
FIG. 1 is a circuit diagram according to a first embodiment of the present invention.
Figure 32:
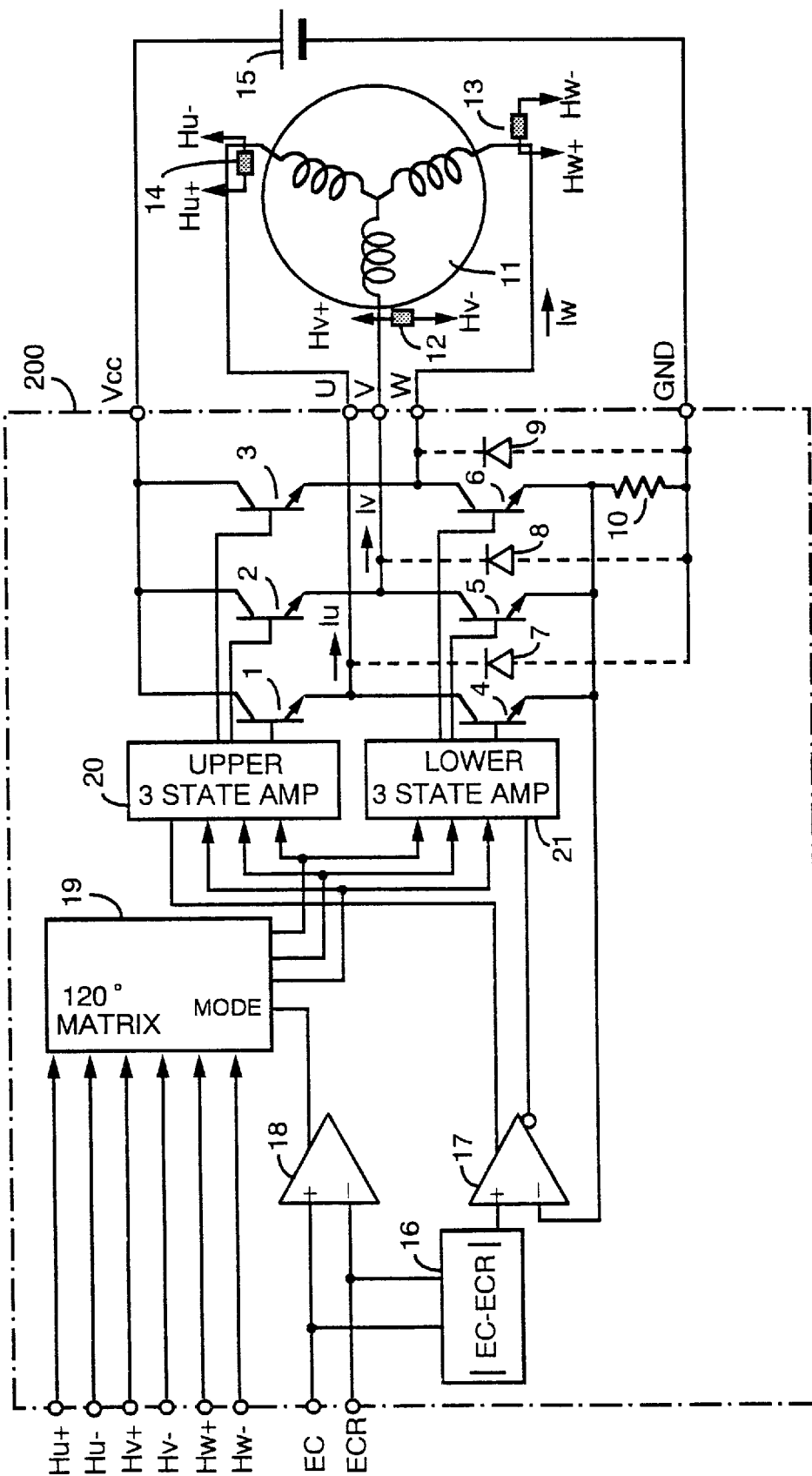
FIG. 32 is a circuit diagram showing a conventional motor driving circuit.
Figure 33A:
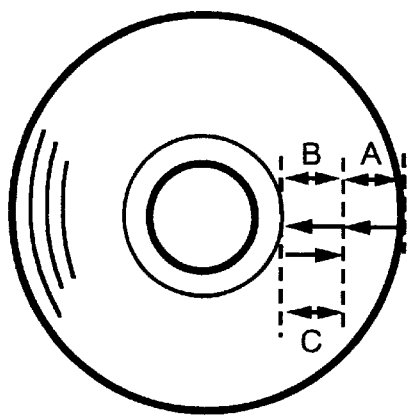
FIGS. 33(a), 33(b), 33(c), and 33(d) show scanning of a CD and relationships among motor rotating speed, motor coil current, and motor output voltage respectively.
Figure 33B:
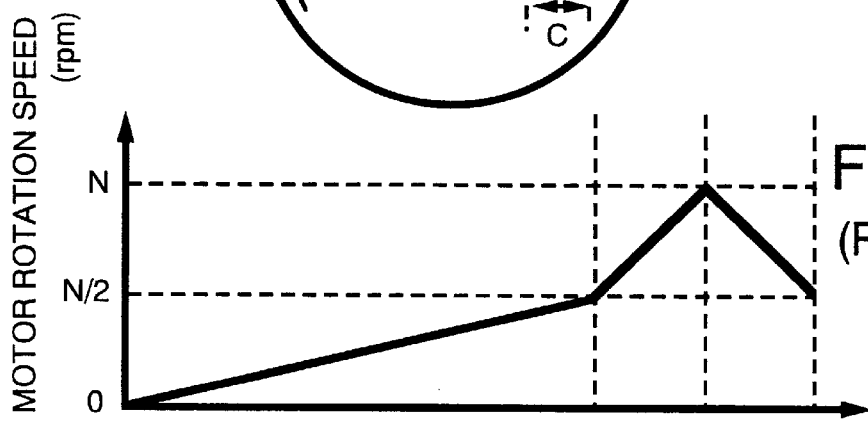
Figure 33C:
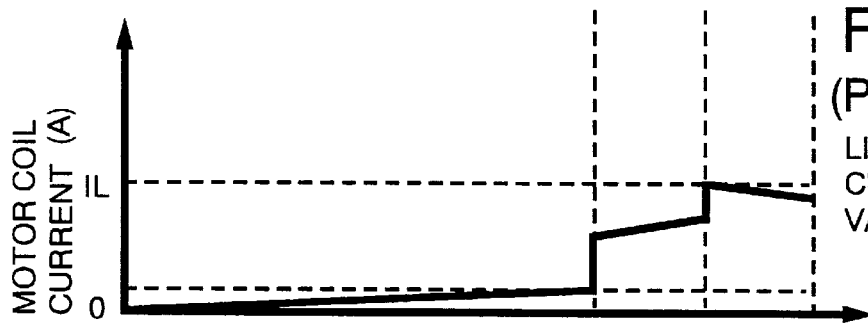
Figure 33D:
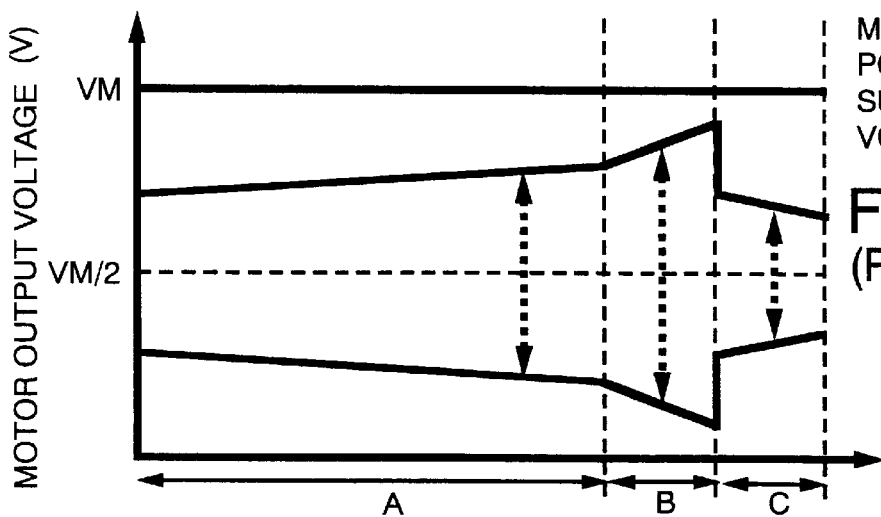
Figure 34:
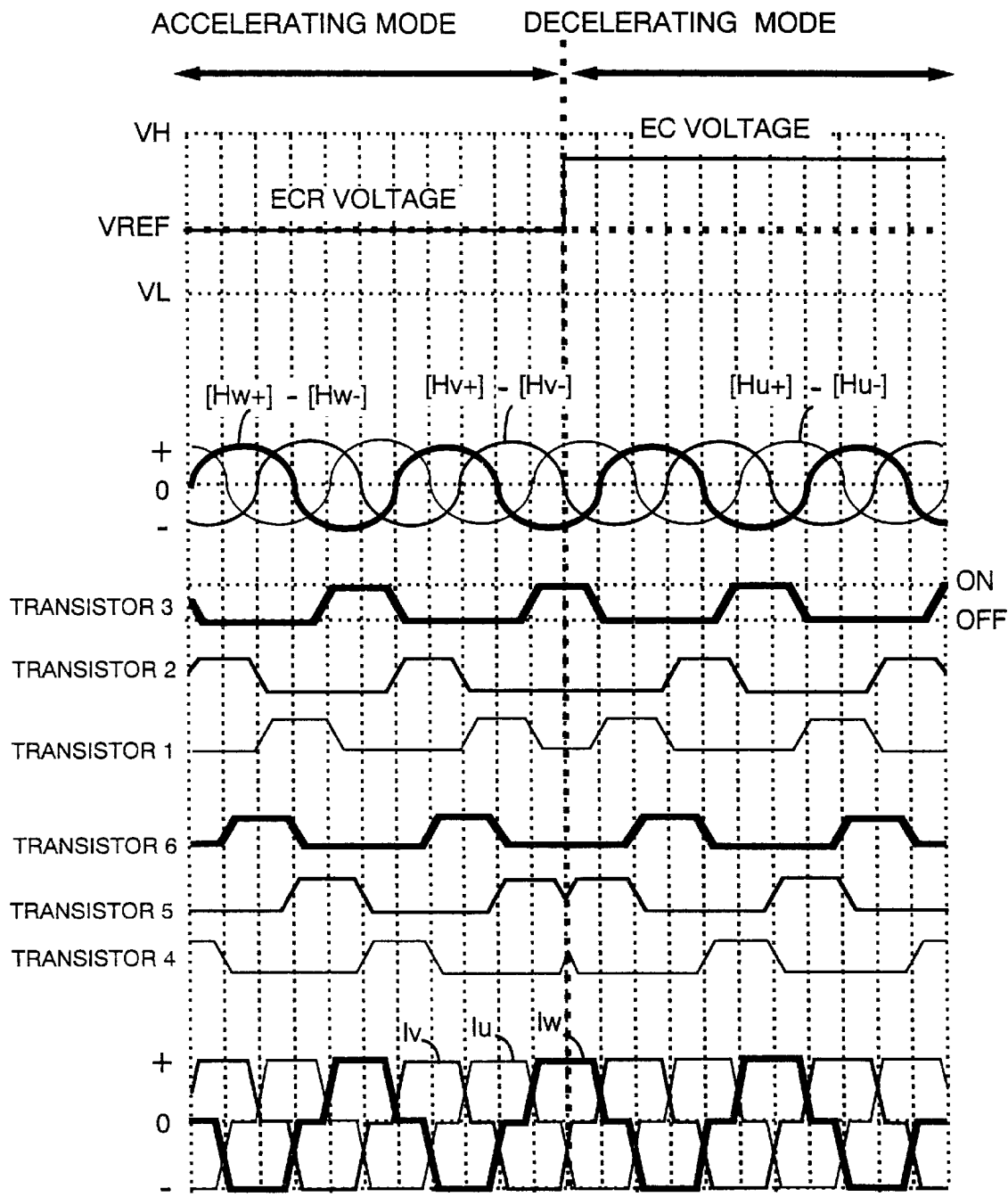
FIG. 34 is a timing chart when changing from the accelerating mode to the decelerating mode according to a prior art.
Figure 35:
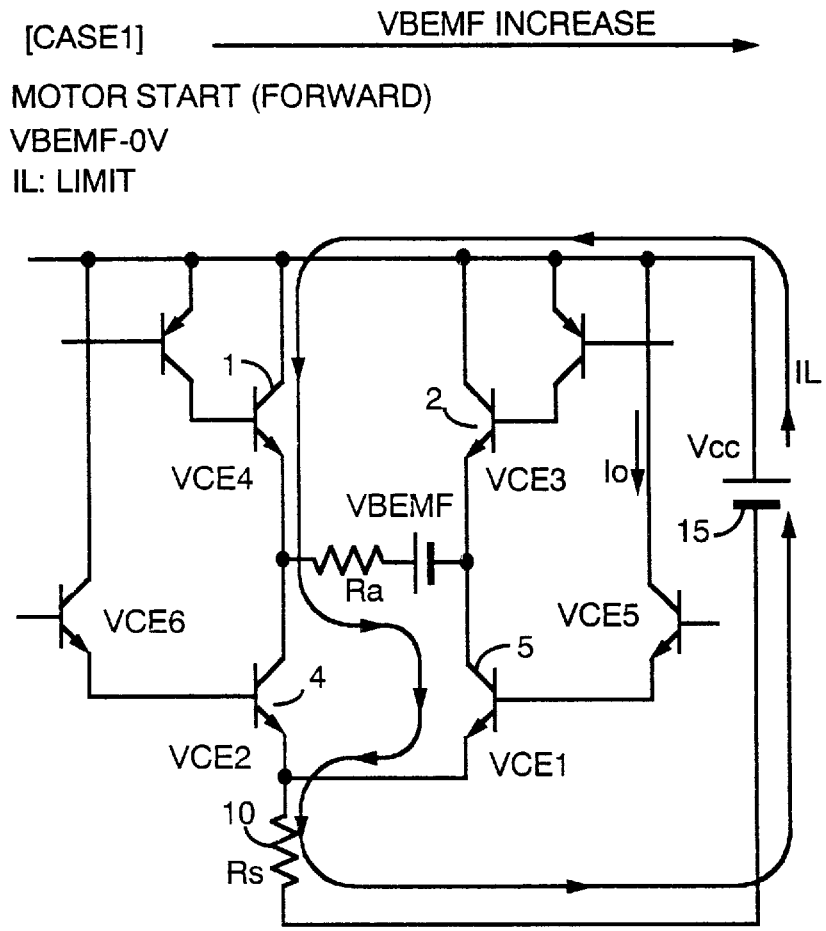
FIG. 35 is a circuit diagram showing a current path by a back electromotive force generated in motor coil according to the prior art.
Figure 36:
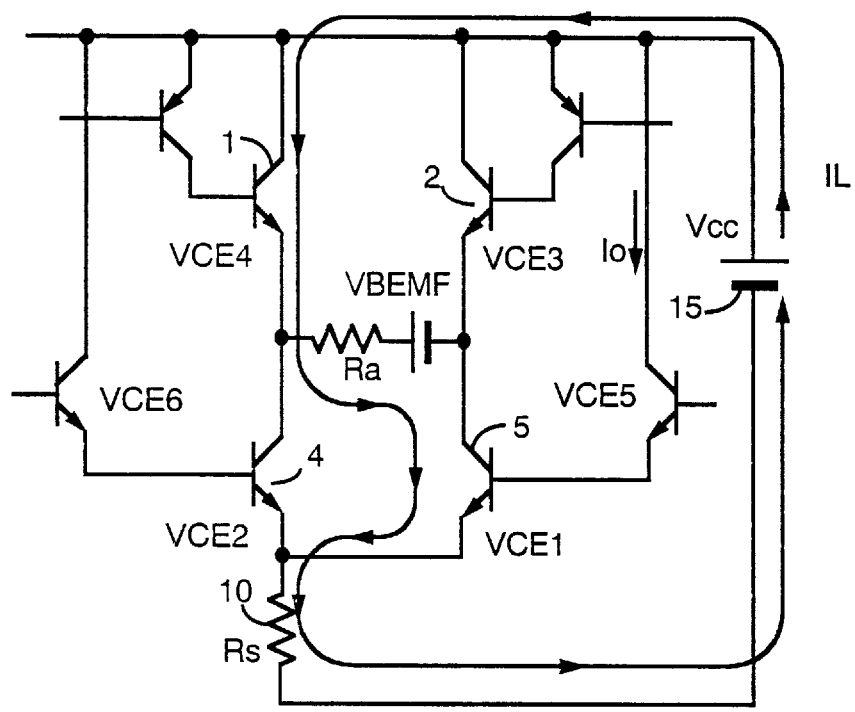
FIG. 36 is a circuit diagram showing another current path by a back electromotive force generated in motor coil according to the prior art.
Figure 37:
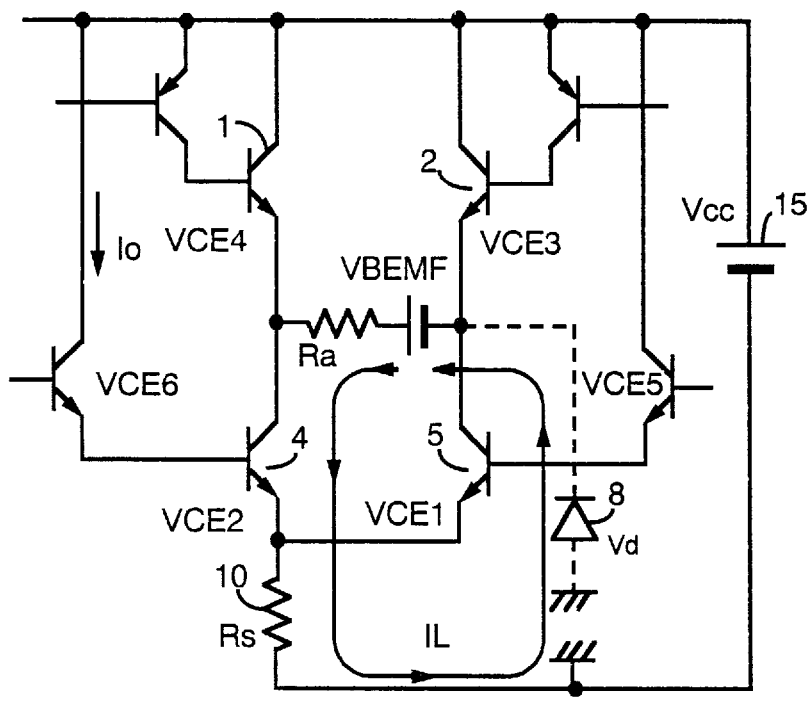
FIG. 37 is a circuit diagram showing other current path by a back electromotive force generated in motor coil according to the prior art.
Figure 38:
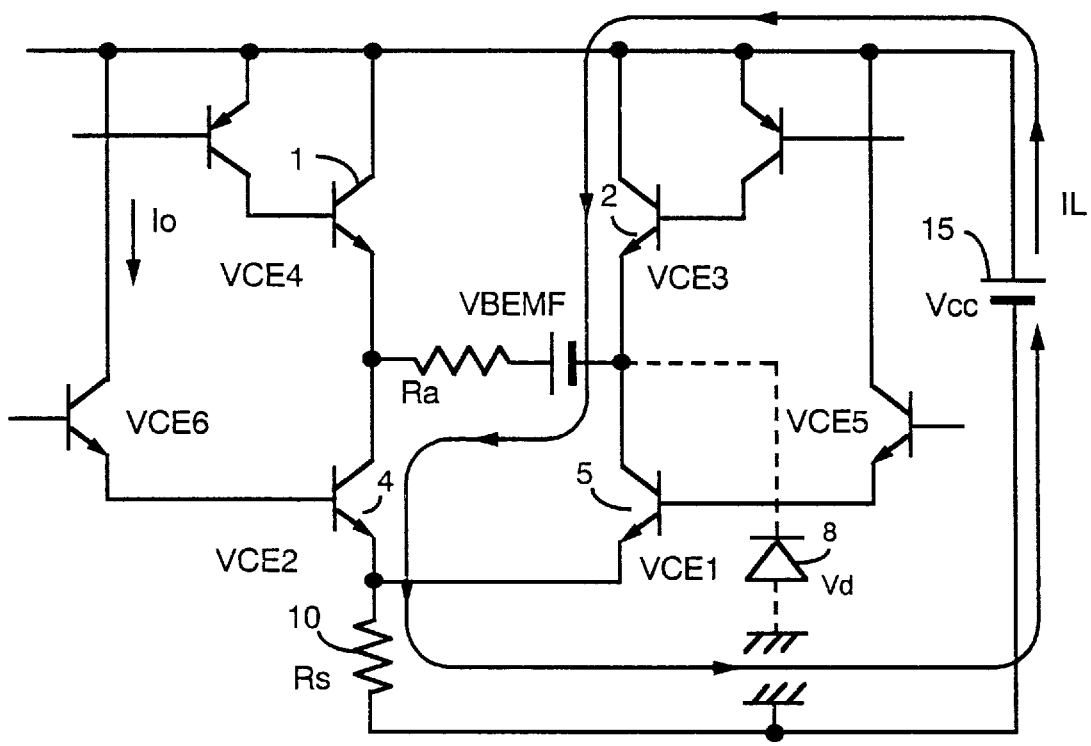
FIG. 38 is a circuit diagram showing other current path by a back electromotive force generated in motor coil according to the prior art.
Figure 39:
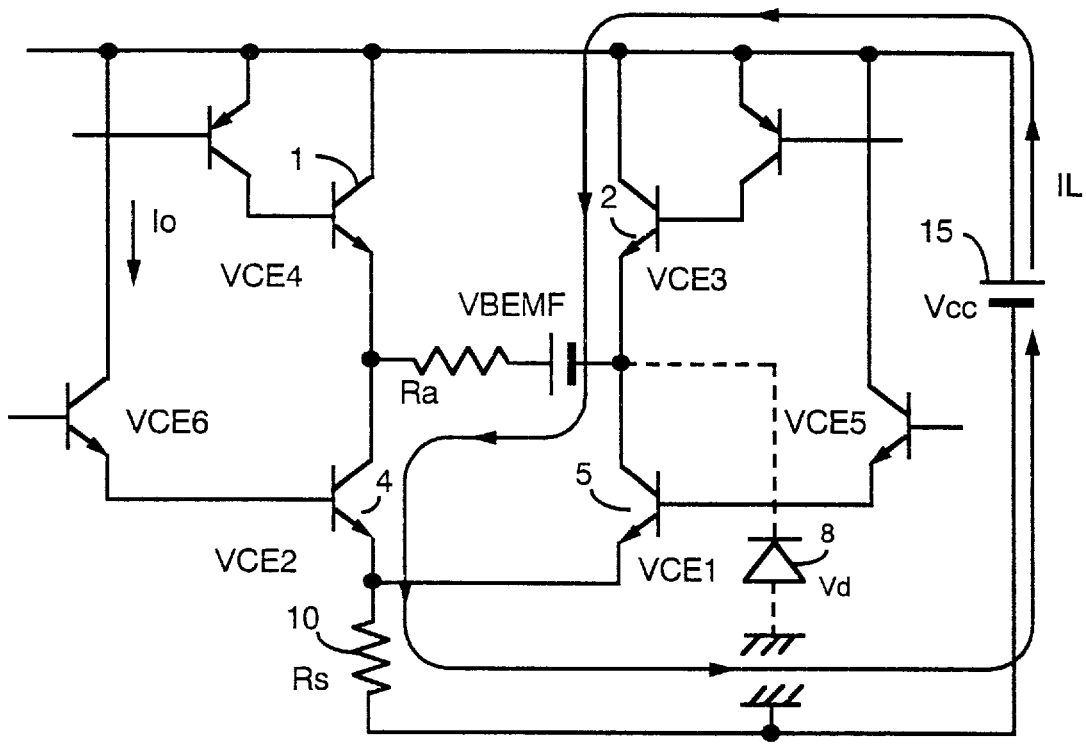
FIG. 39 is a circuit diagram showing other current path by a back electromotive force generated in motor coil according to the prior art.
Figure 40:
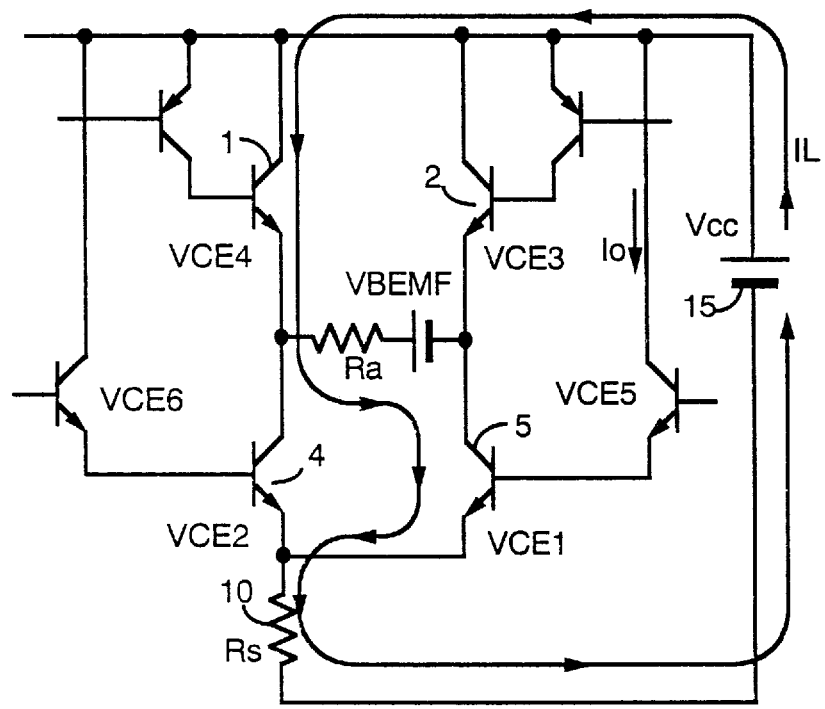
FIG. 40 is a circuit diagram showing other current path by a back electromotive forcegenerated in motor coil according to the prior art.
Figure 41:
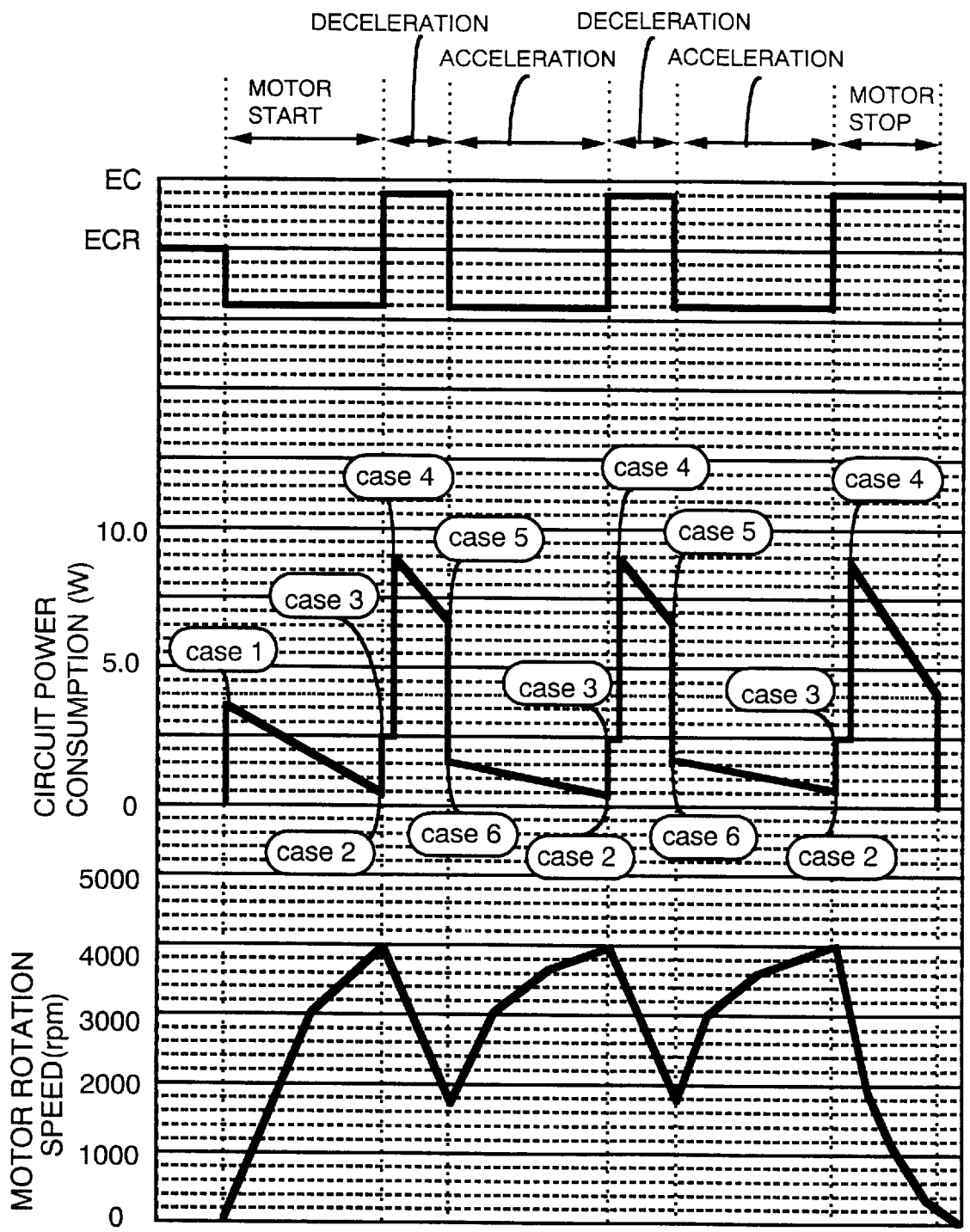
FIG. 41 is a timing chart showing a power consumption in a circuit during full stroke operation according to the prior art.

FIG. 1 is a circuit diagram showing a first embodiment of the present invention. In FIG. 1, the elements having the same reference numbers in FIG. 1 are the same portions or the corresponding portions in FIG. 32. An output current controller 17 comprises an amplifier which receives an output signal from the absolute value circuit 16 for providing current multiplied by a predetermined gain of the received output with both the power-supply side output power transistors 1~3 and the earth side output power transistors 4~6. The output current controller 17 consists of a comparator. An inverted input terminal (−) of the comparator is connected to the common node to which the emitters of the respective earth side output power transistors 4~6 are connected. A non-inverted input terminal (+) of the comparator is connected to the output terminal of the absolute value circuit 16. The comparator outputs a first output, which is a differential voltage between the electric potential inputted to the non-inverted input terminal (+) and the electric potential inputted to the inverted input terminal (−), to the first output terminal. In other words, the current in accordance with the above-mentioned differential voltage is supplied from the first output terminal. The comparator outputs a second output which is an inverted first output to the second output terminal. In other words, the current in accordance with the above-mentioned differential voltage is drawn from the second output terminal.

A switching signal generator 18 consists of a comparator and outputs a switching signal which is generated in accordance with a difference between the motor control signal (EC) inputted to the control signal input node EC and the reference voltage (ECR) inputted to the reference electric potential node ECR. In other words, the switching signal generator outputs a switching signal (or referred to as a mode assignment signal hereinafter) that indicates either the accelerating mode or the decelerating mode by whether or not the motor control signal (EC) is larger than the reference voltage (ECR). A non-inverted input terminal (+) of the comparator is connected to the control signal input node EC, and an inverted input terminal (−) of the comparator is connected to the reference electric potential node ECR. When the potential of the motor control signal (EC) is lower than the reference voltage (ECR), the comparator outputs "L" level switching signal which shows an accelerating mode. When the potential of the motor control signal (EC) is higher than the reference voltage (ECR), the comparator outputs "H" level switching signal which shows a decelerating mode.

A first activation signal generator 22 receives a switching signal from the switching signal generator 18 and outputs a first activation signal. When the switching signal indicates the accelerating mode (when the motor control signal (EC) is lower than the reference voltage (ECR) in this first embodiment), the first activation signal indicates an activated state. When the switching signal indicates the decelerating mode (when the motor control signal (EC) is higher than the reference voltage (ECR) in this first embodiment), the first activation signal indicates a non-activated state. In this first embodiment, the first activation signal generator 22 consists of a switching element comprising bipolar transistors and so on, which operates as follows. When the switching signal indicates the accelerating mode, an "H" level electric potential which indicates an activated state is outputted to an output terminal, by connecting a power supply electric potential node to "on" terminal. On the other hand, when the switching signal indicates the decelerating mode, an "L" level electric potential is outputted to the output terminal, by connecting an earth electric potential node to "off" terminal.

A switching control signal generator 19 receives a motor location signal from the location detection Hall effect sensors 12~14, the switching signal from the switching signal generator 18 and a first activation signal from the first activation signal generator 22. The switching control signal generator 19 is activated when the first activation signal from the first activation signal generator 22 indicates an activated state. The switching control signal generator 19, in this activated state, outputs a switching signal according to the motor location signal, when the switching signal generator 18 indicates the accelerating mode. The switching control signal generator 19 is non-activated when the first activation signal from the first activation signal generator 22 indicates a non-activated state, and outputs a predetermined electric potential regardless of the motor location signal, namely, a predetermined electric potential between the power supply electric potential applied to the power supply electric potential node Vcc and the earth electric potential applied to the earth electric potential node GND in case of the first embodiment. The switching control signal generator 19 comprises input nodes connected to the location detection signal input nodes Hu+, Hu−, Hv+, Hv−, Hw+ and Hw−, and three output nodes corresponding to the respective U, V and W phases.

A second activation signal generator 23 receives a first output signal from the output current controller 17 and a switching signal from the switching signal generator 18 and outputs a second activation signal. When the switching signal indicates an accelerating mode (when the motor control signal (EC) is lower than the reference voltage (ECR) in this first embodiment), the second activation signal indicates an activated state, which supplies a base current in accordance with the first output signal from the output current control means 17. When the switching signal indicates a decelerating mode (when the motor control signal (EC) is higher than the reference voltage (ECR) in this first embodiment), the second activation signal indicates a non-activated state. In this first embodiment, the second activation signal generator 23 consists of a switching element comprising bipolar transistors and so on, which operates as follows. When the switching signal indicates the accelerating mode, the first output signal from the output current controller 17 is supplied to a power-supply side controller 20 as a second activation signal. When the switching signal indicates the decelerating mode, the first output signal from the output current controller 17 is not supplied to the power-supply side controller 20.

A power-supply side controller 20 receives an output signal from the switching control generator 19 and a second activation signal from the second activation signal generator 23. When the second activation signal indicates an activated state, the power-supply side controller 20 supplies a base current based on the second activation signal to the 1st~3rd power-supply side output transistors 1~3, which comprises the output current circuit, according to the switching control signal which is outputted from the switching control generator 19. When the second activation signal indicates a non-activated state, the power-supply side controller 20 makes the base electrodes of the 1st~3rd power-supply side output transistors 1~3, which comprise output current circuit, electrically floating state, in accordance with the second activation signal. In this first embodiment, when the second activation signal from the second activation signal generator 23 indicates an activated state, in other words, when the switching signal from the switching signal generator 18 indicates an accelerating mode, the power-supply side controller 20 supplies current amplified by a predetermined gain to the 1st~3rd power-supply side output transistors 1~3, in accordance with the switching control signal of the switching control signal generator 19. When the second activation signal from the second activation signal generator 23 indicates a non-activated state, in other words, when the switching signal from the switching signal generator 18 indicates a decelerating mode, the power-supply side controller 20 does not supply current to the base electrodes of the 1st~3rd power-supply side output transistors 1~3, and the base electrodes of the 1st~3rd power-supply side output transistors 1~3 become electrically floating state. This power-supply side controller 20 consists of a pre-driver circuit, for example.

An earth side controller 21 receives an output signal from the switching control generator 19 and an output signal from the output current controller 17. According to the output signal from the switching control signal generator 19, the earth side controller 21 supplies base current in accordance with the output signal from the output current controller 17 to the 1st~3rd earth side output transistors 4~6 which comprises the output current circuit. In this first embodiment, the earth side controller 21 is connected to the second output terminal from the output current controller 17 so that current is drawn from the second output terminal. The drawn current is amplified by a predetermined gain and the amplified current is supplied to the bases of the 1st~3rd earth side output transistors 4~6, according to the switching control signal from the switching control signal generator 19. This earth side controller 21 consists of a pre-driver circuit, for example.

The output current controller 17, the second activation signal generator 23 and the power-supply side controller 20 and the earth side controller 21 constitute a base current supply means which receives the output signal from the switching control signal generator 19 and operates as follows. When a mode assignment signal indicates an accelerating mode, the base current supply means supplies a base current based on the switching control signal which is the output signal from the switching control signal generator 19, to both the 1st~3rd power-supply side output transistors 1~3 and the 1st~3rd earth side output transistors 4~6. When a mode assignment signal indicates a decelerating mode, the base current supply means makes the base electrodes of the 1st~3rd power-supply side output transistors 1~3 electrically floating state, that is, non-conductive state, while it supplies a base current based on a predetermined electric potential which is the output signal from the switching control signal generator 19, to the 1st~3rd earth side output transistors 4~6 so that they are in conductive state.

The switching signal generator 18, the first activation signal generator 22, the switching control signal generator 19 and the base current supply means comprise a control signal generation circuit, which receives a motor location signal and a mode assignment signal indicating either the accelerating mode or the decelerating mode, and which operates as follows. When a mode assignment signal indicates an accelerating mode, the control signal generation circuit supplies a base current based on the motor location signal to both the 1st~3rd power-supply side output transistors 1~3 and the 1st~3rd earth side output transistors 4~6. When a mode assignment signal indicates a decelerating mode, the control signal generation circuit, regardless of the received motor location signal, makes the 1st~3rd power-supply side output transistors 1~3 non-conductive state, while it makes the 1st~3rd earth side output transistors 4~6 conductive state.

Figure 2:
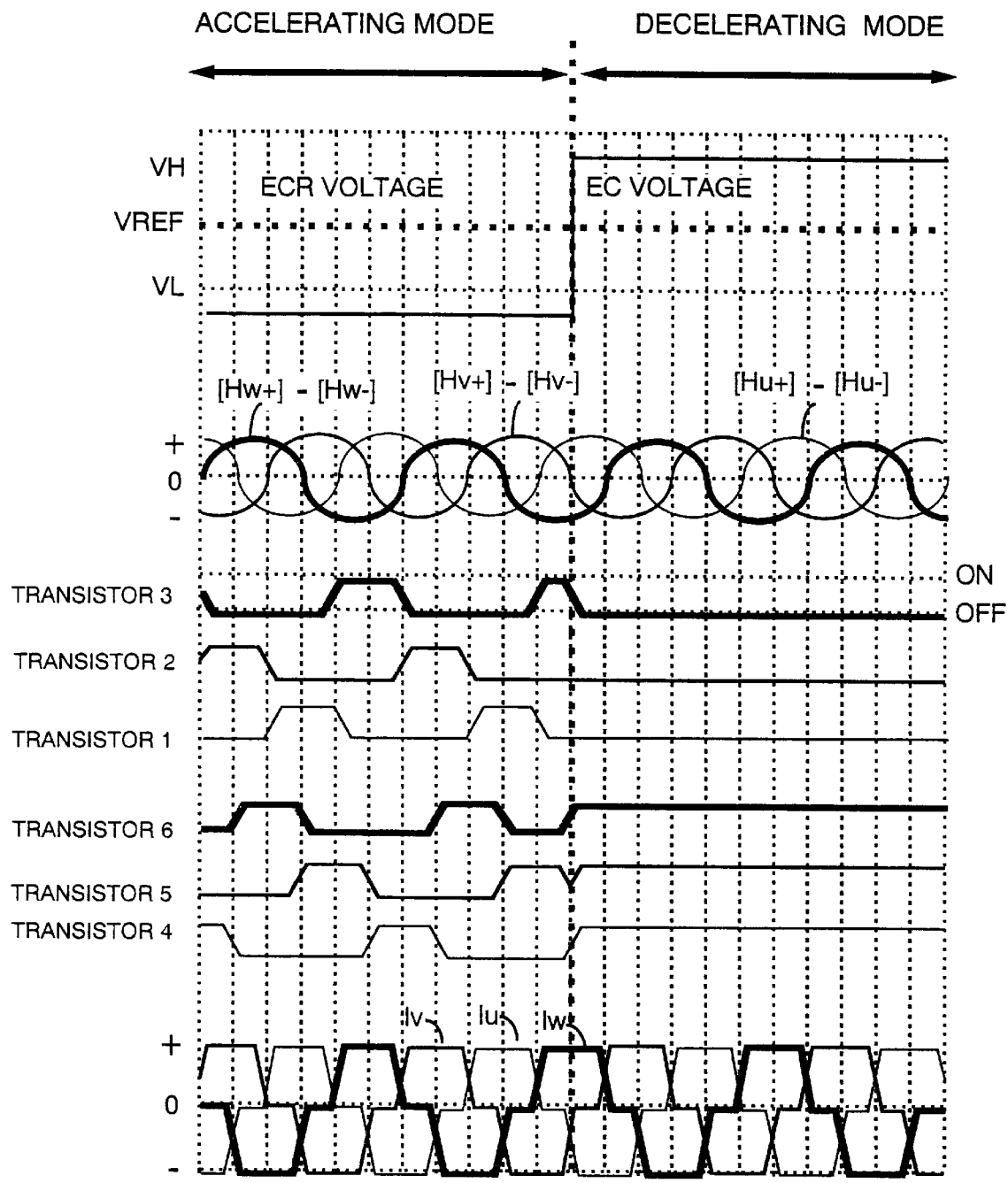
FIG. 2 is a timing chart when changing from the accelerating mode to the decelerating mode according to the first embodiment of the present invention.

Referring to FIG. 2, an operation of the motor driving circuit constructed in this way is explained below. FIG. 2 is a timing chart showing a motor control signal (EC), reference voltage (ECR), motor location signals (hole sensor signal) from the location detection hole sensors 12~14, switching states of both the power-supply side and the earth side output power transistors 1~6, and coil currents of the motor respectively, in which the timing is switched from the accelerating mode to the decelerating mode.

First, the accelerating mode period, namely, the section A (reading period) and the section B shown in FIG. 33 is explained, for example.

At this time, as shown in the accelerating mode in FIG. 2, the motor control signal (EC) inputted into the control signal input node EC is at "L" level. Therefore, a S switching signal is applied from the switching signal generator 18 to the switching control signal generator 19 so that current flows in the direction to generate a forward-direction torque (forward torque) in the motor coils of the spindle motor main body 11.

At the same time, a switching signal is applied to both the first activation signal generator 22 and to the second switching signal generator 23 from the switching signal generator 18. As a result, a first activation signal indicating an activated state is applied to the switching control signal generator 19 from the first activation signal generator 22, while a second activation signal indicating an activated state to the power-supply side controller 20 from the second activation signal generator 23.

This state is the same as those in the prior art and the same operation is expected. In other words, the switching control signal generator 19 receives a switching signal from the switching signal generator 18 and a switching state signal which is given to the location detection signal input nodes Hu+, Hu−, Hv+, Hv−, Hw+ and Hw−, and gives a switching control signal to both the power-supply side controller 20 and the earth side controller 21 so that a forward torque is generated in the motor.

Receiving the switching control signal, the power-supply side controller 20 and the earth side controller 21 supplies base currents in accordance with the switching control signal to the respective power-supply side and the earth side output power transistors 1~6, according to the current value base on the first and the second outputs from the output current controller 17.

Accordingly, the respective power-supply side and the earth side output power transistors 1~6 is on/off controlled as shown in FIG. 2.

As a result, the current flows from the power supply 15 to the electric potential node GND, via the power supply electric potential node Vcc, through one of the power-supply side output power transistors 1~3, through one of the output nodes U, V, W, the motor coils of the spindle motor main body 11, through one of the output nodes U, V, W, through one of the earth side output power transistors 4~6 and the detection resistor 10 according to the on/off of respective output power transistors 1~6 of the power-supply side and the earth side. That is, the coil current of the motor flows as the currents Iu, Iv, Iw as shown in FIG. 2, which generate forward torques and the motor rotates in the forward direction.

However, in this section A in the accelerating mode period, the output voltage of the motor is not raised significantly due to a slow rotating speed of the motor. In other words, a large ratio of voltage is applied to the motor driving circuit. However, since the load of the motor is very small, currents flowing in the coils of the motor are also very small. Therefore, the power consumption of the motor driving circuit is relatively small.

Also, in this section B of the accelerating period, the rotating speed of the motor is raised, compared to that in the section A. The output voltage of the motor is increased and a small ratio of voltage is applied to the motor driving circuit. However, since the load of the motor is large, currents flowing in the coils of the motor are relatively large. Accordingly, the power consumption of the motor driving circuit becomes larger than that in the section A.

Figure 3:
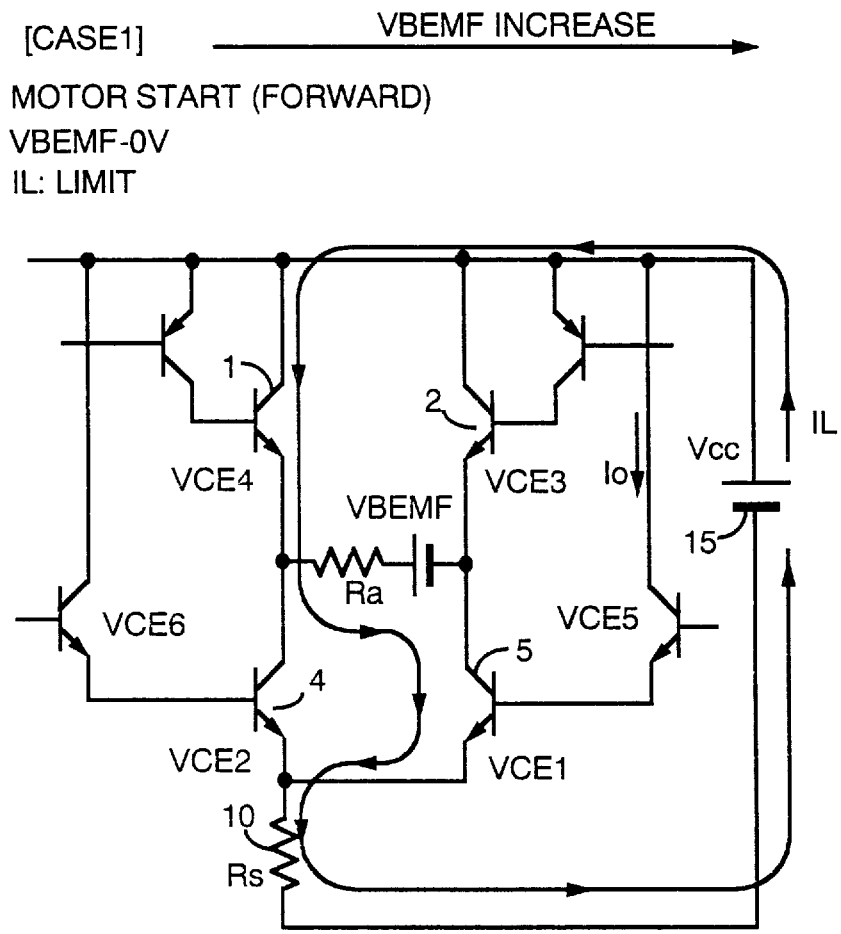
FIG. 3 is a circuit diagram showing a current path by a back electromotive force generated in motor coil according to the first embodiment of the present invention.
Figure 4:
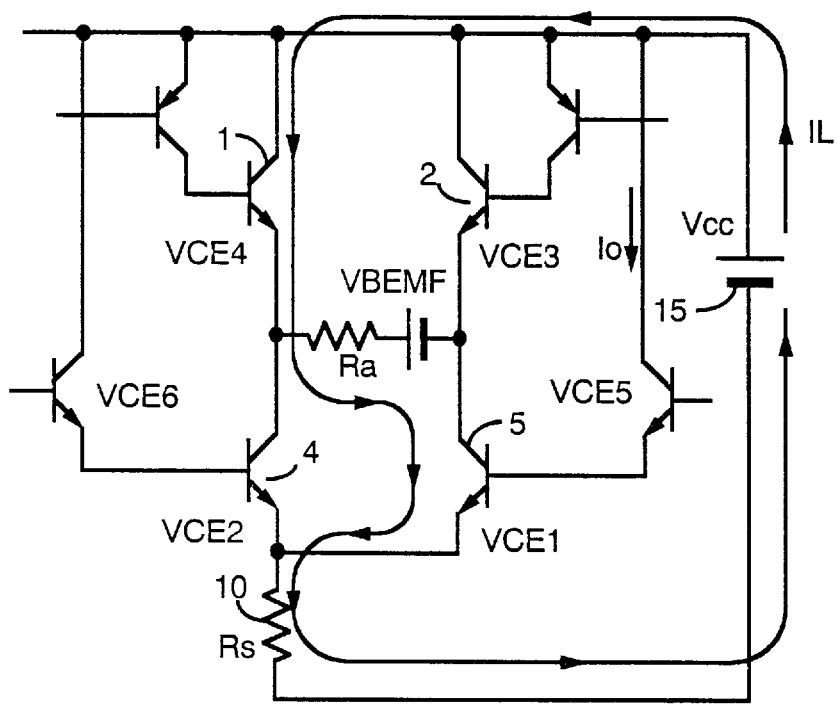
FIG. 4 is a circuit diagram showing another current path by a back electromotive force generated in motor coil according to the first embodiment of the present invention.

The current flow around the output stage in the motor and the motor driving circuit in this accelerating mode period is the same as that in an example of the prior art, which is shown in FIG. 3 [CASE 1] and FIG. 4 [CASE 2]. FIG. 3 and FIG. 4 are focusing on the current which flows in the coil between two arbitrary chosen outputs of the motor, for example between the output nodes U–V, as same as shown in an example of the prior art.

In CASE 1, like an example of the prior art, the back electromotive voltage (VBEMF) induced in the coils of the motor is zero at the start of the motor. In CASE 2, the back electromotive voltage (VBEMF) induced in the coils of the motor is raised as the motor rotating speed increases. At the maximum point of the motor rotating speed (4000 rpm in case of an eight-times speed CD-ROM), the back electromotive voltage (VBEMF) also reaches the maximum.

The decelerating mode period, which is a significant feature of the first embodiment, for example, the section C (deceleration moving period) as shown in FIG. 33, is explained below. In the decelerating mode as shown in FIG. 2, the motor control signal (EC) inputted into the control signal input node EC changes to "H" level, and a switching signal is applied to the switching control signal generator 19 from the switching signal generator 18 so that current flows in the direction to generate a reverse torque in the motor coils of the spindle motor main body 11.

At the same time, a switching signal is applied to the both first and the second activation signal generators 22, 23 from the switching signal generator 18. As a result, the first activation signal indicating a non-activated state supplied from the first activation signal generator 22 is given to the switching control signal generator 19, and the second activation signal indicating a non-activated state supplied from the second activation signal generator 23 is given to the power-supply side controller 20.

Accordingly, the switching control signal generator 19 which receives the first activation signal indicating a non-activated state from the first activation signal generator 22 gives a predetermined electric potential to the both power-supply side and the earth side controllers 20, 21, regardless of the state of the switching state signal which is given to the location detection signal input nodes Hu+, Hu−, Hv+, Hv−, Hw+ and Hw−.

On the other hand, receiving the second activation signal indicating a non-activated state from the second activation signal generator 23, the power-supply side controller 20 makes the base electrodes of the 1st~3rd power-supply side output transistors 1~3 electrically floating state, that is, non-conductive state, regardless of the predetermined electric potential from the switching control signal generator 19.

On the other hand, since the earth side controller 21 receives the second output signal from the output current controller 17 and a predetermined electric potential from the switching control signal generator 19, a predetermined base current flows to the earth side output power transistors 4~6 so that the earth side output power transistors 4~6 are always in conductive state during this period.

Accordingly, the power-supply side output power transistors 1~3 become non-conductive, while the earth side output power transistors 4~6 become conductive during this period. As a result, by means of a closed loop circuit formed by the earth side output power transistors 4~6, the current flows in the motor coil in the opposite direction to that of the forward rotation, where the back electromotive voltage (VBEMF) is consumed and the rotation speed is gradually decelerate.

Figure 5:
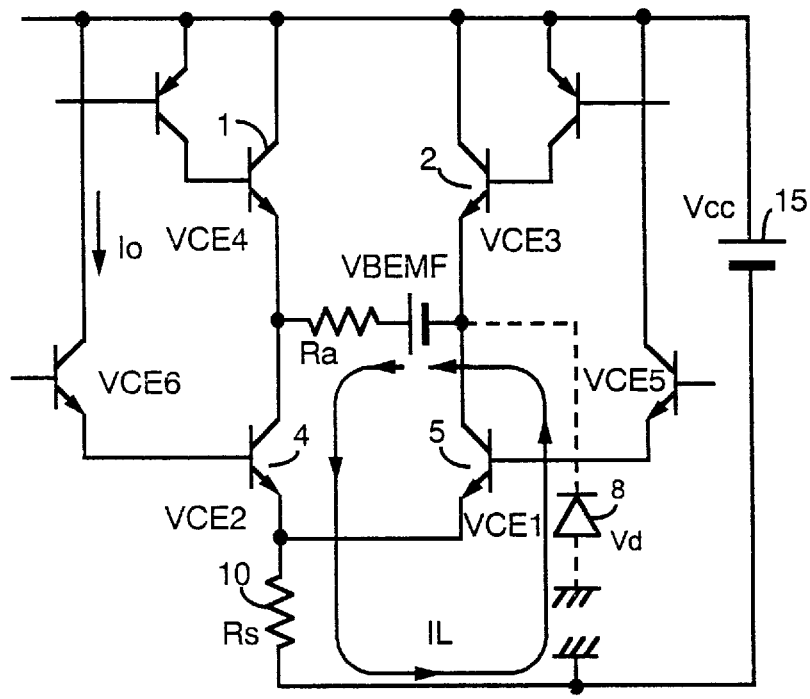
FIG. 5 is circuit diagram showing other current path by a back electromotive force generated in motor coil according to the first embodiment of the present invention.
Figure 6:
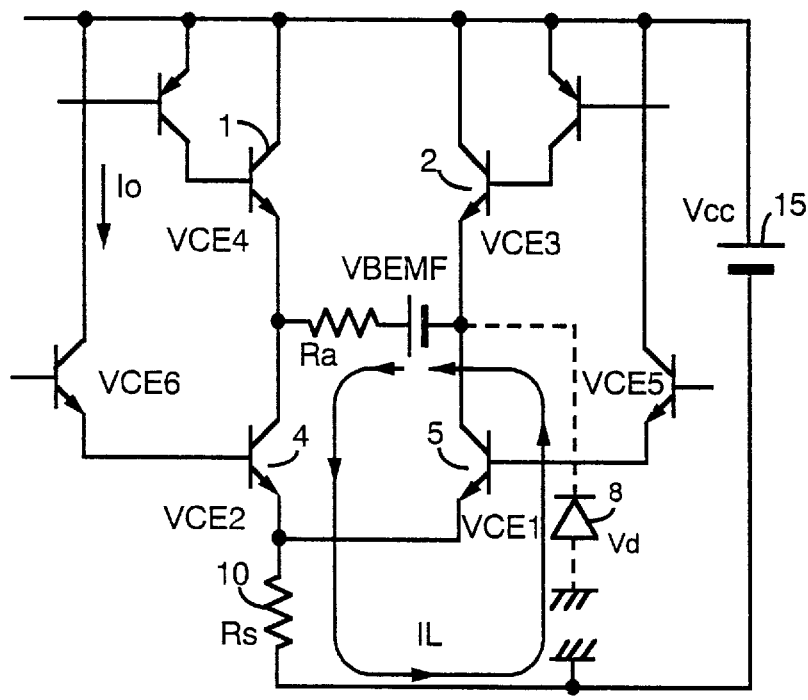
FIG. 6 is a circuit diagram showing other current path by a back electromotive force generated in motor coil according to the first embodiment of the present invention.

A further explanation is given to this point, referring to FIG. 5[CASE 3] and FIG. 6 [CASE 5]. FIG. 5 and FIG. 6 are also focusing on the current that flows in the coil between two arbitrary chosen outputs of the motor, for example between the output nodes U–V, as shown in FIG. 3 and FIG. 4.

Immediately after the changing to the decelerating mode, the state satisfies the above-mentioned equation (1). At this time, the power-supply side output power transistors 1~3 are in non-conductive state, and the earth side output power transistors 4~6 are in conductive state.

During the section which meets the above-mentioned condition (1), the current IL flows from the coil (resistance value Ra) of the motor back to the motor coil again, via the output node U, the earth side output power transistor 4, the detection resistor 10 (resistance value Rs), the parasitic diode 8 and the output node V, where the back electromotive voltage (VBEMF) is consumed as shown in FIG. 5 [CASE 3].

In this way, the back electromotive force (VBEMF) is consumed and the following equation (3) is satisfied. As the power-supply side output power transistors 1~3 are still in non-conductive state even if the equation (2) is satisfied as shown in FIG. 6 [CASE 5], the current IL flows from the coil (resistance value Ra) of the motor back to the motor coil again, via the output node U, the earth side output power transistor 4, the detection resistor 10 (resistance value Rs), the parasitic transistor 8 and the output node V, where the back electromotive force (VBEMF) is consumed.

$$Rs \times IL + VCE\ 2 + Ra \times IL - VBEMF = -Vd \qquad (3)$$

Since the current IL is not controlled by the motor driving circuit 200, the VCE 2 of the earth side power transistor 4 is saturated, and the power consumption by the current IL is therefore extremely small, compared to the above-mentioned example of the prior art.

Figure 8:
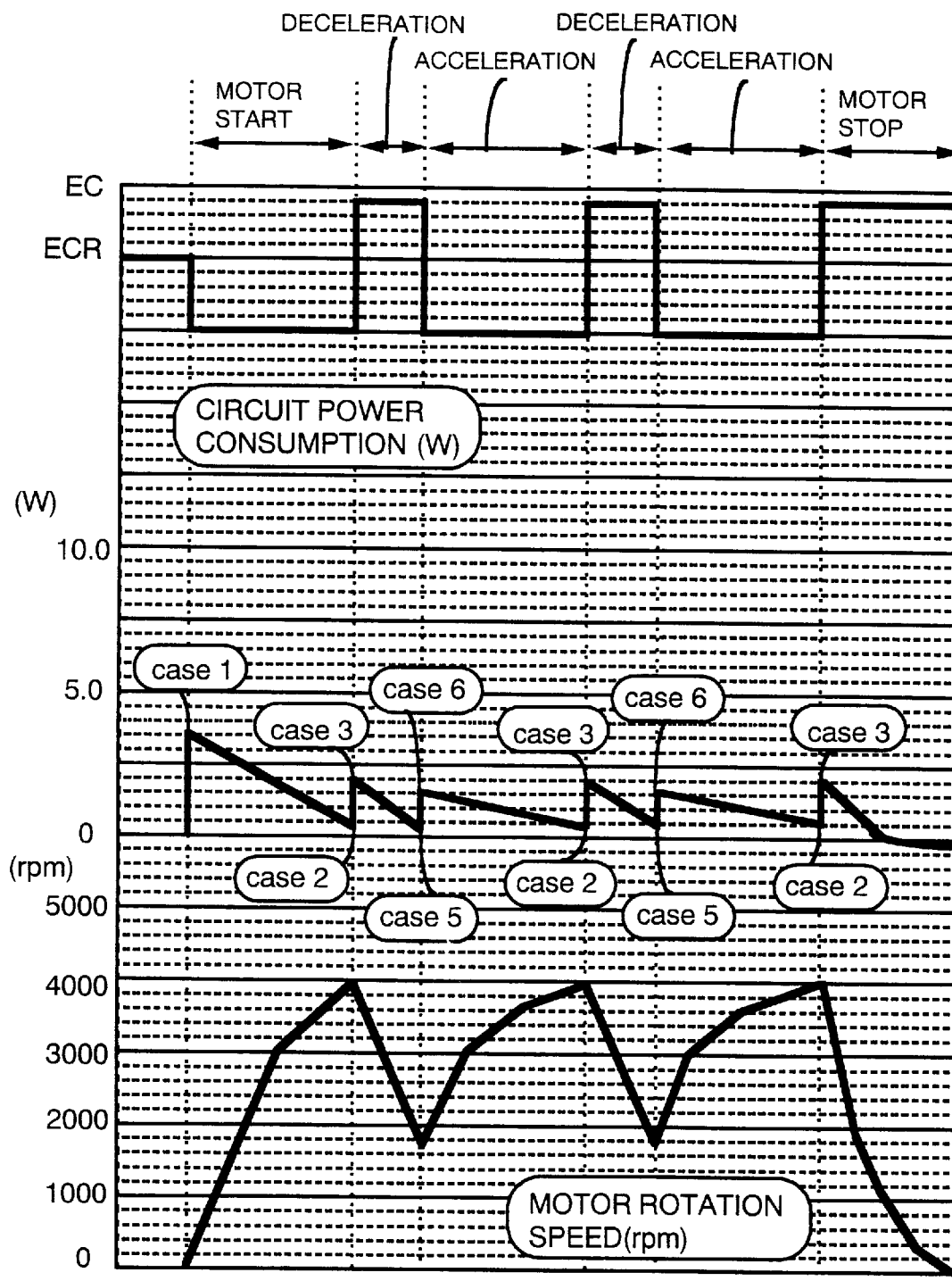
FIG. 8 is a timing chart showing a power consumption in a circuit during full stroke operation according to the first embodiment of the present invention.

This state is maintained until the rotating speed of the motor is decelerated to the desired rotating speed. In the first embodiment, the motor driving circuit is applied to a reproducing equipment comprising an eight-times speed CD-ROM, for example. FIG. 8 shows a result of the power consumption under the severest heat condition (full stroke accelerating/decelerating) until this predetermined rotating speed reaches the minimum, for example, 1600 rpm in case of an eight-times speed CD-ROM, namely, the termination of the deceleration.

As seen from FIG. 8, the value of the power consumption is significantly decreased, i.e. 2~3 W, compared to the above-mentioned example of the prior art during the decelerating mode period of FIG. 5 [CASE 3]~FIG. 6 [CASE 5]. Within this level of the power consumption, the motor driving circuit shown in this first embodiment can be integrated into a semiconductor integrated circuit using a conventional package if package having a certain degree of low thermal resistance is chosen.

Figure 7:
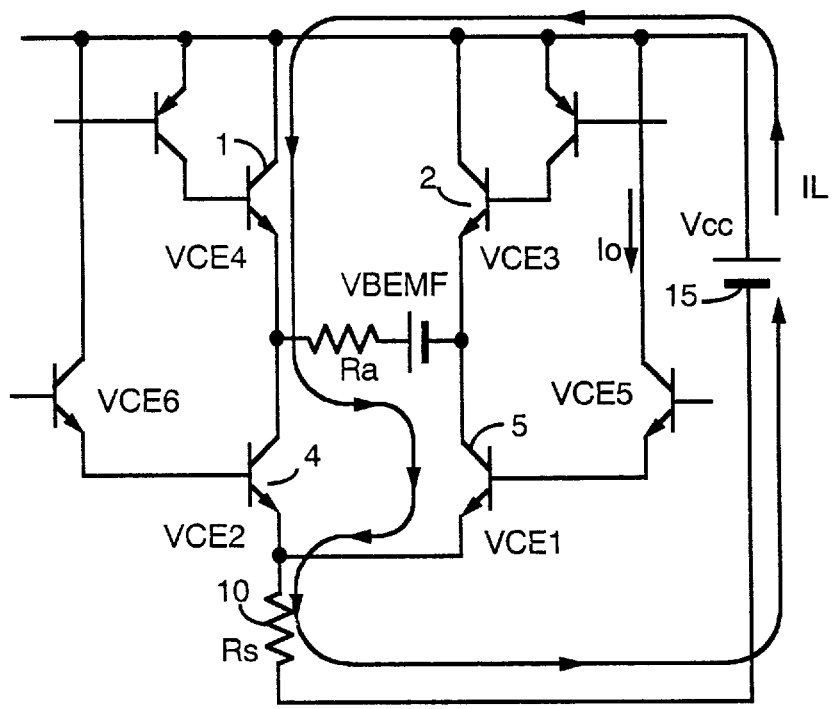
FIG. 7 is a circuit diagram showing other current path by a back electromotive force generated in motor coil according to the first embodiment of the present invention.

When the deceleration is terminated in this way and the acceleration is started instead, the state becomes as shown in FIG. 7 [CASE 6] which is the same as that shown in FIG. 3 [CASE 1].

The system for decelerating a motor, in which the power-supply side output power transistors 1~3 are all in non-conductive state and the earth side output power transistors 4~6 are all in conductive state, is called as an all-short-brake.

In the first embodiment, although the switching control signal generator 19 controls the activated/non-activated state according to the first activation signal from the first activation signal generator 22, it is also possible to use another way explained below.

In other words, the switching control signal generator 19 may be constructed such that the switching control signal generator 19 receives the motor location signal from the location detection hole sensors 12~14 and a switching signal from the switching signal generator 18, and then the switching control signal generator 19 outputs a switching control signal based on the motor location signal when the switching signal from the switching signal generator 18 indicates the accelerating mode, alternatively, the switching control signal generator 19 outputs a predetermined level of the electric potential regardless of the motor location signal when the switching signal from the switching signal generator 18 indicates the decelerating mode. The same effect can be obtained according to the above-mentioned construction.

Embodiment 2

Figure 9:
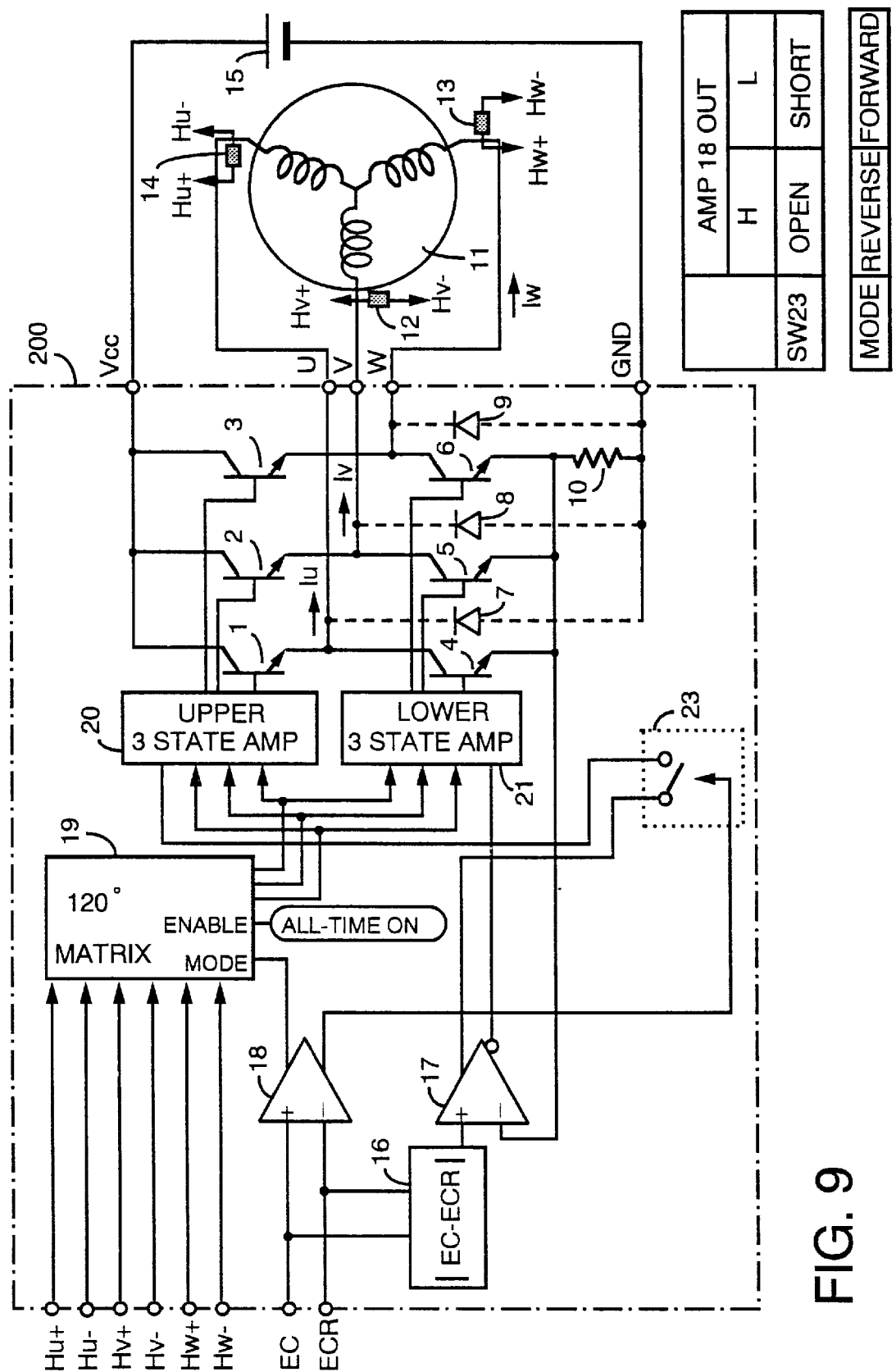
FIG. 9 is a circuit diagram according to a second embodiment of the present invention.

FIG. 9 shows a second embodiment of this invention. In FIG. 9, the elements having the same reference numbers in FIG. 9 are the same portions or the corresponding portions in FIG. 1. A switching control signal generator 19 receives a motor location signal from the location detection hole sensors 12~14 and a switching signal from the switching signal generator 18. The switching control signal generator 19 always receives an ON signal on its enable terminal, by connecting the enable terminal to a power-supply electric potential node, for example. When a switching signal from the switching signal generator 18 indicates the accelerating mode, the switching control signal generator 19 outputs a first switching control signal based on the motor location signal, on the other hand, when the decelerating mode is indicated, the switching control signal generator 19 outputs a second switching control signal which changes in the opposite sequence compared to the first switching signal, in accordance with the motor location signal. The switching control signal generator 19 comprises input nodes connected to the location detection signal input nodes Hu+, Hu−, Hv+, Hv−, Hw+ and Hw−, and three output nodes corresponding to respective U, V and W phases.

The output current controller 17, the second activation signal generator 23 and the power-supply side controller 20 and the earth side controller 21 constitute a base current supply means which receives the output signal from the switching control signal generator 19 and operates as follows. When a mode assignment signal indicates an accelerating mode, the base current supply means supplies a base current based on the first switching control signal which is the output signal from the switching control signal generator 19, to both the 1st~3rd power-supply side output transistors 1~3 and the 1st~3rd earth side output transistors 4~6. When a mode assignment signal indicates a decelerating mode, the base current supply means makes the base electrodes of the 1st~3rd power-supply side output transistors 1~3 electrically floating state, that is, non-conductive state, while it supplies a base current based on a second switching control signal which is the output signal from the switching control signal generator 19, to the 1st~3rd earth side output transistors 4~6.

The switching signal generator 18, the switching control signal generator 19 and the base current supply means constitute a control signal generation circuit, which receives a motor location signal and a mode assignment signal indicating either the accelerating mode or the decelerating mode, and which operates as follows. When a mode assignment signal indicates an accelerating mode, the control signal generation circuit supplies a base current eased on the motor location signal to both the 1st~3rd power-supply side output transistors 1~3 and the 1st~3rd earth side output transistors 4~6. When a mode assignment signal indicates a decelerating mode, the control signal generation circuit, regardless of the received motor location signal, makes the 1st~3rd power-supply side output transistors 1~3 non-conductive state, while it supplies a base currents to the 1st~3rd earth side output transistors 4~6 so that a torque is generated in the opposite direction to that of the forward torque in accordance with the received motor location signal.

Figure 10:
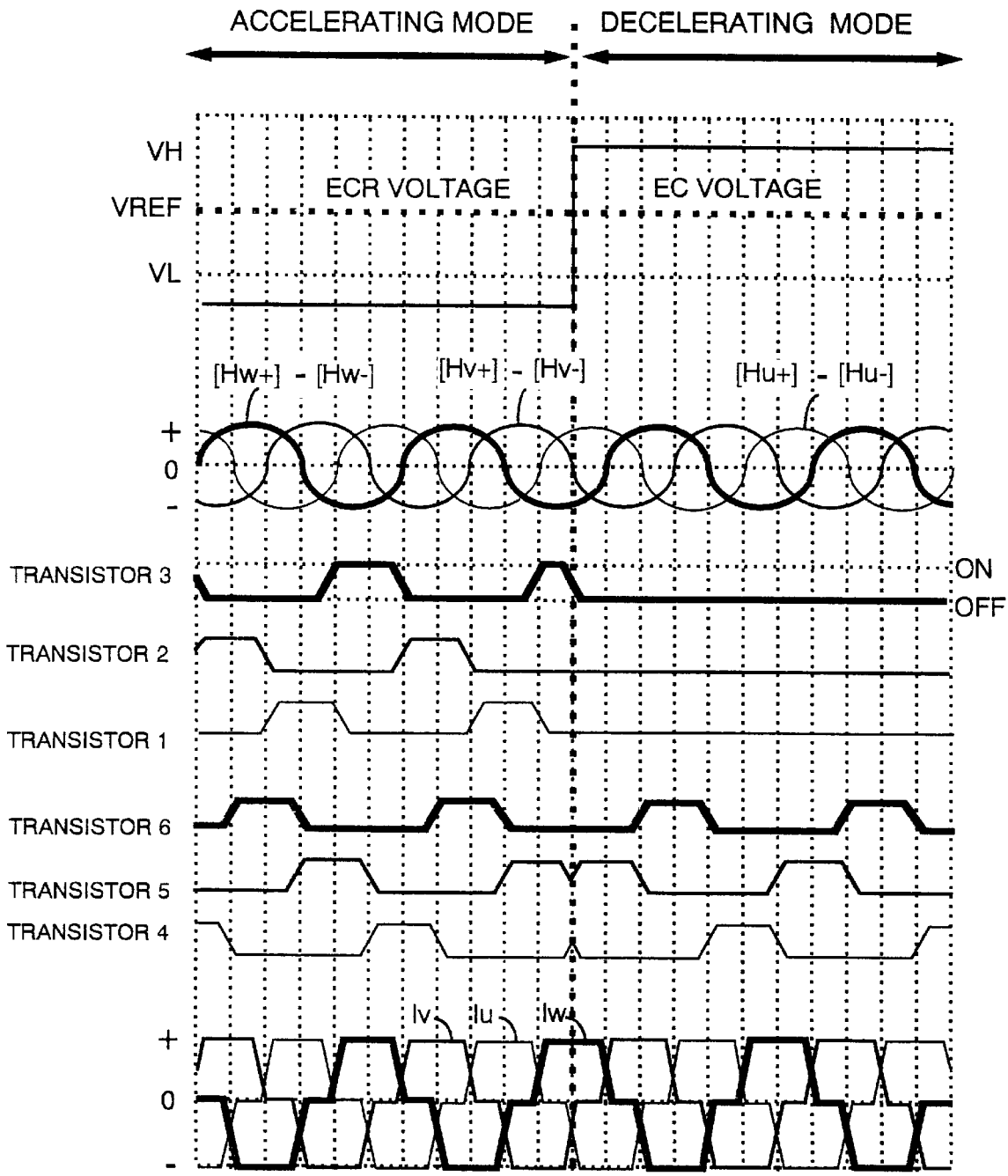
FIG. 10 is a timing chart when changing from the accelerating mode to the decelerating mode according to the second embodiment of the present invention.

Referring to FIG. 10, an operation of the motor driving circuit constructed in this way is explained below. FIG. 10 is a timing chart which is similar to that in FIG. 2. In the accelerating mode period, as shown in the accelerating mode in FIG. 2, the motor control signal (EC) inputted into the control signal input node EC is at "L" level. Therefore, a switching signal is applied from the switching signal generator 18 to the switching control signal generator 19 so that current flows in the direction to generate a forward-direction torque (forward torque) in the motor coils of the spindle motor main body 11.

At the same time, a switching signal is applied to the activation signal generator 23 from the switching signal generator 18, and an activation signal indicating an activated state is applied to the power-supply side controller 20 from the activation signal generator 23.

Figure 11:
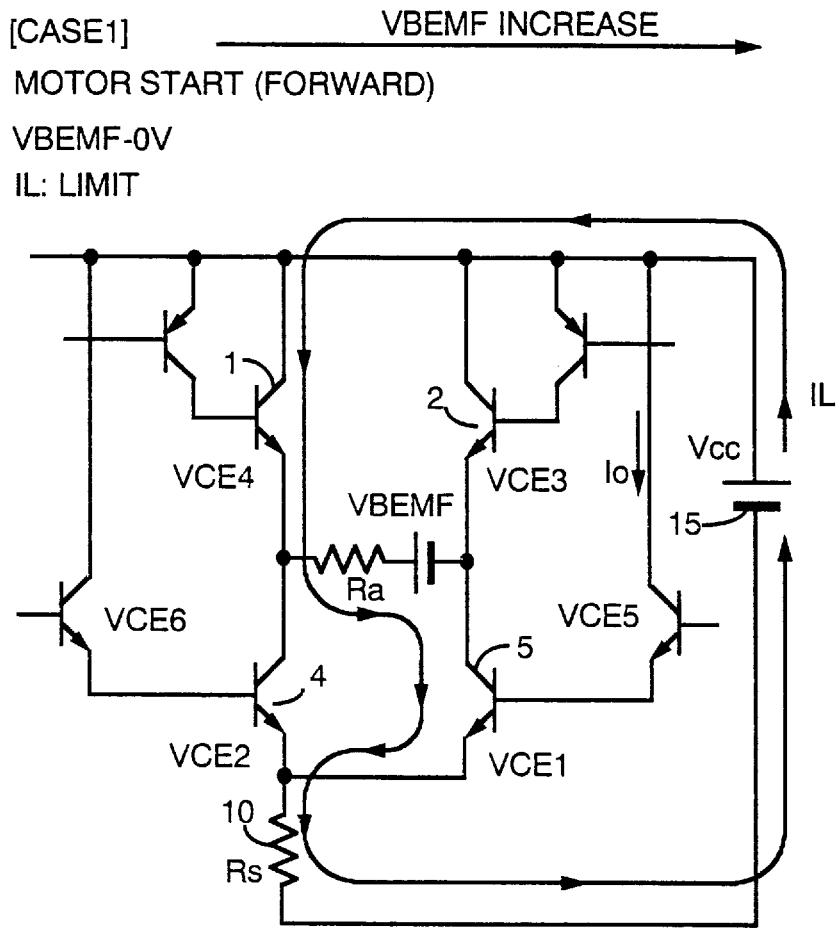
FIG. 11 is a circuit diagram showing another current path by a back electromotive force generated in motor coil according to the second embodiment of the present invention.
Figure 12:
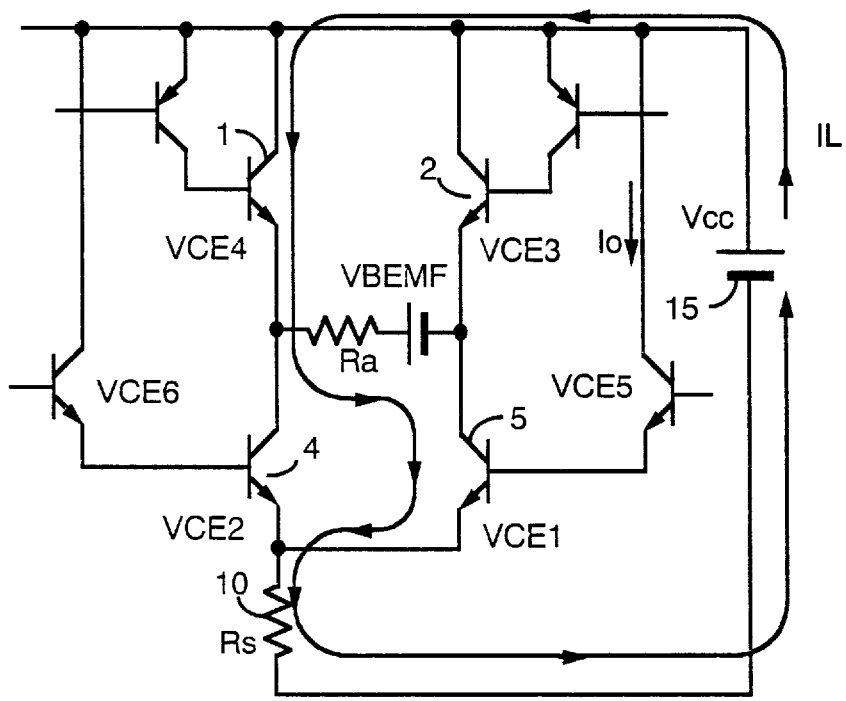
FIG. 12 is a circuit diagram showing other current path by a back electromotive force generated in motor coil according to the second embodiment of the present invention.
Figure 13:
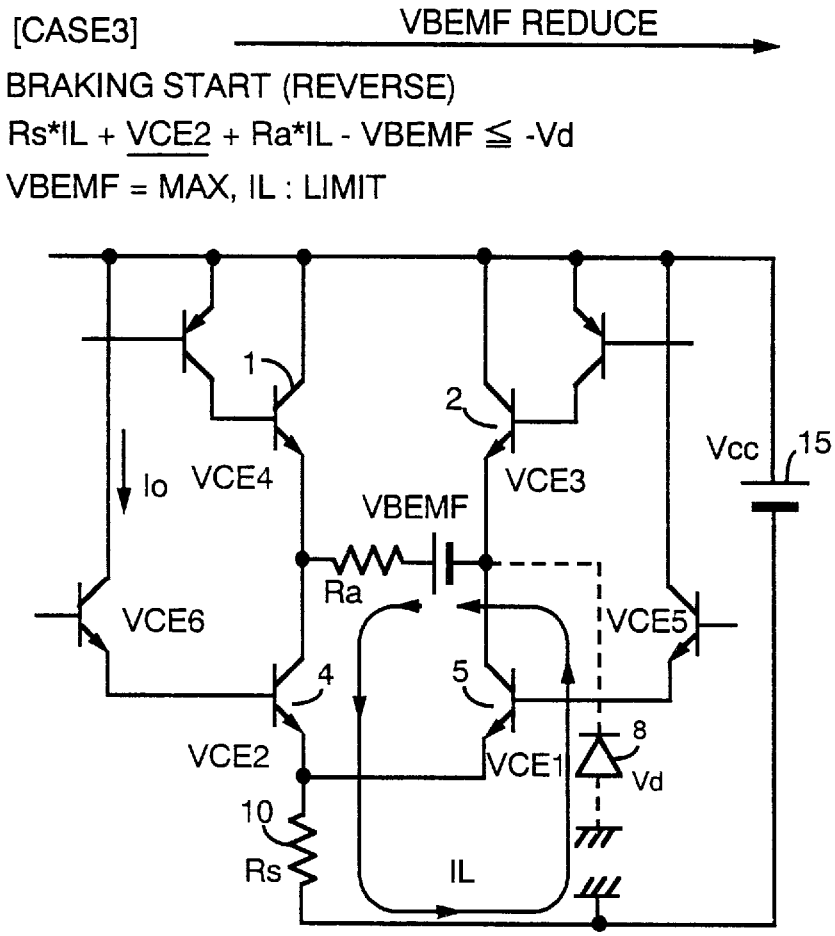
FIG. 13 is a circuit diagram showing other current path by a back electromotive force generated in motor coil according to the second embodiment of the present invention.

Since this state is the same as that in the accelerating mode period in the above-mentioned first embodiment and the same operation as that of the first embodiment is therefore obtained, a further explanation is omitted. The current flow around the output stage in the motor and the motor driving circuit in this accelerating mode period is shown in FIG. 11 [CASE 1] and FIG. 12 [CASE 2]. FIG. 12 and FIG. 13 are focusing on the current which flows in the coil between two arbitrary chosen outputs of the motor, for example between the output nodes U–V, like in an example of the first embodiment. In other words, the current flow is the same as that in the first embodiment.

The decelerating mode period which is a characteristic point of the first embodiment, for example the section C (deceleration moving period) shown in FIG. 33, is explained below. In the decelerating mode as shown in FIG. 10, the motor control signal (EC) inputted into the control signal input node EC changes to "H" level, and a switching signal is applied to the switching control signal generator 19 from the switching signal generator 18 so that current flows in the direction to generate a reverse torque in the motor coils of the spindle motor main body 11.

At the same time, a switching signal is applied to the activation signal generator 23 from the switching signal generator 18, and an activation signal indicating a non-activated state is given from the activation signal generator 23 to the power-supply side controller 20.

Since "H" level electric potential which indicates an activated state is always given on its enable terminal, the signal generator 19 applies a second switching control signal to both the power-supply side and the earth side controllers 20, 21 so that a reverse torque is generated in the motor, in accordance with the switching state signal which is given to the location detection signal input nodes Hu+, Hu–, Hv+, Hv–, Hw+ and Hw–.

On the other hand, receiving the second activation signal indicating a non-activated state from the second activation signal generator 23, the power-supply side controller 20 makes the base electrodes of the 1st~3rd power-supply side output transistors 1~3 electrically floating state, that is, non-conductive state, regardless of the predetermined electric potential from the switching control signal generator 19.

Since the earth side controller 21 receives a second output signal from the output current controller 17 and a second signal from the switching control generator 19, the base current based on the second switching control signal flows to the earth side output power transistors 4~6 in accordance with the second output received. In other words, the earth side output power transistors 4~6 are in conductive state in accordance with the second switching control signal during this period.

Accordingly, the power-supply side output power transistors 1~3 become in non-conductive state, while the earth side output power transistors 4~6 become in conductive state during this period according to the second switching control signal.

As a result, by means of a closed loop circuit formed by the earth side output power transistors 4~6, the current flows in the motor coil in the opposite direction to that of the forward rotation, where the back electromotive voltage (VBEMF) is consumed and the rotation speed is gradually decelerate.

Figure 14:
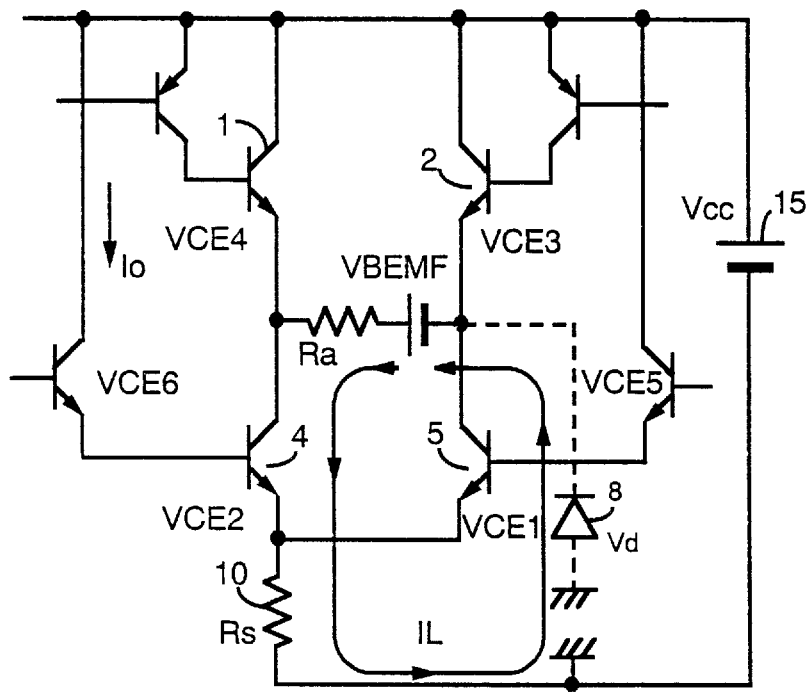
FIG. 14 is a circuit diagram showing other current path by a back electromotive force generated in motor coil according to the second embodiment of the present invention.
Figure 15:
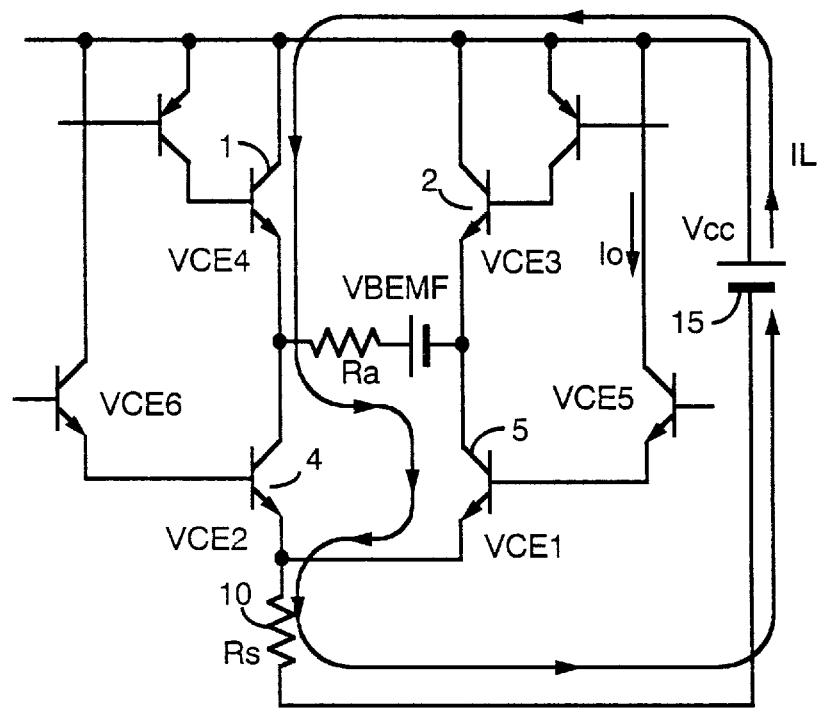
FIG. 15 is a circuit diagram showing other current path by a back electromotive force generated in motor coil according to the second embodiment of the present invention.

A further explanation is given to this point, referring to FIG. 13 [CASE 3] and FIG. 14 [CASE 5]. FIG. 13 and FIG. 14 are also focusing on the currents that flow in the coil between two arbitrary chosen outputs of the motor, for example between the output nodes U–V, as shown in FIG. 5 and FIG. 6, and also show cases that the earth side output power transistor 4 become in conductive state in accordance with the second switching control signal from the switching control signal generator 19.

Immediately after changing to the decelerating mode, the state satisfies the above-mentioned equation (1). At this moment, the power-supply side output power transistors 1~3 are in non-conductive state, the earth side output power transistors 4~6 are in conductive state due to the second switching control signal from the switching control signal generator 19. In other words, the earth side output power transistors 4~6 change its state between conductive and non-conductive states in the opposite sequence to that in the accelerating mode period.

During the section which meets the above-mentioned condition (1), the current IL flows from the coil (resistance value Ra) of the motor back to the motor coil again, via the output node U, the earth side output power transistor 4, the detection resistor 10 (resistance value Rs), the parasitic transistor 8 and the output node V, where the back electromotive voltage (VBEMF) is consumed as shown in FIG. 13 [CASE 3].

In this way, the back electromotive force (VBEMF) is consumed and the following equation (3) is satisfied. As the power-supply side output power transistors 1~3 are still in non-conductive state even if the equation (2) is satisfied as shown in FIG. 14 [CASE 5], the current IL flows from the coil (resistance value Ra) of the motor back to the coil of the motor again, via the output node U, the earth side output power transistor 4, the detection resistor 10 (resistance value Rs), the parasitic transistor 8 and the output node V, where the back electromotive force (VBEMF) is consumed.

Since the current IL is controlled by the motor driving circuit 200, the VCE 2 of the earth side power transistor 4 is not saturated. But, since the power-supply side output power transistors 1~3 are always in non-conductive state during this period, the power consumption by the current IL is small compared to the above-mentioned example of the prior art.

Since the conductive/non-conductive state of the earth side output power transistors 4~6 is controlled by the second switching control signal from the switching control signal generator 19, the current IL can be controlled and the motor speed can be effectively decelerated.

Figure 16:
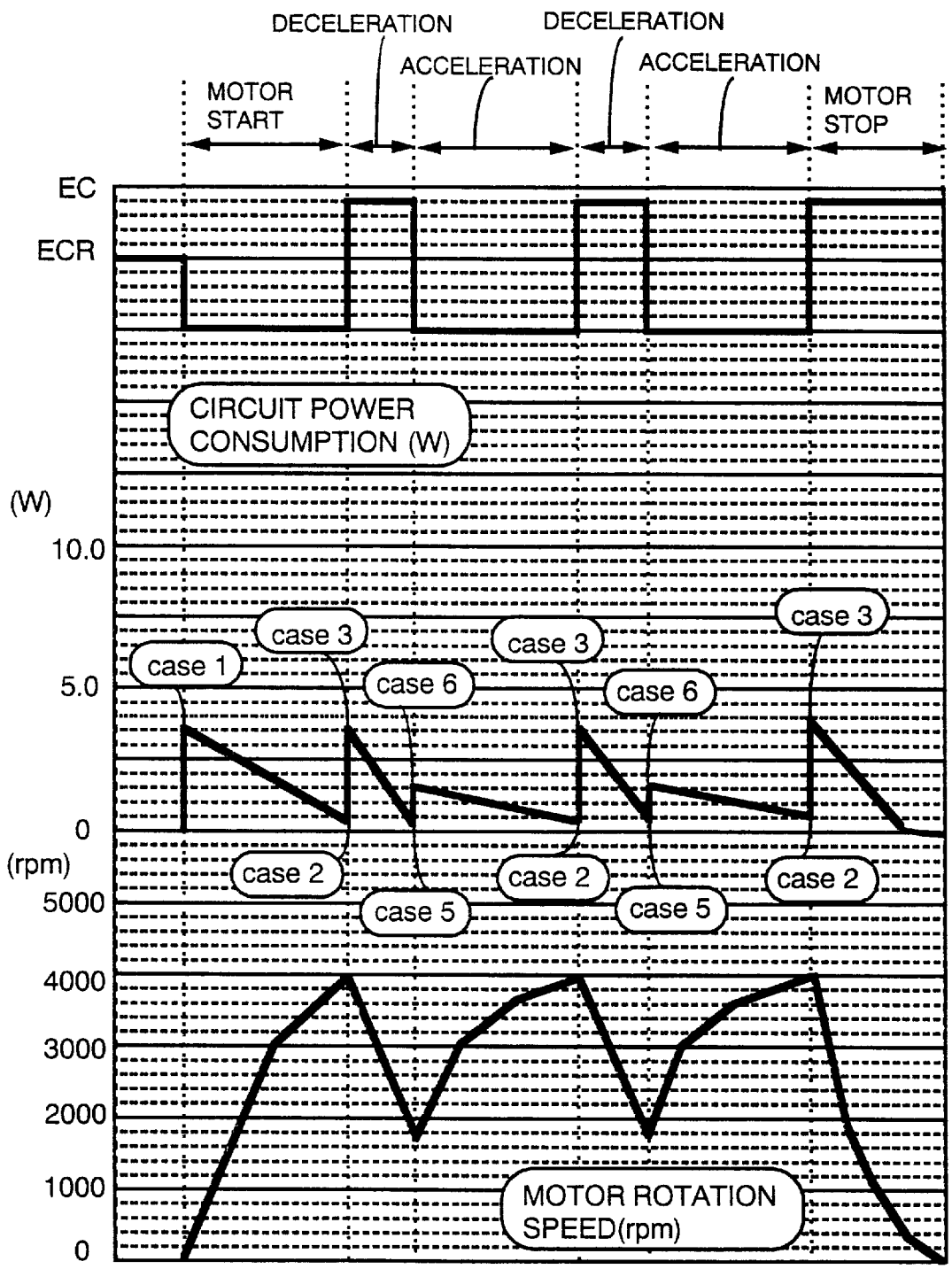
FIG. 16 is a timing chart showing a power consumption in a circuit during full stroke operation according to the second embodiment of the present invention.

This state is maintained until the rotating speed of the motor is decelerated to the desired rotating speed. In the second embodiment, the motor driving circuit is applied to a reproducing equipment comprising an eight-times speed CD-ROM, for example. FIG. 16 shows a result of the power consumption under the severest heat condition (full stroke accelerating/decelerating) until this predetermined rotating speed reaches the minimum, for example, 1600 rpm in case of an eight-times speed CD-ROM, namely, the termination of the deceleration.

As seen from FIG. 16, the value of the power consumption is significantly decreased, i.e. 3~4 W, compared to the above-mentioned example of the prior art during the decelerating mode period of FIG. 13 [CASE 3]~FIG. 14 [CASE 5]. Within this level of the power consumption, the motor driving circuit shown in this first embodiment can be integrated into a semiconductor integrated circuit using a conventional package if package having a certain degree of low thermal resistance is chosen.

When the deceleration is terminated in this way and the acceleration is started instead, the state becomes the same as that shown in FIG. 3 [CASE 1], as shown in FIG. 7 [CASE 6].

The system for decelerating a motor, in which the power-supply side output power transistors 1~3 are all in non-conductive state and the earth side output power transistors 4~6 are in conductive state for generating a torque in the opposite direction to that of a forward torque in accordance with the motor rotation detection signal, is called as a commutated-short-brake.

In the second embodiment, although the switching control signal generator 19 maintains the activated state by "H" level signal always applied to the enable terminal, it is also possible to use another way explained below.

In other words, the switching control signal generator 19 may be constructed such that the switching control signal generator 19 receives the motor location signal from the location detection Hall effect sensors 12~14 and a switching signal from the switching signal generator 18, and then the switching control signal generator 19 outputs a first switching control signal based on the motor location signal when the switching signal from the switching signal generator 18 indicates the accelerating mode, alternatively, the switching control signal generator 19 outputs a second switching signal which changes in the opposite direction to that of the first switching signal base on the motor location signal when the switching signal from the switching signal generator 18 indicates the decelerating mode. The same effect can be obtained according to the above-mentioned construction.

Embodiment 3

Figure 17A:
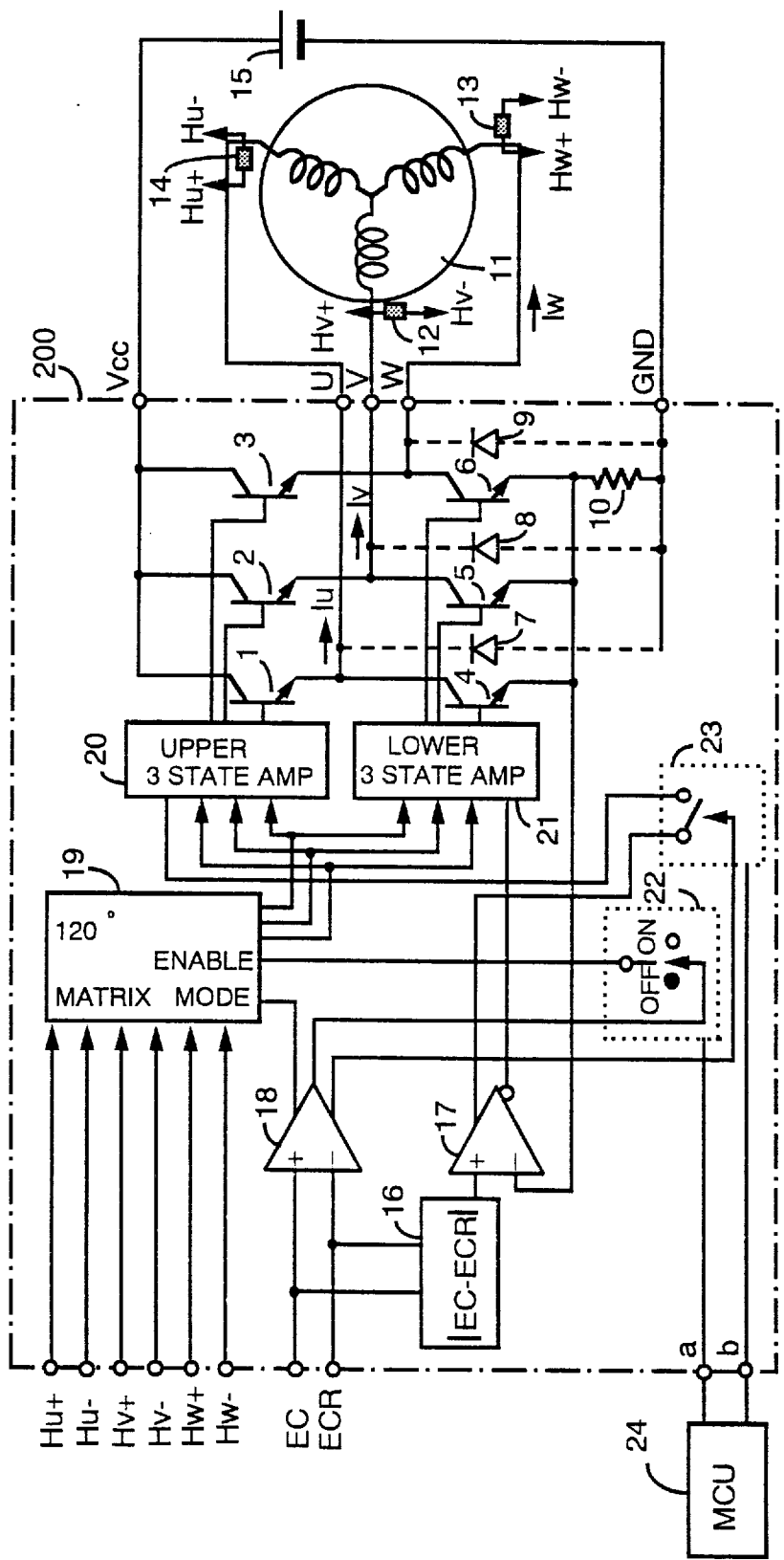
FIGS. 17A, B and C are circuit diagrams according to a third embodiment of the present invention.

FIGS. 17A, B and C show a third embodiment of this invention. In FIG. 17, the elements having the same reference numbers in FIG. 17 are the same portions or the corresponding portions in FIG. 1. In FIG. 17 A, selection signal input nodes a, b for receiving a selection signal for the motor driving circuits. A selection signal output means 24 outputs a selection signal which indicates decelerating modes including 1st~3rd modes to the selection signal input nodes a, b. The selection signal output means 24 consists of a microprocessor, for example, which is defined separately on another semiconductor integrated circuit where the semiconductor integrated circuit comprising the motor driving circuit is formed.

In this third embodiment, the above mentioned selection signal is explained below. A first mode in the decelerating mode indicates the all-short-brake mode, which is indicated by [H, H](the left side "H" represents a signal inputted to the selection signal input node a and the right "H" side represents a signal inputted to the selection signal input node b, and the same applies to the rest of the specification unless there is a special explanation), for example. This first mode is used during the deceleration moving period in case that a small number of tracks are skipped, in the decelerating mode period.

A second mode in the decelerating mode indicates a commutated-short-brake mode, which is indicated by [L, H], for example. This second mode is used during the deceleration moving period in case that a large number of tracks are skipped, in the decelerating mode period. A third mode in the decelerating mode indicates a reverse brake mode, which is indicated by [L, L], for example. This third mode is used in the stop period to stop the rotation of the motor, in the decelerating mode period.

A first activation signal generator 22 receives a switching signal from the switching signal generator 18 and a selection signal inputted via the selection signal input node a from the selection signal output means 24, and outputs a first activation signal which has a specific feature as follows. The first activation signal indicates an activated state when the received switching signal indicates the accelerating mode or when the switching signal indicates a decelerating mode and the received selection signal indicates either the second or the third mode, in other words, an "L" level signal is inputted to the selection signal input node a. On the other hand, the first activation signal indicates a non-activated state when the received switching signal indicates a decelerating mode and the received selection signal indicates the first mode, in other words, an "H" level signal is inputted to the selection signal input node a. In the same manner as the first embodiment, the first activation signal generator 22 consists of switching elements comprising a bipolar transistor and so on, which outputs a first activation signal by connecting the power supply electric potential node to the "on" side in FIG. 17 A, when the signal indicates an activated state, and by connecting the earth electric potential node to the "off" side in FIGS. 17A, B and C when the signal indicates a non-activated state.

A switching control signal generator 19 receives a motor location signal from the location detection Hall effect sensors 12~14, a switching signal from the switching signal generator 18 and a first activation signal from the first activation signal generator 22. The switching control signal generator 19 outputs a first switching control signal based on the motor location signal when the received switching signal indicates an accelerating mode and the first activation signal from the first activation signal generator 22 indicates an activated state. The switching control signal generator 19 outputs a second switching control signal which changes in the opposite sequence to that of the first switching control signal based on the motor location signal, when the received switching signal indicates a decelerating mode and the first activation signal from the first activation signal generator 22 indicates an activated state. The switching control signal generator 19 outputs a predetermined electric potential, namely, an electric potential between the power supply electric potential applied to the power supply electric potential node Vcc and the earth electric potential applied to the earth electric potential node GND, regardless of the motor location signal, when the received switching signal indicates a decelerating mode and the first activation signal from the first activation signal generator 22 indicates a non-activated state. The switching control signal generator 19 comprises input nodes connected to the location detection signal input nodes Hu+, Hu−, Hv+, Hv−, Hw+ and Hw−, and three output nodes corresponding to respective U, V and W phases.

A second activation signal generator 23 receives a first output signal from the output current controller 17, a switching signal from the switching signal generator 18 and a selection signal inputted via the selection signal input node b from the selection signal output means 24, and outputs a second activation signal which has a specific feature as follows. When the received switching signal indicates an accelerating mode, or when the switching signal indicates decelerating mode and the received selection signal indicated the third mode (namely, when the "L" level signal is inputted to the selection signal input node b), the second activation signal indicates an activated state so that base current is supplied in accordance with the output signal from the output current supply means 17. When the received switching signal indicates a decelerating mode and the selection signal indicates either the first or the second mode (namely, when an "L" level signal is inputted to the selection signal input node b), the second activation signal indicates a non-activated state. In this third embodiment, the second activation signal generator 23 comprises switching elements consisting of bipolar transistors and so on, which supplies the output of the switching signal generator 18 to the first output terminal of the output current controller 17 when the activated state is indicated, on the other hand it breaks the output of the switching signal generator 18 to the first output terminal of the output current controller 17 when the non-activated state is indicated.

A power-supply side controller 20 receives an output signal from the switching control generator 19 and a second activation signal from the second activation signal generator 23. When the second activation signal indicates an activated state, the power-supply side controller 20 outputs base current based on the second activation signal to the 1st~3rd power-supply side output transistors 1~3 which comprise output current circuit, according to either the first or the second switching control signal which is the output signal from the switching control generator 19. When the second activation signal indicates a non-activated state, the power-supply side controller 20 makes the base electrodes of the 1st~3rd power-supply side output transistors 1~3, which comprises the output current circuit, electrically a floating state, in accordance with the second activation signal. In this third embodiment, when the second activation signal from the second activation signal generator 23 indicates an activated state, in other words, when the switching signal from the switching signal generator 18 indicates an accelerating mode or the selection signal from the selection signal output means 24 indicates the third mode (reverse brake mode) to connect the first output terminal of the output current controller 17 to the output terminal of the second activation signal generator 23, a current is supplied from the first output terminal of the output current controller 17 to the power-supply side controller 20, and the base current which is amplified by a predetermined gain is given to the 1st~3rd power-supply side output transistors 1~3 in accordance with either the first or the second switching control signal of the switching control signal generator 19. When the second activation signal from the second activation signal generator 23 indicates a non-activated state, in other words, when the selection signal from the selection signal output means 24 indicates either the first or the second mode (the mode of either all-short-brake or commutated-short-brake) to break the connection between the first output terminal of the output current controller 17 and the output terminal of the second activation signal generator 23, the current supply is stopped, which makes the base electrodes of the 1st~3rd power-supply side output transistors 1~3 electrically floating state. This power-supply side controller 20 consists of a pre-driver circuit, for example.

An earth side controller 21 receives an output signal from the switching control generator 19 and an output signal from the output current controller 17. According to the output signal from the switching control signal generator 19, the earth side controller 21 supplies base current in accordance with the output signal from the output current controller 17 to the 1st~3rd earth side output transistors 4~6 which comprises the output current circuit. In this third embodiment, the earth side controller 21 is connected to the second output terminal from the output current controller 17 so that current is drawn from the second output terminal. The drawn current is amplified by a predetermined gain and the amplified current is supplied to the bases of the 1st~3rd earth side output transistors 4~6, according to the switching control signal from the switching control signal generator 19. This earth side controller 21 consists of a pre-driver circuit, for example.

The output current controller 17, the second activation signal generator 23, the power-supply side controller 20 and the earth side controller 21 constitute a base current supply means, which receives the output signal from the switching control signal generator 19 and operates as follows. When a mode assignment signal indicates an accelerating mode, the base current supply means supplies a base current based on the switching control signal which is the output signal from the switching control signal generator 19, to both the 1st~3rd power-supply side output transistors 1~3 and the 1st~3rd earth side output transistors 4~6. When a mode assignment signal indicates a decelerating mode and the selection signal indicates the first mode, a first control signal is outputted, which makes the 1st~3rd power-supply side output transistors 1~3 electrically floating state, that is, a non-conductive state, while the first control signal supplies a base current based on a predetermined electric potential which is the output signal from the switching control signal generator 19, to the 1st~3rd earth side output transistors 4~6. When a mode assignment signal indicates a decelerating mode and the selection signal indicates the second mode, a second control signal is outputted, which makes the 1st~3rd power-supply side output transistors 1~3 electrically floating state, that is, non-conductive state, while the second control signal supplies a base current based on the second switching control signal which is the output signal from the switching control signal generator 19, to the 1st~3rd earth side output transistors 4~6. When a mode assignment signal indicates a decelerating mode and the selection signal indicates the third mode, a third control signal is outputted, which supplies a base current based on the second switching control signal which is the output signal from the switching control signal generator 19, to both the 1st~3rd power-supply side output transistors 1~3 and the 1st~3rd earth side output transistors 4~6.

The switching signal generator 18, the first activation signal generator 22, the switching control signal generator 19 and the base current supply means comprises a control signal generation circuit, which receives a motor location signal, a mode assignment signal which indicates either the accelerating mode or the decelerating mode and a selection signal which indicates either one of the 1st~3rd modes, and operates as follows. When a mode assignment signal indicates an accelerating mode, the base current based on the motor location signal is applied to both the 1st~3rd power-supply side output transistors 1~3 and the 1st~3rd earth side output transistors 4~6. When a mode assignment signal indicates a decelerating mode,either one of the first, the second and the third control signals is outputted to the respective base electrodes of the 1st~3rd power-supply side output transistors 1~3 and the 1st~3rd earth side output transistors 4~6, in accordance with the mode of the received selection signal. The first control signal, regardless of the received motor location signal, makes the 1st~3rd power-supply side output transistors 1~3 non-conductive state, while the first control signal makes the 1st~3rd earth side output transistors 4~6 conductive state. The second control signal, regardless of the received motor location signal, makes the 1st~3rd power-supply side output transistors 1~3 non-conductive state, while the second control signal gives the 1st~3rd earth side output transistors 4~6 a base current which generates a torque in the opposite direction to that of the forward torque in accordance with the received motor location signal. The third control signal supplies a base current, which generates a torque in the opposite direction to that of the forward torque in accordance with the received motor location signal, to both the 1st~3rd power-supply side output transistors 1~3 and the 1st~3rd earth side output transistors 4~6.

Figure 18:
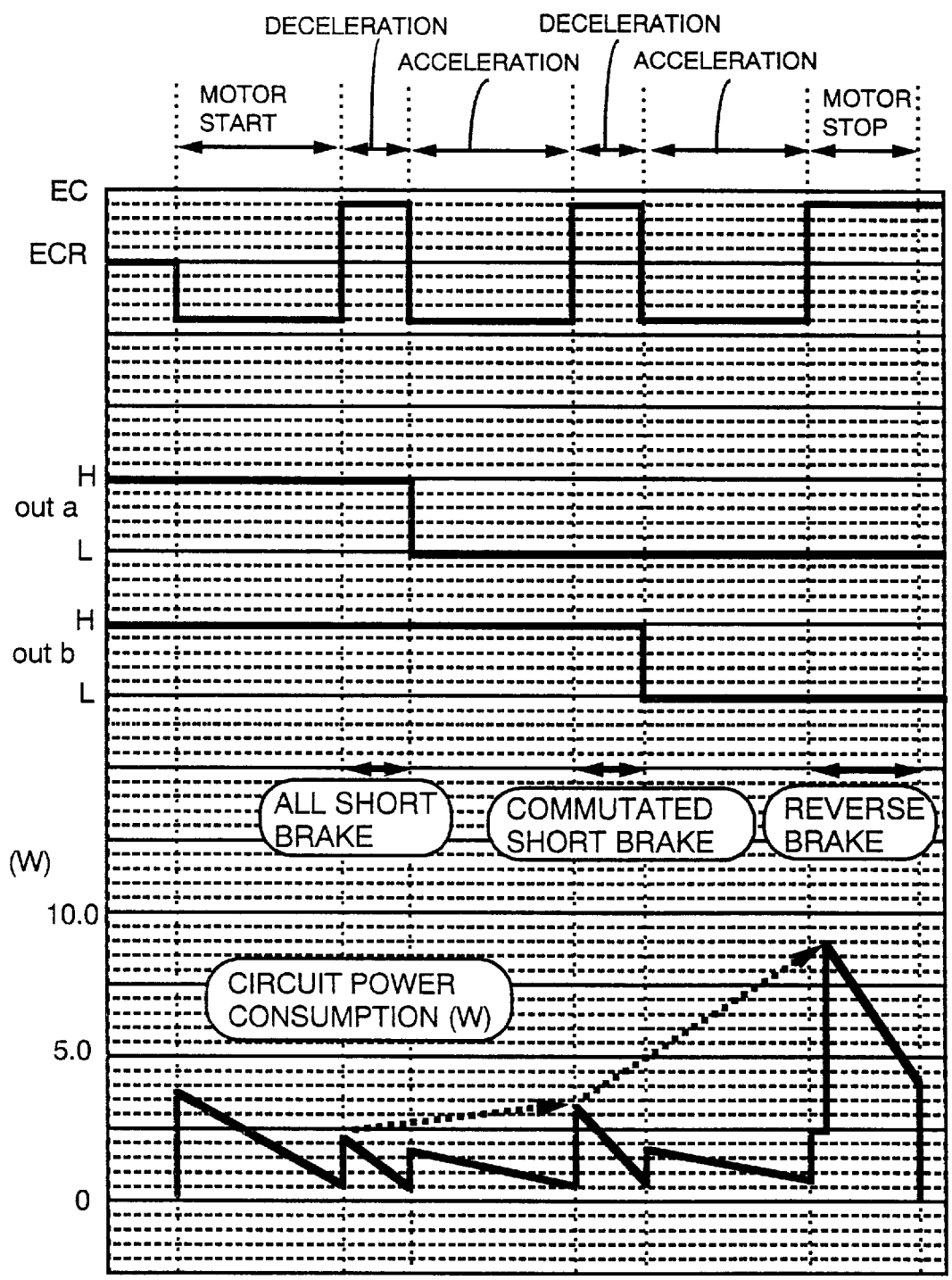
FIG. 18 is a timing chart showing a power consumption in a circuit during full stroke operation according to the third embodiment of the present invention.

Referring to FIG. 18, an operation of the motor driving circuit constructed in this way is explained below. FIG. 18 is a timing chart showing a motor control signal (EC), reference voltage (ECR), a selection signal (shown by either out a, or out b) from the selection signal output means 24 and the power consumption, during the motor start mode, the transition from the decelerating mode to the accelerating mode, the transition from the accelerating mode to the decelerating mode, and the motor stop mode.

In this third embodiment, four kinds of modes, namely, the accelerating mode period, the two kinds of periods in the decelerating mode period (the deceleration moving period by all-short-brake and the deceleration moving period by commutated-short-brake) and the motor stop period in the decelerating mode period, are decided, in accordance with the motor control signal (EC) which serves as a mode assignment signal, the reference voltage (ECR) and a selection signal from the selection signal output means 24.

First, on the accelerating mode period, namely, the motor start and the accelerating mode shown in FIG. 18 is explained. In the section A and the section B as shown in FIG. 33, for example, the motor control signal (EC) inputted into the control signal input node EC is at "L" level, and therefore a switching signal is applied from the switching signal generator 18 to the switching control signal generator 19 so that a current flows in the direction to generate a forward-direction torque (forward torque) in the motor coils of the spindle motor main body 11.

At the same time, a switching signal is applied to both the first and the second activation signal generators 22, 23 from the switching signal generator 18. Accordingly, both the first and the second activation signal generators 22, 23 output an activation signal which indicates an activated state, regardless of the value of the inputted selection signal, because the switching signal indicates an accelerating mode.

As a result, a first activation signal indicating an activated state is applied to the switching control signal generator 19 from the first activation signal generator 22, while a second activation signal indicating an activated state is applied to the power-supply side controller 20 from the second activation signal generator 23.

Since these states and the operation are the same as that of the first embodiment, a further explanation is omitted.

Accordingly, three kinds of modes in the decelerating mode period, which are the specific features in this third embodiment, are explained below.

In any three kinds of modes in this decelerating mode period, the motor control signal (EC) inputted into the control signal input node EC changes to "H" level so that a switching signal is applied from the switching signal generator 18 to the switching control signal generator 19 so that current flows to generate a torque in the opposite direction in the motor coils of the spindle motor main flame 11, as shown in the decelerating mode in FIG. 18. At the same time, a switching signal is applied to both the first and the second activation signal generators 22, 23.

[DECELERATION MOVING PERIOD BY ALL-SHORT-BRAKE]

In this period, a selection signal from the selection signal output means 24 is represented as [H, H]. Accordingly, receiving an "H" level selection signal from the selection signal input node a, the first activation signal generator 22 outputs a first activation signal which indicates a non-activated state to the switching control signal generator 19. Also, receiving an "H" level selection signal from the selection signal input node b, the second activation signal generator 23 outputs a second activation signal which indicates a non-activated state to the power-supply side controller 20.

Accordingly, the switching control signal generator 19 which receives the first activation signal indicating a non-activated state from the first activation signal generator 22 gives a predetermined electric potential to the both power-supply side and the earth side controllers 20, 21, regardless of the state of the switching state signal which is given to the location detection signal input nodes Hu+, Hu−, Hv+, Hv−, Hw+ and Hw−.

On the other hand, receiving the second activation signal indicating a non-activated state from the second activation signal generator 23, the power-supply side controller 20 makes the base electrodes of the 1st~3rd power-supply side output transistors 1~3 electrically floating state, that is, a non-conductive state, regardless of the predetermined electric potential from the switching control signal generator 19.

On the other hand, since the earth side controller 21 receives the second output signal from the output current controller 17 and a predetermined electric potential from the switching control signal generator 19, a predetermined base current flows to the earth side output power transistors 4~6 so that the earth side output power transistors 4~6 are always in conductive state during this period.

Accordingly, the power-supply side output power transistors 1~3 are always in non-conductive state, while the earth side output power transistors 4~6 are always in conductive state during this period. The deceleration is carried out in the same manner as the all-short-brake mentioned in the first embodiment.

[DECELERATION MOVING PERIOD BY THE COMMUTATED-SHORT-BRAKE]

In this period, a selection signal from the selection signal output means 24 is represented as [L, H]. Accordingly, receiving an "L" level selection signal from the selection signal input node a, the first activation signal generator 22 outputs a first activation signal which indicates an activated state to the switching control signal generator 19. Also, receiving an "H" level selection signal from the selection signal input node b, the second activation signal generator 23 outputs a second activation signal which indicates a non-activated state to the power-supply side controller 20.

Accordingly, receiving a switching signal which indicates a decelerating mode from the switching signal generator 18 and a first activation signal which indicates an activated state from the first activation signal generator 22, the signal generator 19 applies a second switching control signal to both the power-supply side and the earth side controllers 20, 21 so that a reverse torque is generated in the motor, in accordance with the switching state signal given to the location detection signal input node Hu+, Hu−, Hv+, Hv−, Hw+ and Hw−.

On the other hand, receiving the second activation signal indicating a non-activated state from the second activation signal generator 23, the power-supply side controller 20 makes the base electrodes of the 1st~3rd power-supply side output transistors 1~3 electrically floating state, that is, non-conductive state, regardless of the predetermined electric potential from the switching control signal generator 19.

Since the earth side controller 21 receives a second output signal from the output current controller 17 and a second switching control signal from the switching control signal generator 19, the base current based on the received second switching control signal flows to the earth side output power transistors 4~6 in accordance with the second output received. In other words, the earth side output power transistors 4~6 are in conductive state in accordance with the second switching control signal during this period.

Accordingly, the power-supply side output power transistors 1~3 are always in non-conductive state, while the earth side output power transistors 4~6 are always in conductive state during this period according to the second switching control signal. The deceleration is carried out in the same manner as the commutated-short-brake mentioned in the second embodiment.

[MOTOR STOP PERIOD]

In this period, a selection signal from the selection signal output means 24 is represented as [L, L]. Accordingly, receiving an "L" level selection signal from the selection signal input node a, the first activation signal generator 22 outputs a first activation signal which indicates an activated state to the switching control signal generator 19.

Also, receiving an "L" level selection signal from the selection signal input node b, the second activation signal generator 23 outputs a second activation signal which indicates an activated state to the power-supply side controller 20.

Accordingly, receiving a switching signal which indicates a decelerating mode from the switching signal generator 18 and a first activation signal which indicates an activated state from the first activation signal generator 22, the signal generator 19 applies a second switching control signal to both the power-supply side and the earth side controllers 20, 21 so that a reverse torque is generated in the motor, in accordance with the switching state signal given to the location detection signal input node Hu+, Hu−, Hv+, Hv−, Hw+ and Hw−.

Since the power-supply side controller 20 receives a first output signal from the output current controller 17 which has received an activation signal indicating an activated state from the second activation signal generator 23, and a second switching control signal from the switching control signal generator 19, a base current based on the received second switching control signal in accordance with the first output is supplied to the 1st~3rd power-supply side output transistors 1~3. In accordance with the second switching control signal, the 1st~3rd power-supply side output transistors 1~3 are in conductive state during this period.

Since the earth side controller 21 receives a second output signal from the output current controller 17 and a second switching control signal from the switching control signal generator 19, the base current based on the received second switching control signal is supplied to the earth side output power transistors 4~6 in accordance with the second output received. In other words, the earth side output power transistors 4~6 are in conductive state in accordance with the second switching control signal during this period.

Accordingly, both the power-supply side output power transistors 1~3 and the earth side output power transistors 4~6 are always in conductive state during this period according to the second switching control signal. The deceleration is carried out in the same manner as the reverse brake mentioned in the prior art.

The motor driving circuit constructed in this way gives the following effects.

First, in the deceleration moving period in case a small number of tracks are skipped in a decelerating mode period, the deceleration is carried out by all-short-brake. Accordingly, the thermal effect is reduced by reducing the power consumption in this decelerating period.

Second, in the deceleration moving period in case a large number of tracks are skipped in a decelerating mode period, the deceleration is carried out by commutated-short-brake. Accordingly, the thermal effect is reduced by shortening the decelerating time so that the power consumption in the decelerating period is reduced.

Third, in the motor stop period to stop the motor in a decelerating mode period, the deceleration is carried out by reverse brake. Accordingly, a motor is stopped in a short time.

Embodiment 4

Figure 19:
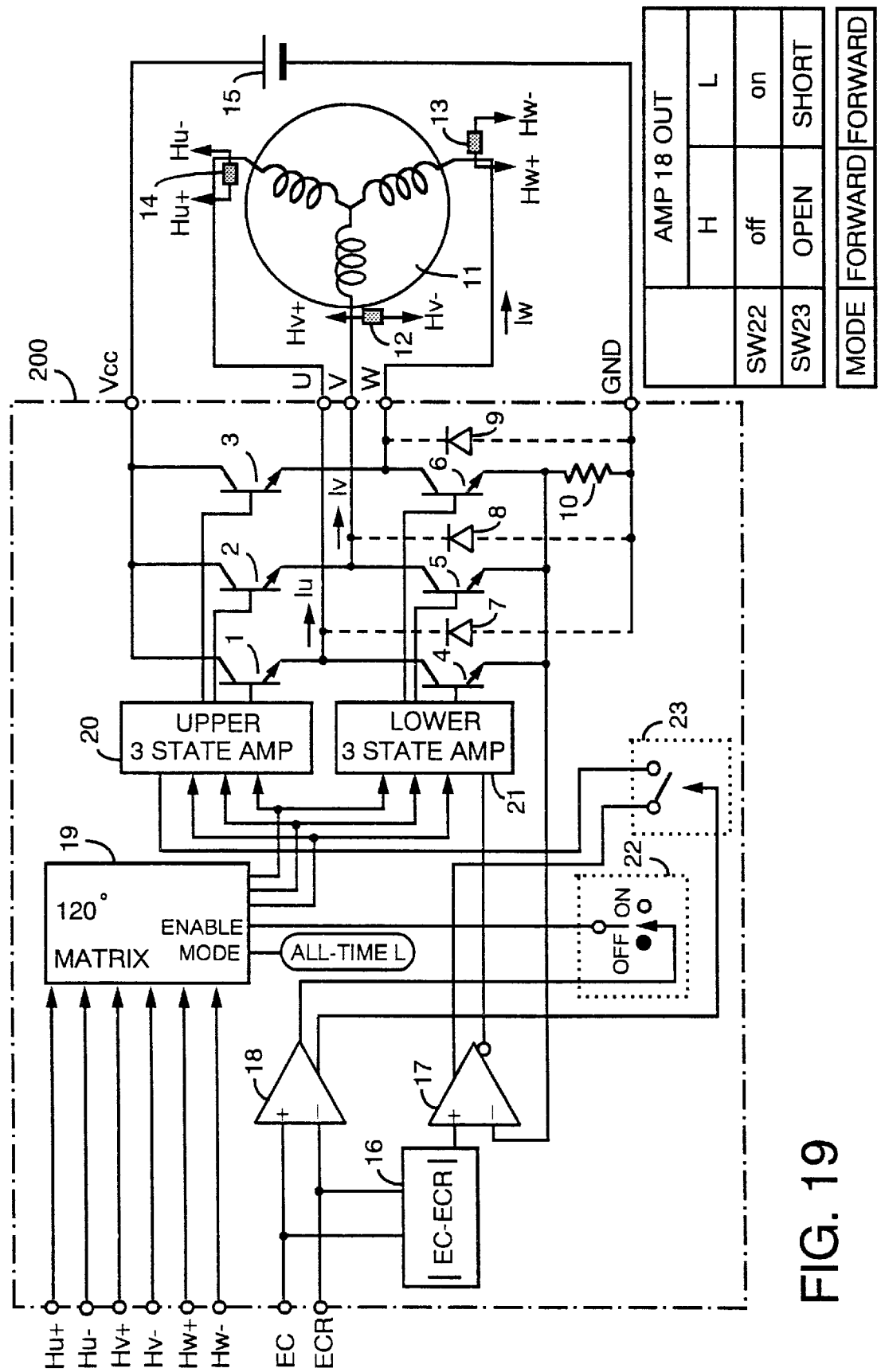
FIG. 19 is a circuit diagram according to a fourth embodiment of the present invention.

FIG. 19 shows a third embodiment of this invention. In FIG. 19, the elements having the same reference numbers in FIG. 1 are the same portions or the corresponding portions in FIG. 1. In FIG. 19, a switching control signal generator 19 receives a motor location signal from the location detection Hall effect sensors 12~14, and a first activation signal from the first activation signal generator 22. An "ON" signal is always given to a mode terminal of the switching control signal generator 19, in other words, the mode terminal is connected to the power-supply electric potential node, for example. When a first activation signal from the first activation signal generator 22 indicates an activated state, in other words, when an accelerating mode is indicated, the switching control signal generator 19 outputs a first switching control signal based on the motor location signal. When a first activation signal from the first activation signal generator 22 indicates a non-activated state, in other words, when a decelerating mode is indicated, the switching control signal generator 19 outputs a predetermined electric potential, namely, the electric potential between the power supply electric potential and the earth electric potential in case of this fourth embodiment, regardless of the motor location signal. The switching control signal generator 19 comprises input nodes connected to the location detection signal input nodes Hu+, Hu−, Hv+, Hv−, Hw+ and Hw−, and three output nodes corresponding to respective U, V and W phases.

An operation of the motor driving circuit constructed in this way is explained below. First, the accelerating mode period is explained below. Since the motor control signal (EC) inputted into the control signal input node EC is at "L" level, the switching signal generator 18 outputs a switching signal which controls both the first and the second activation signal generators 22, 23 to output the first and the second activation signals, respectively, both of which indicate activated states.

As a result, a first activation signal which indicates an activated state is applied to the switching control signal generator 19 from the first activation signal generator 22, while a second activation signal which indicates an activated state is applied to the power-supply side controller 20 from the second activation signal generator 23.

Moreover, since an "H" level electric potential which indicates an activated state is given to the mode terminal of the switching control signal generator 19, it is substantially the same as the state that a switching signal indicating an accelerating mode is inputted from the switching signal generator 18.

This is the same state and operates in the same manner as those described in the first embodiment A decelerating mode period is explained below. Since the motor control signal (EC) inputted into the control signal input node EC is at "H" level, the switching signal generator 18 outputs a switching signal which controls both the first and the second activation signal generators 22, 23 to output the first and the second activation signals, respectively, both of which indicate non-activated states.

As a result, a first activation signal which indicates a non-activated state is applied to the switching control signal generator 19 from the first activation signal generator 22, while a second activation signal which indicates a non-activated state is applied to the power-supply side controller 20 from the second activation signal generator 23.

Accordingly, the switching control signal generator 19 which receives the first activation signal indicating a non-activated state from the first activation signal generator 22 gives a predetermined electric potential to the both power-supply side and the earth side controllers 20, 21, regardless of the state of the switching state signal which is given to the location detection signal input nodes Hu+, Hu−, Hv+, Hv−, Hw+ and Hw−.

On the other hand, receiving the second activation signal indicating a non-activated state from the second activation signal generator 23, the power-supply side controller 20 makes the base electrodes of the 1st~3rd power-supply side output transistors 1~3 electrically floating state, that is, non-conductive state, regardless of the predetermined electric potential from the switching control signal generator 19.

On the other hand, since the earth side controller 21 receives the second output signal from the output current controller 17 and a predetermined electric potential from the switching control signal generator 19, a predetermined base current flows to the earth side output power transistors 4~6 so that the earth side output power transistors 4~6 are always in conductive state during this period.

Accordingly, the power-supply side output power transistors 1~3 are always in non-conductive state, while the earth side output power transistors 4~6 are always in conductive state during this period. The motor driving circuit constructed in this way gives the same effects as those in the first embodiment.

Embodiment 5

Figure 20A:
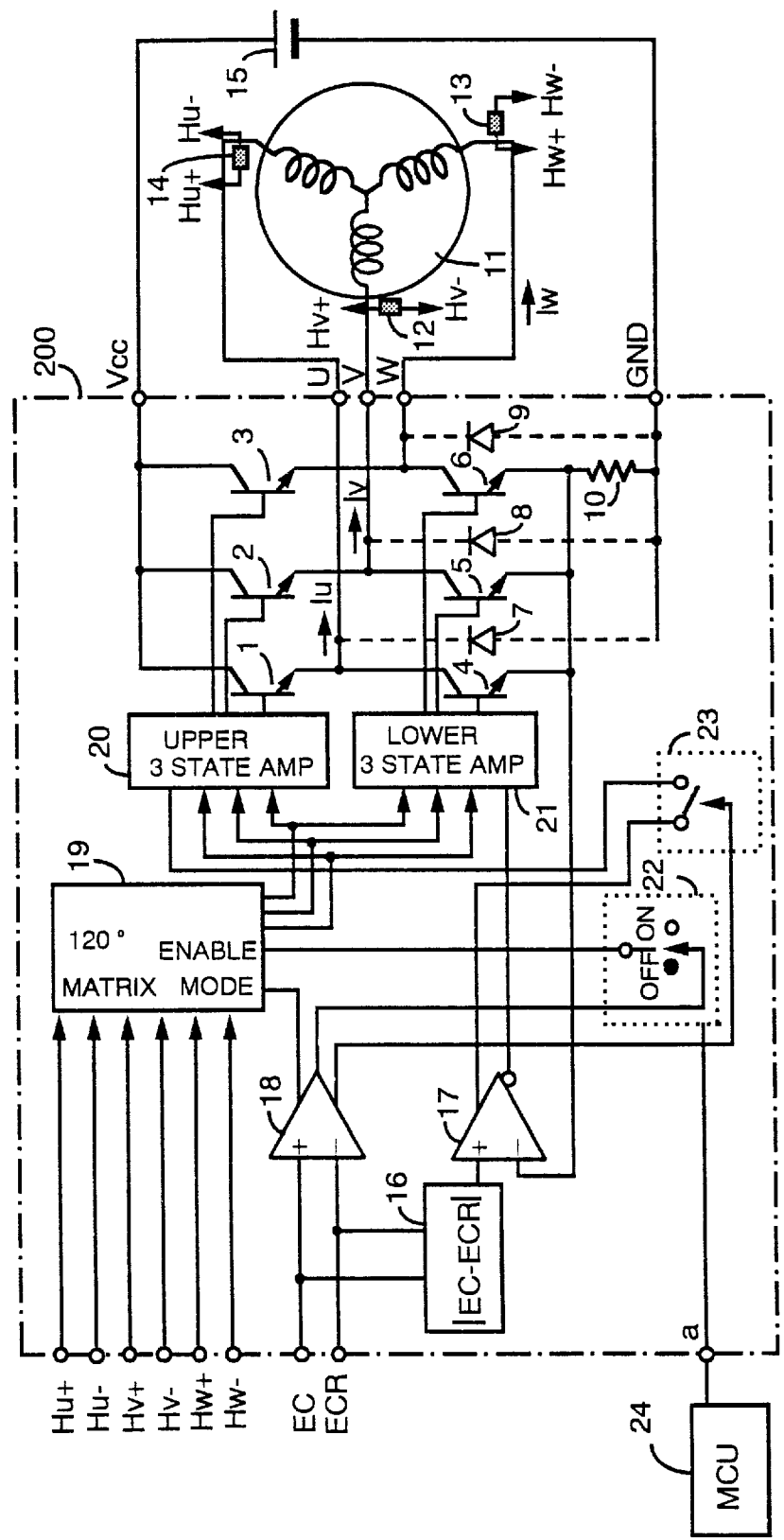
FIGS. 20A, B and C are circuit diagrams according to a fifth embodiment of the present invention.

FIGS. 20A, B and C show a fifth embodiment of this invention. In FIG. 20, the elements having the same reference numbers in FIG. 1 are the same portions or the corresponding portions in FIG. 1. In FIG. 20A, a selection signal input node a for the motor driving circuit receives a selection signal. A selection signal output means 24 outputs a selection signal, which indicates the decelerating mode which including a first mode and a second mode, to the selection signal input node a. The selection signal output means 24 consists of a microprocessor, for example, which is defined separately on another semiconductor integrated circuit where the semiconductor integrated circuit comprising the motor driving circuit is formed.

In this fifth embodiment, the above mentioned selection signal is explained below. In other words, during a first mode in the decelerating mode, the selection signal indicates all-short-brake mode, which is represented by [H], for example. This first mode is used during the deceleration moving period in the decelerating mode period.

During a second mode in the decelerating mode, the selection signal indicates the commutated-short-brake mode, which is represented by [L], for example. This second mode is used in the stop period to stop the rotation of the motor, in the decelerating mode period.

A first activation signal generator 22 receives a switching signal from the switching signal generator 18 and a selection signal inputted via the selection signal input node a from the selection signal output means 24, and outputs a first activation signal which has a specific feature as follows. The first activation signal indicates an activated state when the received switching signal indicates the accelerating mode or when the switching signal indicates the decelerating mode and the received selection signal indicates the second mode, in other words, an "L" level signal is inputted to the selection signal input node a. The first activation signal indicates a non-activated state when the received switching signal indicates the decelerating mode and the received selection signal indicates the first mode, in other words, an "H" level signal is inputted to the selection signal input node a. In the same manner as the first embodiment, the first activation signal generator 22 consists of switching elements comprising a bipolar transistor and so on, which outputs a first activation signal by connecting the power supply electric potential node to the "on" side in FIG. 20A when the signal indicates an activated state, and by connecting the earth electric potential node to the "off" side in FIG. 20A when the signal indicates a non-activated state.

A switching control signal generator 19 receives a motor location signal from the location detection hole sensors 12~14, a switching signal from the switching signal generator 18 and a first activation signal from the first activation signal generator 22. The switching control signal generator 19 outputs a first switching control signal based on the motor location signal when the received switching signal indicates an accelerating mode and the first activation signal from the first activation signal generator 22 indicates an activated state. The switching control signal generator 19 outputs a second switching control signal which changes in the opposite sequence to that of the first switching control signal in accordance with the motor location signal, when the received switching signal indicates a decelerating mode and the first activation signal from the first activation signal generator 22 indicates an activated state. The switching control signal generator 19 outputs a predetermined electric potential, namely, the electric potential between the power supply electric potential applied to the power supply electric potential node Vcc and the earth electric potential applied to the earth electric potential node GND in case of the fifth embodiment, regardless of the motor location signal, when the received switching signal indicates a decelerating mode and the first activation signal from the first activation signal generator 22 indicates a non-activated state. The switching control signal generator 19 comprises input nodes connected to the location detection signal input nodes Hu+, Hu–, Hv+, Hv–, Hw+ and Hw–, and three output nodes corresponding to respective U, V and W phases.

The output current controller 17, the second activation signal generator 23, the power-supply side controller 20 and the earth side controller 21 constitute a base current supply means which receives the output signal from the switching control signal generator 19 and operates as follows. When a mode assignment signal indicates an accelerating mode, a base current based on the first switching control signal which is the output signal from the switching control signal generator 19, is given to both the 1st~3rd power-supply side output transistors 1~3 and the 1st~3rd earth side output transistors 4~6. When a mode assignment signal indicates a decelerating mode and the selection signal indicates the first mode, the first control signal is outputted, which makes the 1st~3rd power-supply side output transistors 1~3 electrically floating state, that is, non-conductive state, while the first control signal gives a base current based on a predetermined electric potential which is the output signal from the switching control signal generator 19, to the 1st~3rd earth side output transistors 4~6. When a mode assignment signal indicates a decelerating mode and the selection signal indicates the second mode, the second control signal is outputted, which makes the 1st~3rd power-supply side output transistors 1~3 electrically floating state, that is, non-conductive state, while the first control signal supplies a base current based on the second switching control signal which is the output signal from the switching control signal generator 19, to the 1st~3rd earth side output transistors 4~6.

The switching signal generator 18, the first activation signal generator 22, the switching control signal generator 19 and the base current supply means comprise a control signal generation circuit, which receives a motor location signal, a mode assignment signal which indicates either the accelerating mode or the decelerating mode and a selection signal which indicates either the first mode or the second mode, and which operates as follows. When a mode assignment signal indicates an accelerating mode, the a base current based on the motor location signal is applied to both the 1st~3rd power-supply side output transistors 1~3 and the 1st~3rd earth side output transistors 4~6. When a mode assignment signal indicates a decelerating mode, either the first or the second control signal is outputted to the respective base electrodes of the 1st~3rd power-supply side output transistors 1~3 and the 1st~3rd earth side output transistors 4~6, in accordance with the mode of the received selection signal. The first control signal, regardless of the received motor location signal, makes the 1st~3rd power-supply side output transistors 1~3 non-conductive state, while the first control signal makes the 1st~3rd earth side output transistors 4~6 conductive state. The second control signal, regardless of the received motor location signal, makes the 1st~3rd power-supply side output transistors 1~3 non-conductive state, while the second control signal supplies a base current, which generates a torque in the opposite direction to that of the forward torque, to the 1st~3rd earth side output transistors 4~6 in accordance with the received motor location signal.

Figure 21:
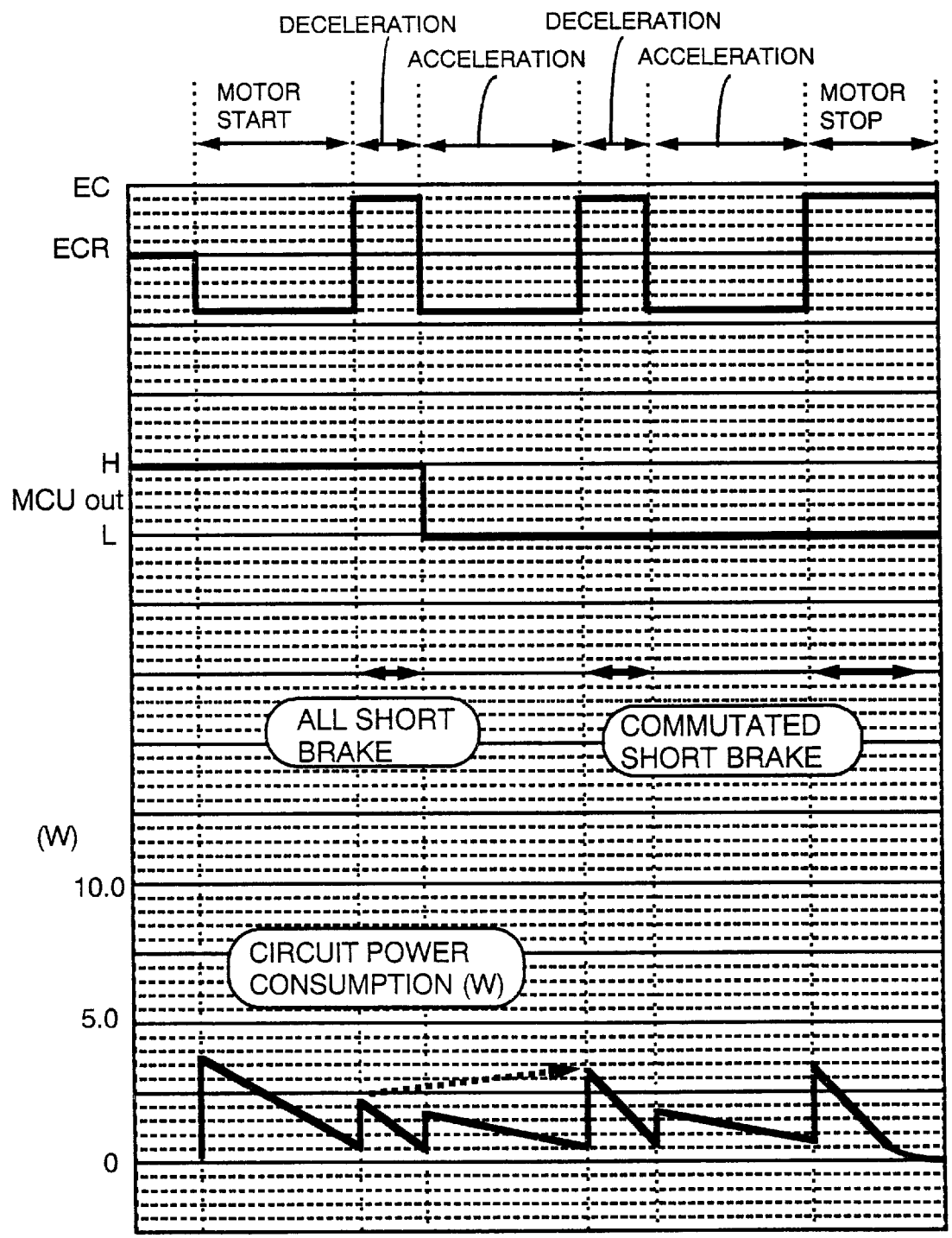
FIG. 21 is a timing chart showing a power consumption in a circuit during full stroke operation according to the fifth embodiment of the present invention.

Referring to FIG. 21, an operation of the motor driving circuit constructed in this way is explained below. FIG. 21 is a timing chart showing a motor control signal (EC), reference voltage (ECR), a selection signal from the selection signal output means 24 and the power consumption of the circuit, in the respective modes of the motor start, the transition from the decelerating mode to the accelerating mode, the transition from the accelerating mode to the decelerating mode, and the motor stop mode.

In this fifth embodiment, the accelerating mode period, the deceleration moving period (by all-short-brake) in the decelerating mode period and the motor stop period (by commutated-short-brake) in the decelerating mode period are selected, in accordance with the motor control signal (EC) which serves as a mode assignment signal, the reference voltage (ECR) and a selection signal from the selection signal output means 24.

First, the accelerating mode period, namely, the motor start shown in FIG. 21 is explained. In the section A and the section B as shown in FIG. 33, for example, the motor control signal (EC) inputted into the control signal input node EC is at "L" level, and then a switching signal is applied from the switching signal generator 18 to the switching control signal generator 19 so that current flows in the direction to generate a forward-direction torque (forward torque) in the motor coils of the spindle motor main body 11.

At the same time, a switching signal is applied to both the first and the second activation signal generators 22, 23 from the switching signal generator 18. Accordingly, both the first and the second activation signal generators 22, 23 output activation signals which indicate activated states, regardless of the value of the inputted selection signal, because the switching signal indicates an accelerating mode.

As a result, a first activation signal indicating an activated state is applied to the switching control signal generator 19 from the first activation signal generator 22, while a second activation signal indicating a non-activated state is applied to the power-supply side controller 20 from the second activation signal generator 23.

This is the same state and operates in the same manner as those described in the first embodiment.

The deceleration moving period and the motor stop period in the decelerating mode period, which are the specific features in this fifth embodiment, are explained below.

In the deceleration moving period and the motor stop period in this decelerating mode period, the motor control signal (EC) inputted into the control signal input node EC changes into "H" level in which a switching signal is applied from the switching signal generator 18 to the switching control signal generator 19 so that the current flows to generate a torque in the opposite direction in the motor coils of the spindle motor main flame 11, as shown in the decelerating mode in FIG. 18. At the same time, a switching signal is applied to both the first and the second activation signal generators 22, 23 from the switching signal generator 18.

[DECELERATION MOVING PERIOD]

In this period, a selection signal from the selection signal output means 24 is represented as [H]. Accordingly, receiving an "H" level selection signal from the selection signal input node a, the first activation signal generator 22 outputs a first activation signal which indicates a non-activated state to the switching control signal generator 19. Also, receiving a switching signal which indicates a decelerating mode from the switching signal generator 18, the second activation signal generator 23 outputs a second activation signal which indicates a non-activated state to the power-supply side controller 20.

Accordingly, the switching control signal generator 19 which receives the first activation signal indicating a non-activated state from the first activation signal generator 22 gives a predetermined electric potential to the both power-supply side and the earth side controllers 20, 21, regardless of the state of the switching state signal which is given to the location detection signal input nodes Hu+, Hu−, Hv+, Hv−, Hw+ and Hw−.

On the other hand, receiving the second activation signal indicating a non-activated state from the second activation signal generator 23, the power-supply side controller 20 makes the base electrodes of the 1st~3rd power-supply side output transistors 1~3 electrically floating state, that is, non-conductive state, regardless of the predetermined electric potential from the switching control signal generator 19.

On the other hand, since the earth side controller 21 receives the second output signal from the output current controller 17 and a predetermined electric potential from the switching control signal generator 19, a predetermined base current flows into the earth side output power transistors 4~6 so that the earth side output power transistors 4~6 are always in conductive state during this period.

Accordingly, the power-supply side output power transistors 1~3 are always in non-conductive state, while the earth side output power transistors 4~6 are always in conductive state during this period. The deceleration is carried out in the same manner as the all-short-brake mentioned in the first embodiment.

[MOTOR STOP PERIOD]

In this period, a selection signal from the selection signal output means 24 is represented as [L]. Accordingly, receiving an "L" level selection signal from the selection signal input node a, the first activation signal generator 22 outputs a first activation signal which indicates an activated state to the switching control signal generator 19. Also, receiving a switching signal which indicates a decelerating mode from the switching signal generator 18, the second activation signal generator 23 outputs a second activation signal which indicates an activated state to the power-supply side controller 20.

Accordingly, receiving a switching signal which indicates a decelerating mode from the switching signal generator 18 and a first activation signal which indicates an activated state from the first activation signal generator 22, the signal generator 19 applies a second switching control signal to both the power-supply side and the earth side controllers 20, 21 so that a reverse torque is generated in the motor, in accordance with the switching state signal given to the location detection signal input node Hu+, Hu−, Hv+, Hv−, Hw+ and Hw−.

On the other hand, receiving the second activation signal indicating a non-activated state from the second activation signal generator 23, the power-supply side controller 20 makes the base electrodes of the 1st~3rd power-supply side output transistors 1~3 electrically floating state, that is, non-conductive state, regardless of the predetermined electric potential from the switching control signal generator 19.

Since the earth side controller 21 receives a second output signal from the output current controller 17 and a second switching control signal from the switching control signal generator 19, the base current based on the received second switching control signal flows to the earth side output power transistors 4~6 in accordance with the second output received. In other words, the earth side output power transistors 4~6 are in conductive state in accordance with the second switching control signal during this period.

Accordingly, the power-supply side output power transistors 1~3 are always in non-conductive state, while the earth side output power transistors 4~6 are always in conductive state during this period according to the second switching control signal. The deceleration is carried out in the same manner as the commutated-short-brake mentioned in the second embodiment.

The motor driving circuit constructed in this way gives the following effects.

First, in the deceleration moving period in a decelerating mode period, the deceleration is carried out by all-short-brake. Accordingly, thermal effect is reduced by reducing the power consumption in this decelerating period.

Second, in the motor stop period to stop the motor in a decelerating mode period, the deceleration is carried out by commutated-short-brake. Accordingly, thermal effect is reduced by shortening the decelerating time so that the power consumption in the decelerating period is reduced.

Embodiment 6

Figure 22A:
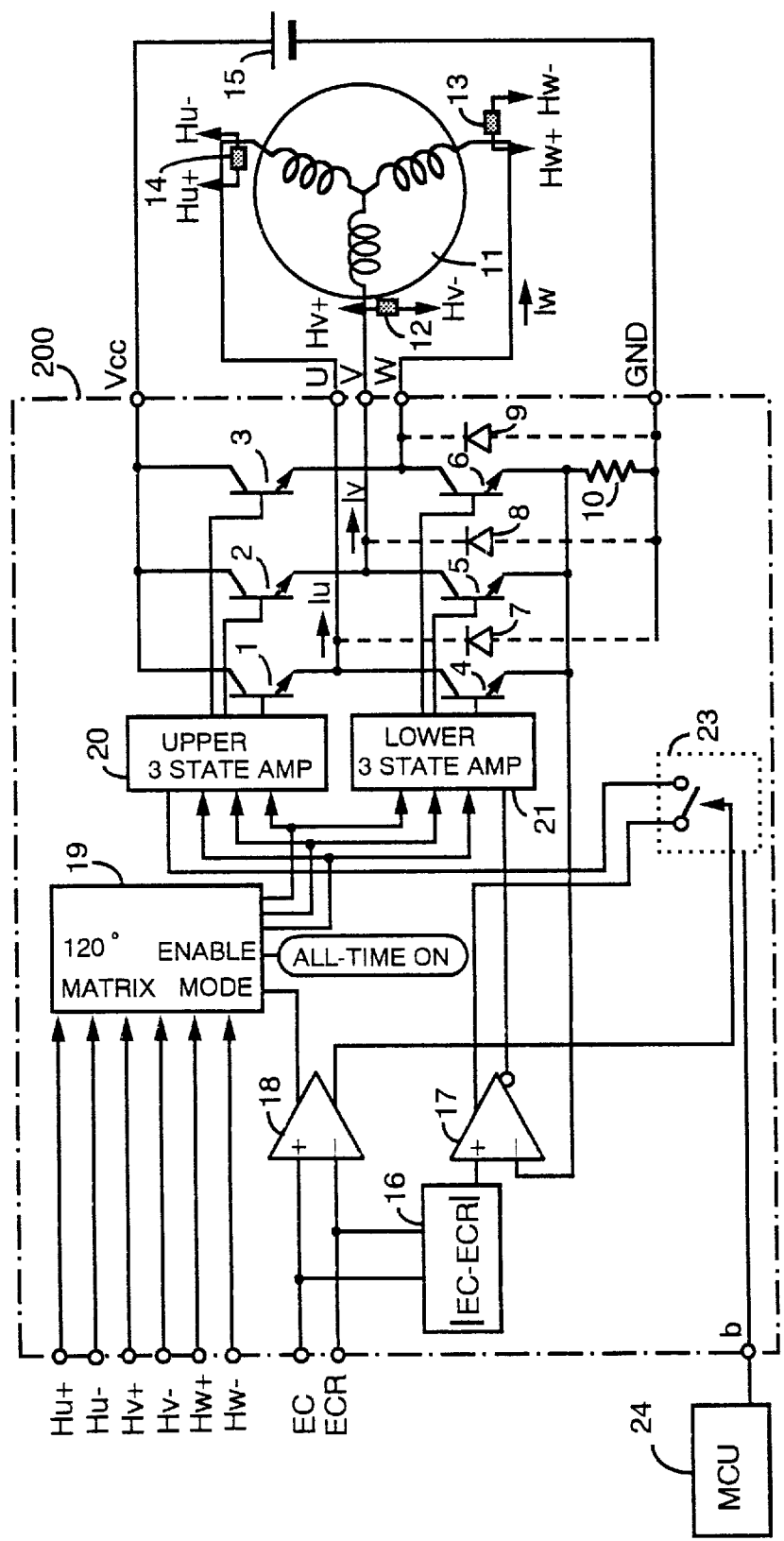
FIGS. 22A, B and C are circuit diagrams according to a sixth embodiment of the present invention.

FIGS. 22A, B and C show a sixth embodiment of this invention. In FIG. 22A, the same reference numbers as those in FIG. 1 shown in the first embodiment show the same or considerable portions as those in FIG. 1. In FIG. 22A, a selection signal input node b for the motor driving circuit receives a selection signal. A selection signal output means 24 outputs a selection signal which indicates the decelerating mode which includes a first and a second modes to the selection signal input node b. The selection signal output means 24 consists of a micro processor, for example, which is separately defined in another semiconductor integrated circuit where the semiconductor integrated circuit comprising the motor driving circuit is formed.

In this sixth embodiment, the above mentioned selection signal is explained below. In other words, during a first mode in the decelerating mode, the selection signal indicates the commutated-short-brake mode as shown in FIG. 22B, which is represented by [H], for example. This first mode is used during the deceleration moving period in the decelerating mode period.

During a second mode in the decelerating mode, the selection signal indicates the mode of reverse brake, which is represented by [L] as shown in FIG. 22B, for example. This second mode is used in the stop period to stop the rotation of the motor, in the decelerating mode period.

A switching control signal generator 19 receives a motor location signal from the location detection hole sensors 12~14 and a switching signal from the switching signal generator 18. The switching control signal generator 19 is always given an ON signal on its enable terminal, by connecting the enable terminal to a power-supply electric potential node, for example. When a switching signal from the switching signal generator 18 indicates the accelerating mode, the switching control signal generator 19 outputs a first switching control signal based on the motor location signal, while the switching control signal generator 19 outputs a second switching control signal which changes in the opposite sequence to the first switching signal, in accordance with the motor location signal, when the decelerating mode is indicated. The switching control signal generator 19 comprises input nodes connected to the location detection signal input nodes Hu+, Hu−, Hv+, Hv−, Hw+ and Hw−, and three output nodes corresponding to respective U, V and W phases.

An activation signal generator 23 receives a first output signal from the output current controller 17, a switching signal from the switching signal generator 18 and a selection signal inputted via the selection signal input node b from the selection signal output means 24 for outputting an activation signal which has a specific feature as follows. When the received switching signal indicates an accelerating mode, or when the switching signal indicates decelerating mode and the received selection signal indicates the second mode, namely, when an "L" level signal is inputted to the selection signal input node b, the activation signal indicates an activated state for supplying base current in accordance with the received output signal from the output current supply means 17. When the received switching signal indicates a decelerating mode and the selection signal indicates the first mode, namely, when an "H" level signal is inputted to the selection signal input node b, the activation signal indicates a non-activated state. The activation signal generator 23 consists of switching elements comprising a bipolar transistor and so on, which operates as follows, like the above-mentioned first embodiment. When the activated state is indicated, the bipolar transistor is connected to the first output terminal from the output current controller 17, while the conductive is broken when the non-activated state is indicated.

The output current controller 17, the second activation signal generator 23, the power-supply side controller 20 and the earth side controller 21 constitute a base current supply means which receives the output signal from the switching control signal generator 19 and operates as follows. When a mode assignment signal indicates an accelerating mode, a base current based on the first switching control signal which is the output signal from the switching control signal generator 19, is given to both the 1st~3rd power-supply side output transistors 1~3 and the 1st~3rd earth side output transistors 4~6. When a mode assignment signal indicates a decelerating mode and the selection signal indicates the first mode, the first control signal is outputted, which makes the 1st~3rd power-supply side output transistors 1~3 electrically floating state, that is, non-conductive state, while which supplies a base current based on a second switching control signal which is the output signal from the switching control signal generator 19, to the 1st~3rd earth side output transistors 4~6. When a mode assignment signal indicates a decelerating mode and the selection signal indicates the second mode, the second control signal is outputted, which supplies a base current based on the second switching control signal which is the output signal from the switching control signal generator 19, to both the 1st~3rd power-supply side output transistors 1~3 and the 1st~3rd earth side output transistors 4~6.

The switching signal generator 18, the switching control signal generator 19 and the base current supply means comprise a control signal generation circuit, which receives a motor location signal, a mode assignment signal which indicates either the accelerating mode or the decelerating mode and a selection signal which indicates either the first or the second mode, and which operates as follows. When a mode assignment signal indicates an accelerating mode, the base current based on the motor location signal is applied to both the 1st~3rd power-supply side output transistors 1~3 and the 1st~3rd earth side output transistors 4~6. When a mode assignment signal indicates a decelerating mode,either the first or the second control signal is outputted to the respective base electrodes of the 1st~3rd power-supply side output transistors 1~3 and the 1st~3rd earth side output transistors 4~6, in accordance with the mode of the received selection signal. The first control signal, regardless of the received motor location signal, makes the 1st~3rd power-supply side output transistors 1~3 non-conductive state, while the first control signal gives the 1st~3rd earth side output transistors 4~6 base current which generates a torque in the opposite direction to that of the forward torque, in accordance with the received motor location signal. The second control signal, in accordance with the received motor location signal, supplies a base current which generates a torque in the opposite direction to that of the forward torque to both the 1st~3rd power-supply side output transistors 1~3 and the 1st~3rd earth side output transistors 4~6.

Figure 23:
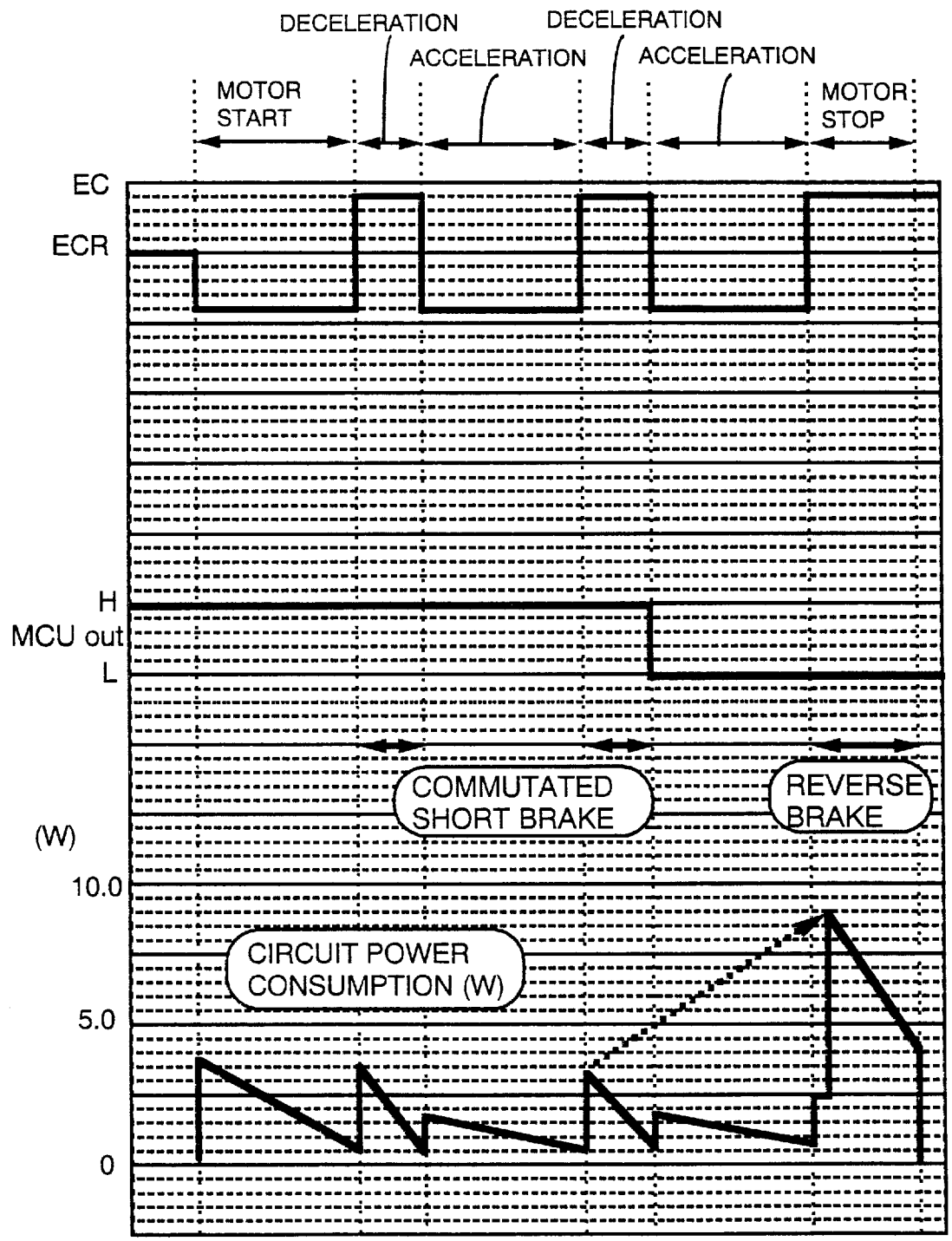
FIG. 23 is a timing chart showing a power consumption in a circuit during full stroke operation according to the sixth embodiment of the present invention.

Referring to FIG. 23, an operation of the motor driving circuit constructed in this way is explained below. FIG. 23 is a timing chart showing a motor control signal (EC), reference voltage (ECR), a selection signal from the selection signal output means 24 and the power consumption, in the respective modes of the motor start, the transition from the decelerating mode to the accelerating mode, the transition from the accelerating mode to the decelerating mode, and the motor stop mode.

In this sixth embodiment, the accelerating mode period, the deceleration moving period in the decelerating mode period (by commutated-short-brake) and the motor stop period (by reverse brake) in the decelerating mode period are selected, in accordance with the motor control signal (EC) which serves as a mode assignment signal, the reference voltage (ECR) and a selection signal from the selection signal output means 24.

First, an accelerating mode period, namely, the motor start and the accelerating mode period shown in FIG. 23, is explained. In the section A and the section B as shown in FIG. 33, for example, the motor control signal (EC) inputted into the control signal input node EC is at "L" level, and a switching signal is applied from the switching signal generator 18 to the switching control signal generator 19 so that current flows in the direction to generate a forward-direction torque (forward torque) in the motor coils of the spindle motor main body 11.

At the same time, a switching signal is applied to the activation signal generator 23 from the switching signal generator 18. Accordingly, the activation signal generator 23 output an activation signal which indicates an activated state, regardless of the value of the inputted selection signal, because the switching signal indicates an accelerating mode.

As a result, the switching control signal generator 19 is given a switching signal which indicates an accelerating mode from the switching signal generator 18, and an "H"

level electric potential which indicates an activated state on its enable terminal. The power-supply side controller 20 is given an activation signal which indicates an activated state from the activation signal generator 23. This is the same state and operates in the same manner as those described in the first embodiment.

The deceleration moving period and the motor stop period in the decelerating mode period, which are the specific features in this sixth embodiment, are explained below. In the deceleration moving period and the motor stop period in this decelerating mode period, the motor control signal (EC) inputted into the control signal input node EC changes into "H" level, and a switching signal is applied from the switching signal generator 18 to the switching control signal generator 19 so that current flows in the direction to generate a counter-direction torque in the motor coils of the spindle motor main flame 11, as shown in the decelerating mode in FIG. 23. At the same time, a switching signal is applied to both the first and the second activation signal generator 23 from the switching signal generator 18.

[DECELERATION MOVING PERIOD]

In this period, a selection signal from the selection signal output means 24 is represented as [H]. Accordingly, receiving an "H" level selection signal from the selection signal input node b, the activation signal generator 23 outputs an activation signal which indicates a non-activated state to the power-supply side controller 20.

Accordingly, receiving a switching signal which indicates a decelerating mode from the switching signal generator 18 and an "H" level electric potential which indicates an activated state on its enable terminal, the signal generator 19 applies a second switching control signal to the power-supply side controller 20 as well as the earth side controller 21 so that a reverse torque is generated in the motor, in accordance with the switching state signal given to the location detection signal input node Hu+, Hu−, Hv+, Hv−, Hw+ and Hw−.

On the other hand, receiving the activation signal indicating a non-activated state from the activation signal generator 23, the power-supply side controller 20 makes the base electrodes of the 1st~3rd power-supply side output transistors 1~3 electrically floating state, that is, non-conductive state, regardless of the second switching control signal from the switching control signal generator 19.

Since the earth side controller 21 receives a second output signal from the output current controller 17 and a second switching control signal from the switching control signal generator 19, the base current based on the received second switching control signal flows to the earth side output power transistors 4~6 in accordance with the second output received. In other words, the earth side output power transistors 4~6 are in conductive state in accordance with the second switching control signal during this period.

Accordingly, the power-supply side output power transistors 1~3 are always in non-conductive state, while the earth side output power transistors 4~6 are always in conductive state during this period according to the second switching control signal. The deceleration is carried out in the same manner as the commutated-short-brake mentioned in the second embodiment.

[MOTOR STOP PERIOD]

In this period, a selection signal from the selection signal output means 24 is represented as [L]. Accordingly, receiving an "L" level selection signal from the selection signal input node b, the activation signal generator 23 outputs an activation signal which indicates an activated state to the power-supply side controller 20.

Accordingly, receiving a switching signal which indicates a decelerating mode from the switching signal generator 18 and an "H" level electric potential which indicates an activated state on its enable terminal, the signal generator 19 applies a second switching control signal to the power-supply side as well as the earth side controllers 20, 21 so that a reverse torque is generated in the motor, in accordance with the switching state signal given to the location detection signal input node Hu+, Hu−, Hv+, Hv−, Hw+ and Hw−.

Since the power-supply side controller 20 receives a first output signal from the output current controller 17 which is an activation signal indicating an activated state from the activation signal generator 23, and a second switching control signal from the switching control signal generator 19, a base current based on the received second switching control signal in accordance with the first output flows to the 1st~3rd power-supply side output transistors 1~3. In accordance with the second switching control signal, the 1st~3rd power-supply side output transistors 1~3 are in conductive state during this period.

Since the earth side controller 21 receives a second output signal from the output current controller 17 and a second switching control signal from the switching control signal generator 19, the base current based on the received second switching control signal flows to the earth side output power transistors 4~6 in accordance with the second output received. In other words, the earth side output power transistors 4~6 are in conductive state in accordance with the second switching control signal during this period.

Accordingly, both the power-supply side output power transistors 1~3 and the earth side output power transistors 4~6 are always in conductive state during this period according to the second switching control signal. The deceleration is carried out in the same manner as the reverse brake mentioned in the prior art.

The motor driving circuit constructed in this way gives the following effects. First, in a decelerating mode period, the deceleration is carried out by commutated-short-brake. Accordingly, thermal effect is reduced by shortening the decelerating time so that the power consumption in the decelerating period is reduced. Second, in the motor stop period to stop the motor in a decelerating mode period, the deceleration is carried out by reverse brake. Accordingly, a motor is stopped in a short time.

Embodiment 7

Figure 24A:
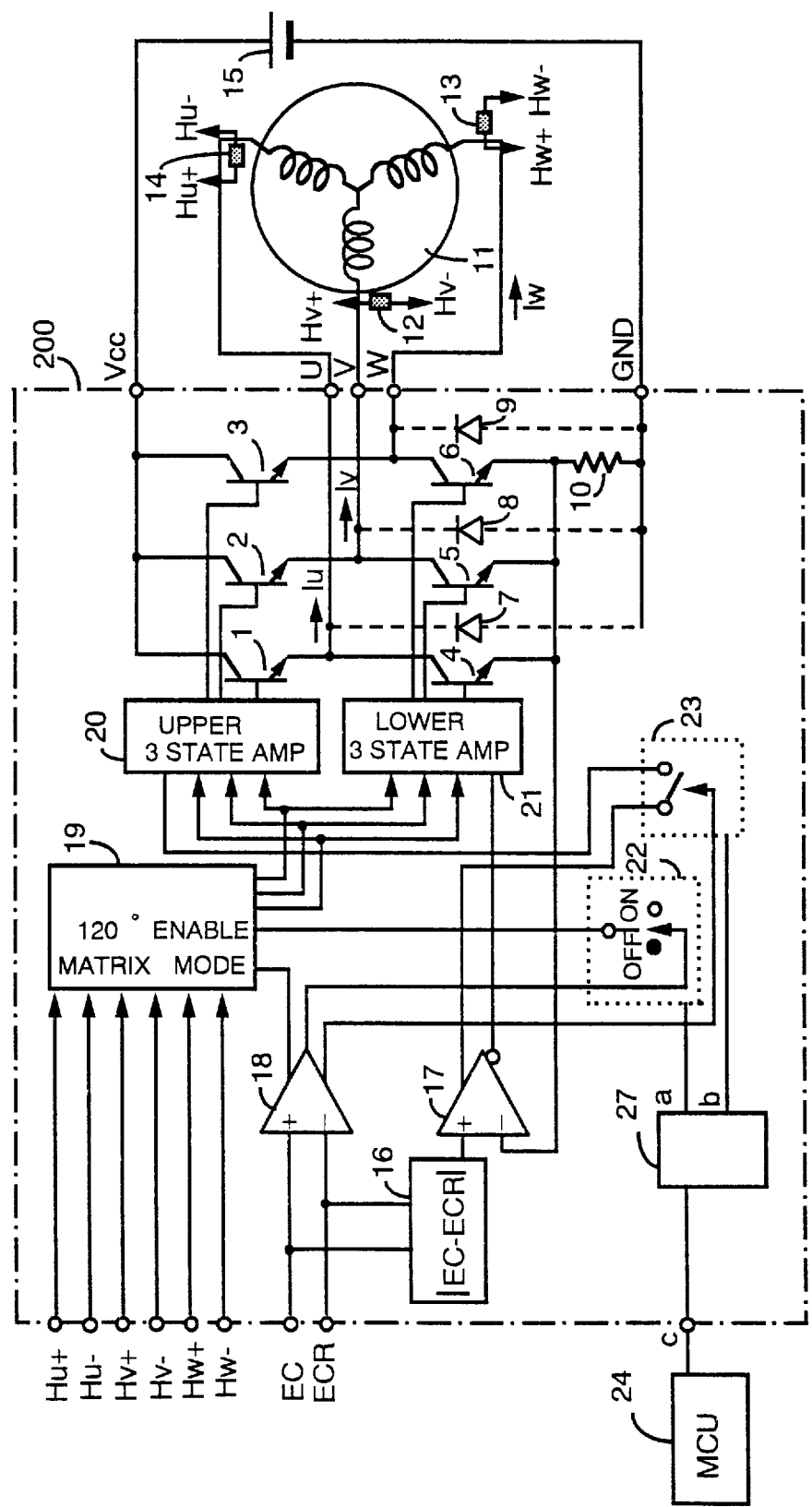
FIGS. 24A, B and C are circuit diagrams according to a seventh embodiment of the present invention.
Figure 25:
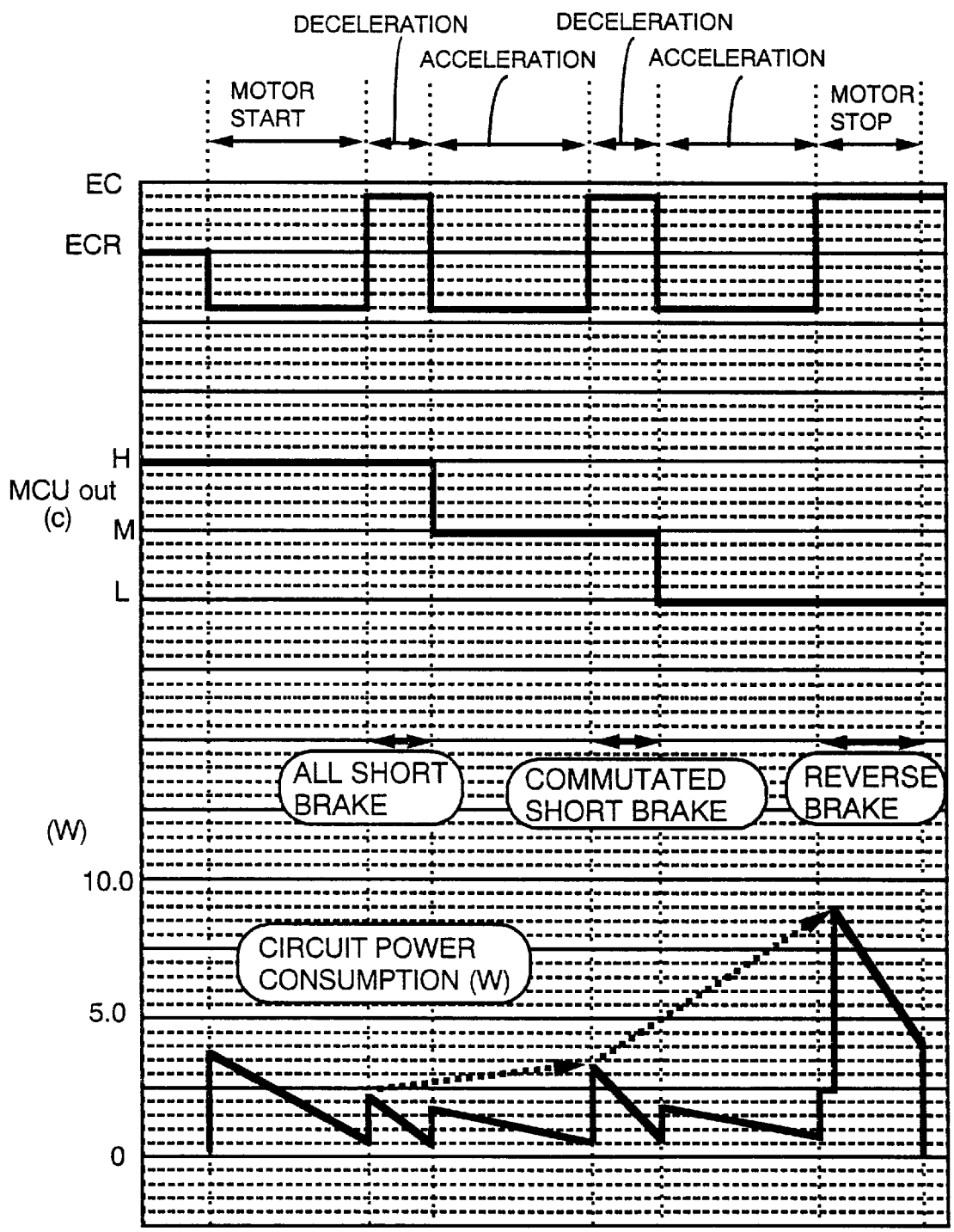
FIG. 25 is a timing chart showing a power consumption in a circuit during full stroke operation according to the seventh embodiment of the present invention.

FIGS. 24A, B and C and FIG. 25 show the seventh embodiment of the present invention, which is the same as the third embodiment shown in FIGS. 17A, B and C except the following points. In FIG. 24A, the same reference numbers as those in FIG. 17A show the same or corresponding portions as those in FIG. 17A.

That is, in FIG. 17A in the third embodiment, the selection signal output means 24 outputs a selection signal comprising two bits, each of which takes a binary value, which indicates either one of the first, the second or the third mode.

On the other hand, in this seventh embodiment, the selection signal output means 24 outputs a selection signal comprising a signal which takes a three-digit value, indicating either one of the first, the second or the third mode. A selection signal conversion means 27 selects this selection signal from the selection signal output means 24 from the selection signal input terminal c.

Moreover, the selection signal conversion means 27 receives the selection signal on the selection signal input terminal c and converts it into a selection signal comprising two bits, each of which takes a binary value, which indicate either one of the first, the second or the third mode. The converted signal is then outputted to both the first and the second activation signal generators 22, 23 via the selection signal input nodes a, b, respectively. The selection signal conversion means 27 comprises a generally known analogue/digital conversion circuit.

The motor driving circuit constructed in this way gives the same effects as those mentioned in the third embodiment. Moreover, if the motor driving circuit is integrated into a semiconductor integrated circuit, it requires only one terminal for a selection signal which includes the 1st~3rd modes.

Embodiment 8

Figure 26A:
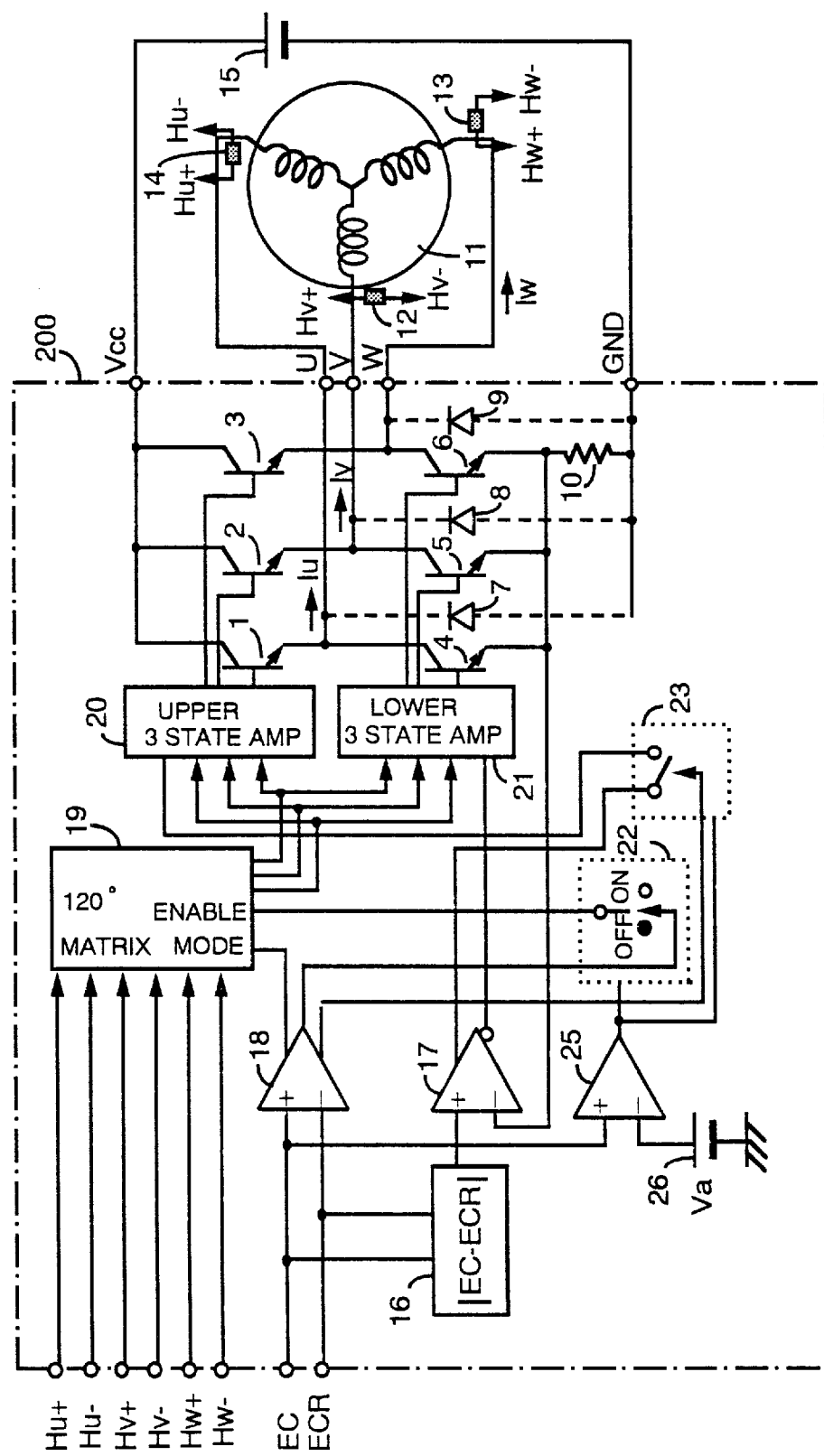
FIGS. 26A, B and C are circuit diagrams according to an eighth embodiment of the present invention.

FIGS. 26A, B and C show an eighth embodiment of the present invention. In FIG. 26A, the same reference numbers as those of the first embodiment in FIG. 1 show the same or corresponding portions as those in FIG. 1. The following mainly explains the differences between the present embodiment and the first embodiment.

Figure 27:
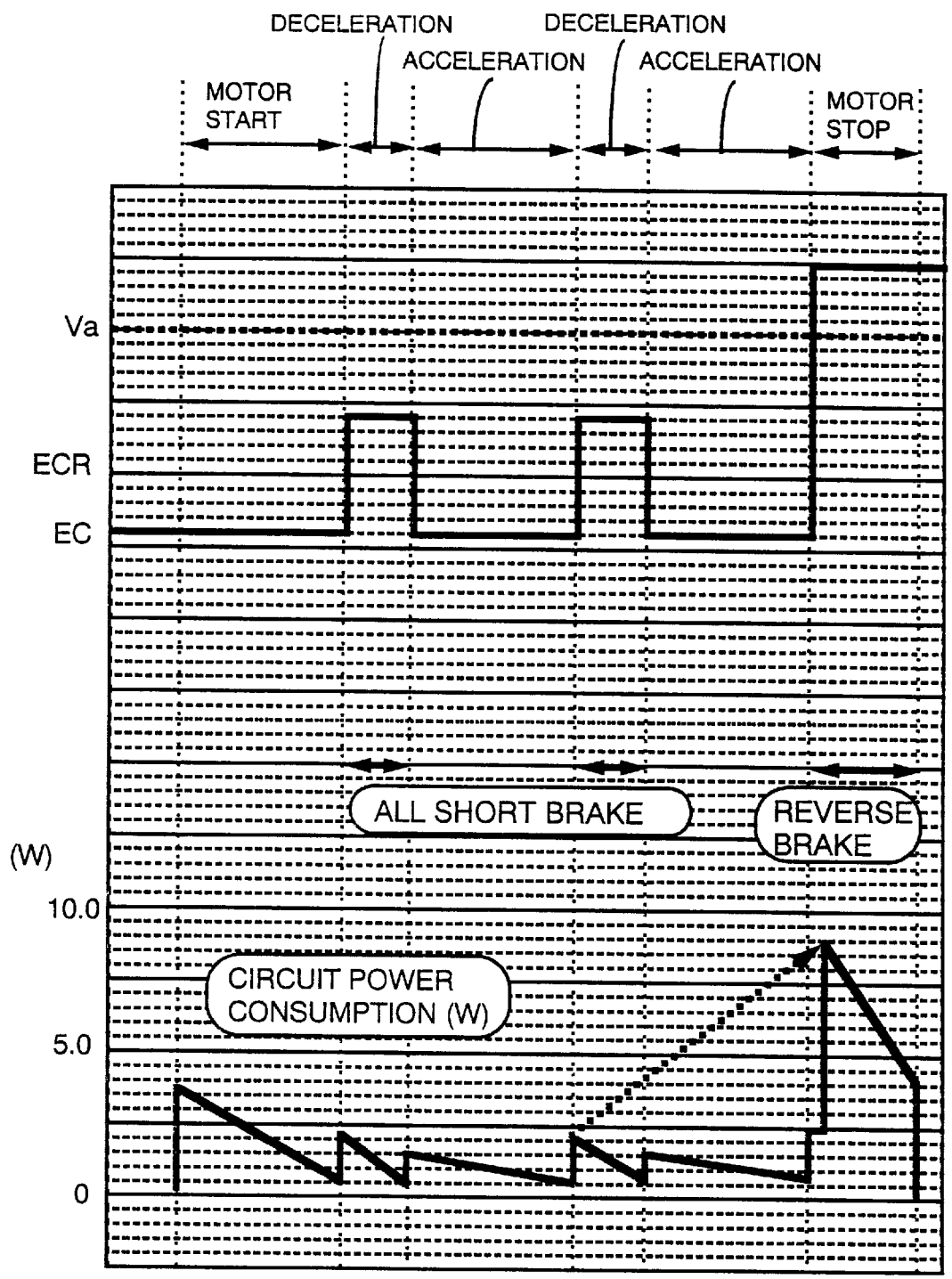
FIG. 27 is a timing chart showing a power consumption in a circuit during full stroke operation according to the eighth embodiment of the present invention.

In this eighth embodiment, a motor control signal (EC) takes a ternary value, as shown in FIG. 27. In other words, when an accelerating mode is indicated, the motor control signal (EC) takes a lower value (for example, an earth electric potential) than reference voltage (ECR) (for example, one third of the voltage applied to the power supply electric potential node Vcc), while a deceleration moving period in the decelerating mode is indicated, the motor control signal (EC) takes a first value (for example, half of the voltage applied to the power supply electric potential node Vcc) which is higher than the reference voltage (ECR), and when a motor stop period in the decelerating mode is indicated, the motor control signal WC) takes a second value which is higher than he reference voltage (ECR) and the first voltage (for example, the same voltage as that applied to the power supply electric potential node Vcc).

In FIG. 26A, selection signal generator 25 receives the above-mentioned motor control signal (EC) and second reference voltage Va (voltage between the first value and the second value of the motor control signal (EC), which is, for example, two thirds of the voltage applied to the power-supply electric potential node Vcc). The selection signal generator 25 outputs a selection signal which indicates a first mode in the decelerating mode if the motor control signal (EC) is lower than the second reference voltage Va, and which indicates a second mode in the decelerating mode if the motor control signal (EC) is higher than the second reference voltage Va. The selection signal generator 25 comprises a comparator which receives the motor control signal (EC) on a non-inverted input terminal (+), and the second reference voltage Va on an inverted input terminal (−). The selection signal generator 25 outputs a selection signal which is at "L" level indicating the first mode in the decelerating mode if the motor control signal (EC) is lower than the second reference voltage Va, and at "H" level indicating the second mode if the motor control signal (EC) is higher than the second reference voltage Va. The selection signal generator 25 comprises the motor driving circuit and is integrated into a semiconductor integrated circuit.

In this eighth embodiment, when a selection signal indicates the first mode, it shows a deceleration moving period by all-short-brake in a decelerating mode.

On the other hand, when a selection signal indicates the second mode, it shows a stop period for stopping the rotation of the motor by reverse brake in a decelerating mode.

A first activation signal generator 22 receives a switching signal from the switching signal generator 18 and a selection signal from the selection signal generator 25, for outputting a first activation signal which has a specific feature as follows. The first activation signal indicates an activated state when the received switching signal indicates an accelerating mode or when the switching signal indicates a decelerating mode and the received selection signal indicates the second mode. The first activation signal indicates a non-activated state when the received switching signal indicates a decelerating mode and the received selection signal indicates the first mode. In the same manner as the first embodiment, the first activation signal generator 22 consists of switching elements comprising a bipolar transistor and so on, which outputs the first activation signal by connecting the power supply electric potential node to the "on" side in FIG. 26A when the signal indicates an activated state, and by connecting the earth electric potential node to the "off" side in FIG. 26A when the signal indicates a non-activated state.

A switching control signal generator 19 receives a motor location signal from the location detection hole sensors 12~14, a switching signal from the switching signal generator 18 and a first activation signal from the first activation signal generator 22. The switching control signal generator 19 outputs a first switching control signal based on the motor location signal when the received switching signal indicates an accelerating mode and the first activation signal from the first activation signal generator 22 indicates an activated state. The switching control signal generator 19 outputs a second switching control signal which changes in accordance with the motor location signal in the opposite sequence to the first switching control signal, when the received switching signal indicates a decelerating mode and the first activation signal from the first activation signal generator 22 indicates an-activated state. The switching control signal generator 19 outputs a predetermined electric potential, namely, the electric potential between the power supply electric potential applied to the power supply electric potential node Vcc and the earth electric potential applied to the earth electric potential node GND in case of the eighth embodiment, regardless of the motor location signal, when the received switching signal indicates a decelerating mode and the first activation signal from the first activation signal generator 22 indicates a non-activated state. The switching control signal generator 19 comprises input nodes connected to the location detection signal input nodes Hu+, Hu−, Hv+, Hv−, Hw+ and Hw−, and three output nodes corresponding to respective U, V and W phases.

A second activation signal generator 23 receives a first output signal from the output current controller 17, a switching signal from the switching signal generator 18 and a selection signal from the selection signal generator 25 for outputting a second activation signal which has a specific feature as follows. When the received switching signal indicates an accelerating mode, or when the switching signal indicates a decelerating mode and the received selection signal indicated the second mode, the second activation signal indicates an activated state so that base current in accordance with the received output signal from the output current supply means 17 flows. When the received switching signal indicates a decelerating mode and the selection signal indicates the first mode, the second activation signal indicates a non-activated state. In this eighth embodiment, the second activation signal generator 23 consists of switching elements comprising a bipolar transistor and so on, which is connected to the first output terminal from the output current controller 17 when the activated state is indicated, while which breaks the conductive state when the non-activated state is indicated.

A power-supply side controller 20 receives an output signal from the switching control generator 19 and a second activation signal from the second activation signal generator 23. When the second activation signal indicates an activated state, the power-supply side controller 20 outputs base current based on the second activation signal to the 1st~3rd power-supply side output transistors 1~3 which comprises the output current circuit, according to either the first or the second switching control signal which is the received output signal from the switching control generator 19. When the second activation signal indicates a non-activated state, the power-supply side controller 20 makes the base electrodes of the 1st~3rd power-supply side output transistors 1~3, which comprise the output current circuit, electrically floating state, in accordance with the second activation signal. In this eighth embodiment, when the second activation signal from the second activation signal generator 23 indicates an activated state, in other words, when the switching signal from the switching signal generator 18 indicates an accelerating mode or the selection signal from the selection signal generating means 25 indicates the second mode (reverse brake mode), the second activation signal generator 23 becomes ON state, which supplies the first output terminal of the output current controller 17 to the output terminal of the second activation signal generator 23 which is also supplied to the power-supply side controller 20. Then the power-supply side controller 20 amplifies the supplied current by a predetermined gain and gives the base current to the 1st~3rd power-supply side output transistors 1~3 in accordance with either the first or the second switching control signal from the switching control signal generator 19. When the second activation signal from the second activation signal generator 23 indicates a non-activated state, in other words, when the selection signal from the selection signal generating means 25 indicates the first mode (all-short-brake mode) to break the current from the first output terminal of the output current controller 17, the current supply is stopped, which makes the base electrodes of the 1st~3rd power-supply side output transistors 1~3 electrically floating state. This power-supply side controller 20 consists of a pre-driver circuit, for example.

An earth side controller 21 receives an output signal from the switching control generator 19 and an output signal from the output current controller 17. According to the received output signal from the switching control signal generator 19, the earth side controller 21 outputs a base current to the 1st~3rd earth side output transistors 4~6 which comprise output current circuit in accordance with the output signal from the output current controller 17. In this eighth embodiment, the earth side controller 21 is connected to the second output terminal from the output current controller 17 so that the current is drawn from the second output terminal. The drawn current is amplified by a predetermined gain and given to the 1st~3rd earth side output transistors 4~6 as the base current thereof, according to the switching control signal from the switching control signal generator 19. This earth side controller 21 consists of a pre-driver circuit, for example.

The output current controller 17, the second activation signal generator 23, the power-supply side controller 20 and the earth side controller 21 constitute a base current supply means which receives the output signal from the switching control signal generator 19 and operates as follows. When a mode assignment signal indicates an accelerating mode, a base current based on the first switching control signal which is the output signal from the switching control signal generator 19, is applied to both the 1st~3rd power-supply side output transistors 1~3 and the 1st~3rd earth side output transistors 4~6. When the mode assignment signal indicates a decelerating mode, the base current supply means output either the first or the second control signal according to the selection signal from the selection signal generator 25. When a mode assignment signal indicates a decelerating mode and the selection signal indicates the first mode, the first control signal is outputted, which makes the 1st~3rd power-supply side output transistors 1~3 electrically floating state, that is, non-conductive state, while the first control signal supplies a base current based on a predetermined electric potential which is the output signal from the switching control signal generator 19, to the 1st~3rd earth side output transistors 4~6. When a mode assignment signal indicates a decelerating mode and the selection signal indicates the second mode, the second control signal is outputted, which supplies a base current based on the second switching control signal which is the output signal from the switching control signal generator 19, to both the 1st~3rd power-supply side output transistors 1~3 and the 1st~3rd earth side output transistors 4~6.

The switching signal generator 18, the first activation signal generator 22, the switching control signal generator 19 and the base current supply means comprise a control signal generation circuit, which receives a motor location signal, a mode assignment signal which indicates either the accelerating mode or the decelerating mode and a selection signal which indicates either the first mode or the second mode, and which operates as follows. When a mode assignment signal indicates an accelerating mode, the base current based on the motor location signal is applied to both the 1st~3rd power-supply side output transistors 1~3 and the 1st~3rd earth side output transistors 4~6. When a mode assignment signal indicates a decelerating mode, the control signal generation circuit outputs either a first control signal or a second control signal to the base electrodes of both the 1st~3rd power-supply side output transistors 1~3 and the 1st~3rd earth side output transistors 4~6, in accordance with the mode of the selection signal from the selection signal generator 25. The first control signal, regardless of the received motor location signal, makes the 1st~3rd power-supply side output transistors 1~3 non-conductive state, while the first control signal makes the 1st~3rd earth side output transistors 4~6 conductive state. The second control signal supplies a base current, which generates a torque in the opposite direction to that of the forward torque, to both the 1st~3rd power-supply side output transistors 1~3 and the 1st~3rd earth side output transistors 4~6, in accordance with the received motor location signal.

Figure 29:
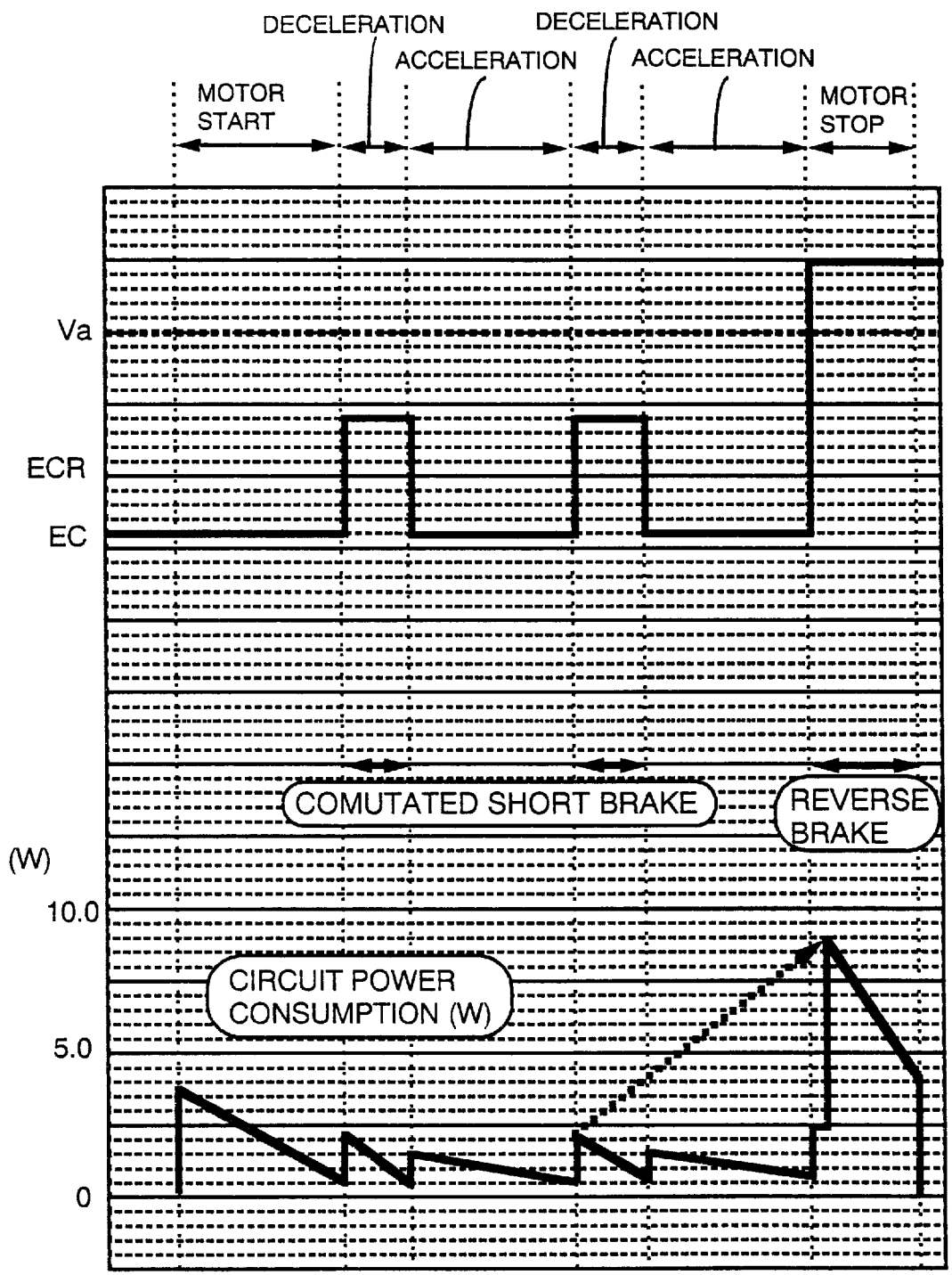
FIG. 29 is a timing chart showing a power consumption in a circuit during full stroke operation according to the ninth embodiment of the present invention.
Figure 30:
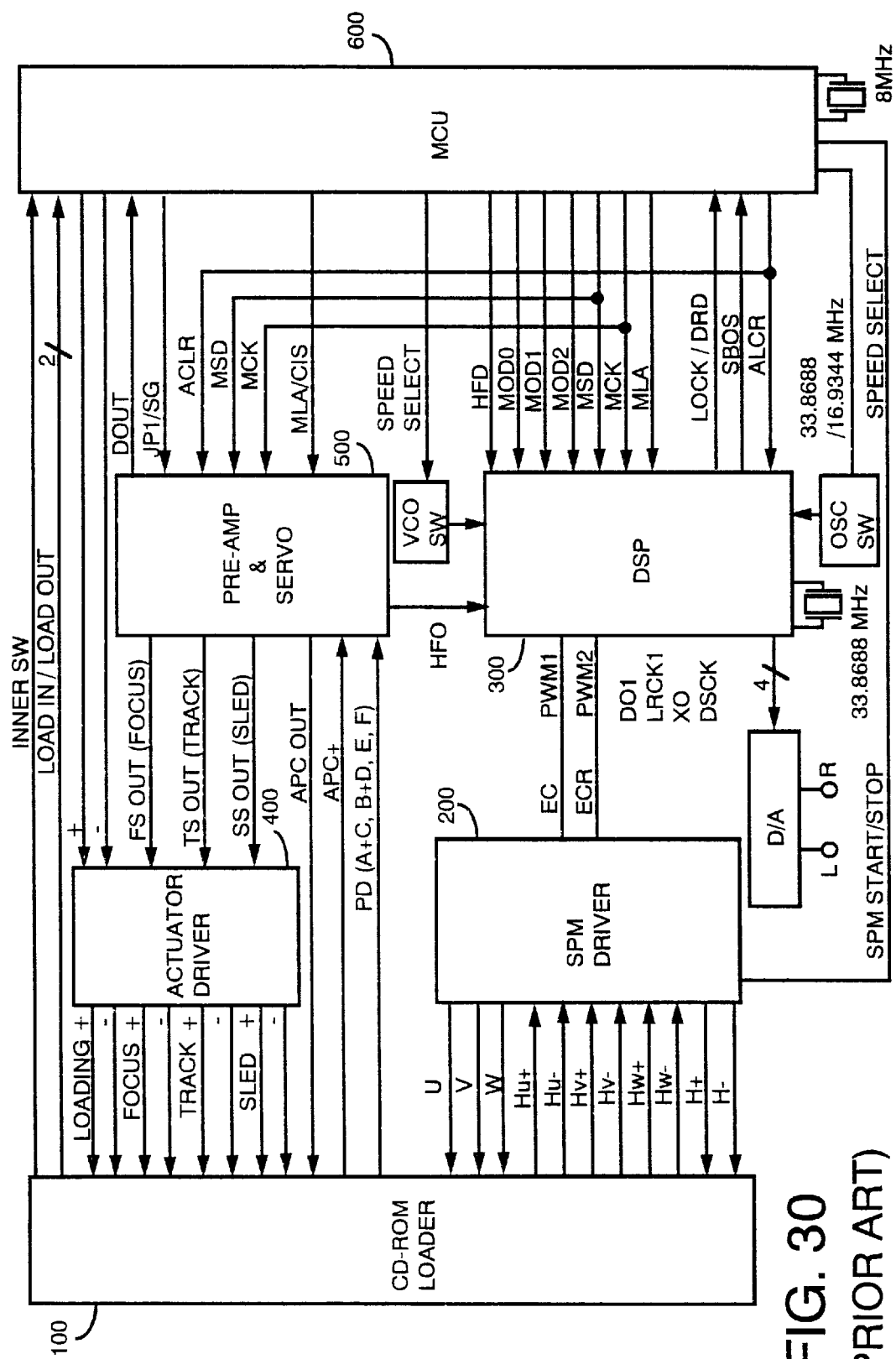
FIG. 30 is a circuit diagram showing an example of a CD-ROM reproducing equipment.
Figure 31:
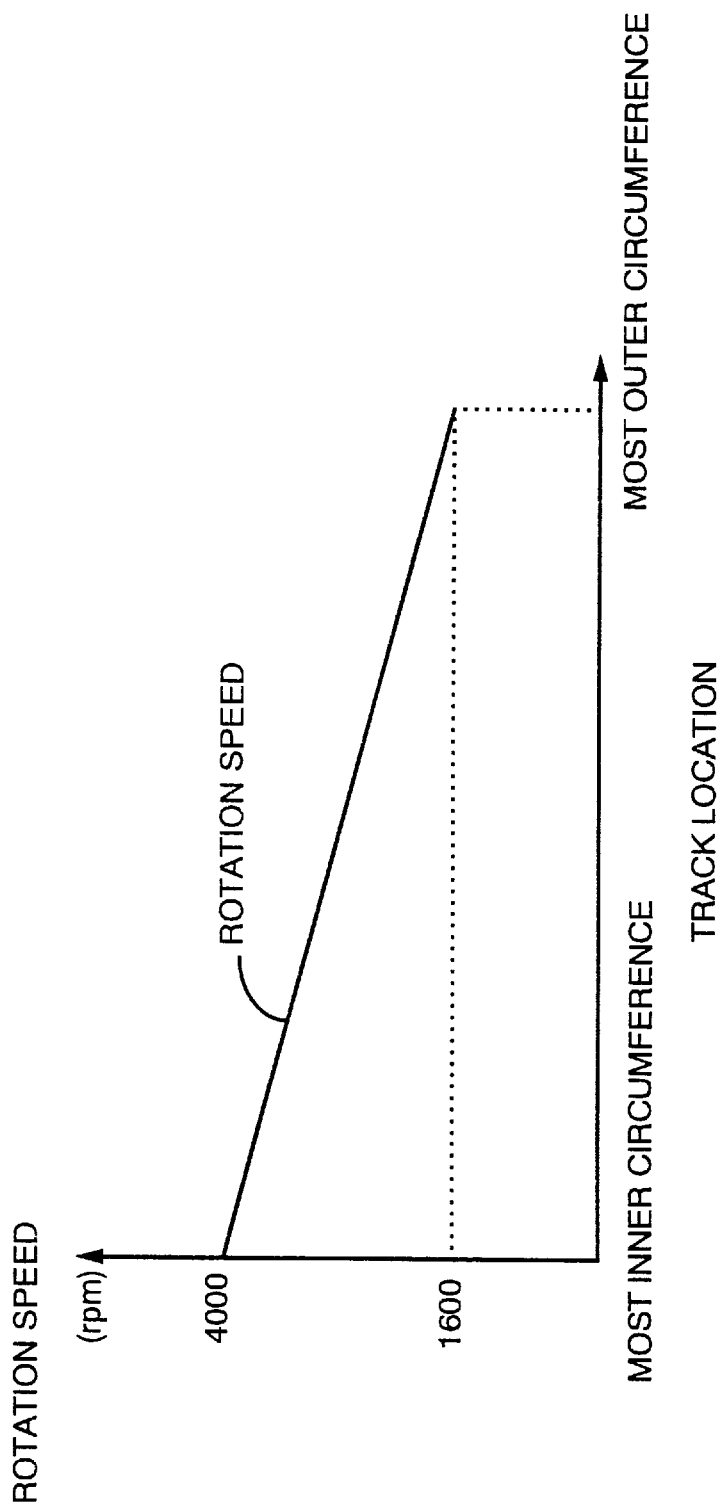
FIG. 31 shows a relationship between a truck location and a rotating speed of a disk.

Referring to FIG. 27, an operation of the motor driving circuit constructed in this way is explained below. FIG. 29 is a timing chart showing a motor control signal (EC), reference voltage (ECR), a second reference voltage Va and a power consumption, in the respective modes of the motor start, the transition from the decelerating mode to the accelerating mode, the transition from the accelerating mode to the decelerating mode, and the motor stop mode.

In this eighth embodiment, three modes, namely, the accelerating mode period, the deceleration moving period in the decelerating mode period by all-short-brake and the motor stop period in the decelerating mode period, are selected in accordance with the motor control signal (EC) which serves as a mode assignment signal and the reference voltage (ECR).

An accelerating mode period, namely, the motor start or the accelerating mode shown in FIG. 27 is explained. In the section A and the section B as shown in FIG. 33, for example, the motor control signal (EC) inputted into the control signal input node EC is at "L" level, and a switching signal is applied from the switching signal generator 18 to the switching control signal generator 19 so that current flows in the direction to generate a forward-direction torque (forward torque) in the motor coils of the spindle motor main body 11.

At the same time, a switching signal is applied to both the first and the second activation signal generators 22, 23 from the switching signal generator 18. Accordingly, both the first and the second activation signal generators 22, 23 output activation signals which indicate activated states, regardless of the value of the inputted selection signal, because the switching signal indicates an accelerating mode.

As a result, a first activation signal indicating an activated state is applied to the switching control signal generator 19 from the first activation signal generator 22, while a second activation signal indicating a non-activated state is applied to the power-supply side controller 20 from the second activation signal generator 23. This is the same state and operates in the same manner as those described in the first embodiment.

The deceleration moving period and the motor stop period in the decelerating mode period are explained below. In both the deceleration moving period and the motor stop period in this decelerating mode period, the motor control signal (EC) inputted into the control signal input node EC changes to a higher value than the reference voltage (ECR) so that a switching signal is applied from the switching signal generator 18 to the switching control signal generator 19 in order to supply current which generates a torque in the opposite direction in the motor coils of the spindle motor main flame 11, as shown in the decelerating mode in FIG. 27. At the same time, a switching signal is applied to both the first and the second activation signal generators 22, 23.

[DECELERATION MOVING PERIOD]

In this period, a selection signal from the selection signal generator 25 is represented as [L]. Accordingly, receiving an "L" level selection signal, the first activation signal generator 22 outputs a first activation signal which indicates a non-activated state to the switching control signal generator 19.

Also, receiving an "L" level selection signal, the second activation signal generator 23 outputs a second activation signal which indicates a non-activated state to the power-supply side controller 20.

Accordingly, receiving the first activation signal indicating a non-activated state from the first activation signal generator 22, the switching control signal generator 19 gives a predetermined electric potential to the both power-supply side and the earth side controllers 20, 21, regardless of the state of the switching state signal which is given to the location detection signal input nodes Hu+, Hu−, Hv+, Hv−, Hw+ and Hw−.

On the other hand, receiving the second activation signal indicating a non-activated state from the second activation signal generator 23, the power-supply side controller 20 makes the base electrodes of the 1st~3rd power-supply side output transistors 1~3 electrically floating state, that is, non-conductive state, regardless of the predetermined electric potential from the switching control signal generator 19.

On the other hand, since the earth side controller 21 receives the second output signal from the output current controller 17 and a predetermined electric potential from the switching control signal generator 19, a predetermined base current is supplied to the earth side output power transistors 4~6 so that the earth side output power transistors 4~6 are always in conductive state during this period.

Accordingly, the power-supply side output power transistors 1~3 are always in non-conductive state, while the earth side output power transistors 4~6 are always in conductive state during this period. The deceleration is carried out in the same manner as the all-short-brake mentioned in the first embodiment.

[MOTOR STOP PERIOD]

In this period, a selection signal from the selection signal generator 25 is represented as [H]. Accordingly, receiving an "H" level selection signal, the first activation signal generator 22 outputs a first activation signal which indicates an activated state to the switching control signal generator 19.

Also, receiving an "H" level selection signal, the second activation signal generator 23 outputs a second activation signal which indicates an activated state to the power-supply side controller 20.

Accordingly, receiving a switching signal which indicates a decelerating mode from the switching signal generator 18 and a first activation signal which indicates an activated state from the first activation signal generator 22, the signal generator 19 applies a second switching control signal to both the power-supply side and the earth side controllers 20, 21 so that a reverse torque is generated in the motor, in accordance with the switching state signal given to the location detection signal input node Hu+, Hu−, Hv+, Hv−, Hw+ and Hw−.

Receiving an activation signal indicating an activated state from the second activation signal generator 23, and a second switching control signal from the switching control signal generator 19, the power-supply side controller 20 supplies a base current, based on the received second switching control signal, to the 1st~3rd power-supply side output transistors 1~3, in accordance with the first output signal from the output current controller 17. In accordance with the second switching control signal, the 1st~3rd power-supply side output transistors 1~3 are in conductive state during this period.

Receiving a second output signal from the output current controller 17 and a second switching control signal from the switching control signal generator 19, the earth side controller 21 supplies the base current, based on the received second switching control signal, to the earth side output power transistors 4~6 in accordance with the second output received. In other words, the earth side output power transistors 4~6 are in conductive state in accordance with the second switching control signal during this period.

Accordingly, both the power-supply side output power transistors 1~3 and the earth side output power transistors 4~6 are always in conductive state during this period according to the second switching control signal. The deceleration is carried out in the same manner as the reverse brake mentioned in the prior art.

The motor driving circuit constructed in this way gives the following effects. First, in the deceleration moving period in a decelerating mode period, the deceleration is carried out by all-short-brake. Accordingly, the thermal effect is reduced by reducing the power consumption in this decelerating period.

Second, in the motor stop period to stop the motor in a decelerating mode period, the deceleration is carried out by reverse brake. Accordingly, a motor can be stopped in a short time.

Third, since the selection signal generator 25 is installed for outputting a selection signal which indicates either the deceleration moving period or the motor stop period, no new terminal is required for receiving a selection signal, and an output means for outputting a selection signal is not necessarily provided outside a semiconductor integrated circuit.

Embodiment 9

Figure 28A:
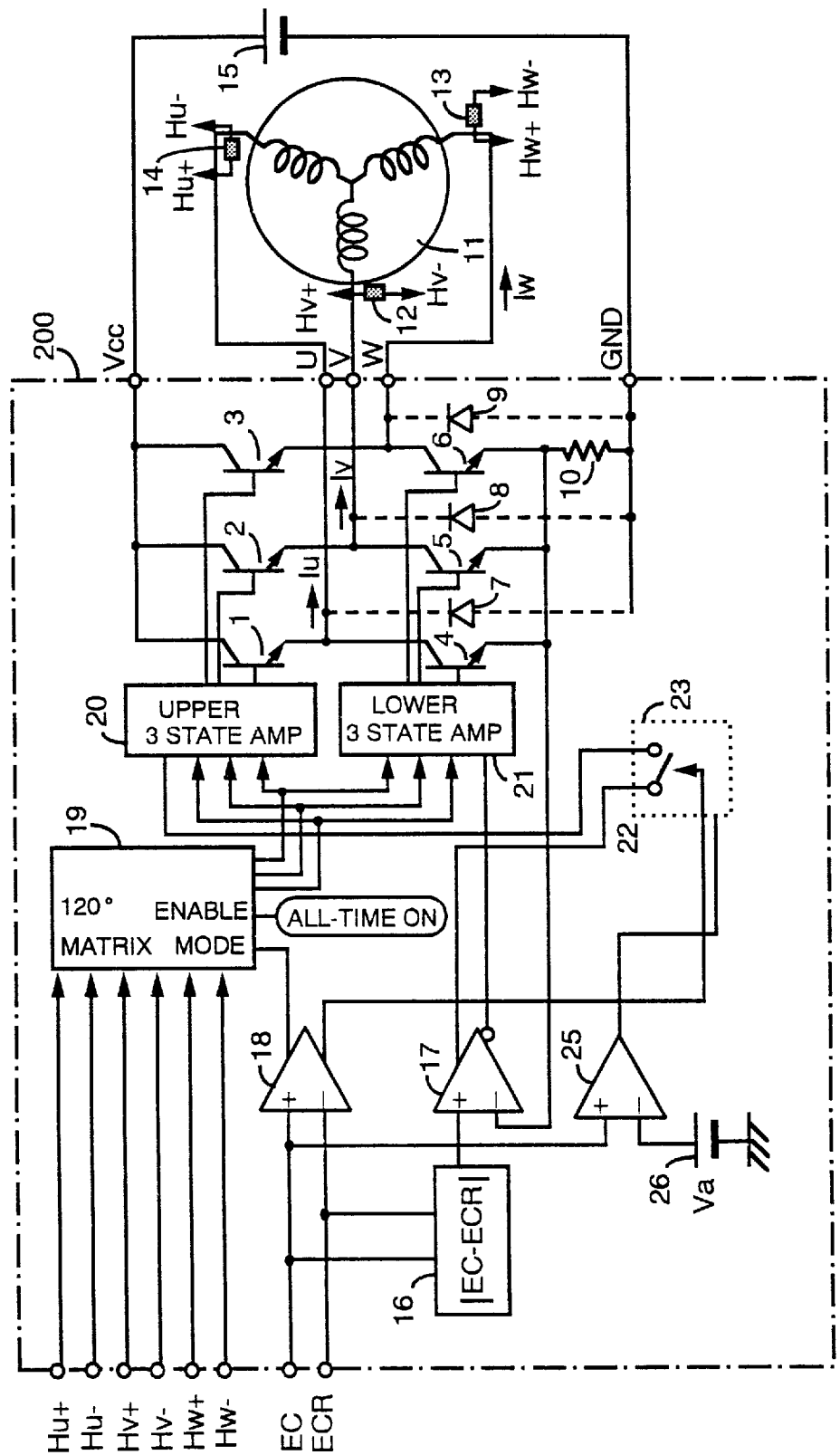
FIGS. 28A, B and C are circuit diagrams according to a ninth embodiment of the present invention.

FIGS. 28A, B and C show a ninth embodiment of the present invention. In FIG. 28A, the same reference numbers as those of the first embodiment in FIG. 1 show the same or corresponding portions as those in FIG. 1. The following mainly explains the differences between the present embodiment and the first embodiment.

In this ninth embodiment, a motor control signal (EC) takes a ternary value, as shown in FIG. 29. In other words, when an accelerating mode is indicated, the motor control signal (EC) takes a lower value (for example, an earth electric potential) than reference voltage (ECR) (for example, one third of the voltage applied to the power supply electric potential node Vcc), while a deceleration moving period in the decelerating mode is indicated, the motor control signal (EC) takes a first value (for example, half of the voltage applied to the power supply electric potential node Vcc) which is higher than the reference voltage (ECR), and when a motor stop period in the decelerating mode is indicated, the motor control signal (EC) takes a second value (for example, same voltage applied to the power supply electric potential node Vcc) which is higher than the reference voltage (ECR), the first and the second voltages.

In FIG. 28A, a selection signal generator 25 receives the above-mentioned motor control signal (EC) and the second reference voltage Va (voltage between the first value and the second value of the motor control signal (EC), which is, for example, two thirds of the voltage applied to the power-supply electric potential node Vcc), and outputs a selection signal which indicates a first mode in the decelerating mode if the motor control signal (EC) is lower than the second reference voltage Va, and a second mode in the decelerating mode if the motor control signal (EC) is higher than the second reference voltage Va. The selection signal generator 25 comprises a comparator which receives the motor control signal (EC) on a non-inverted input terminal (+), and the second reference voltage Va on an inverted input terminal (−) and outputs a selection signal which is at "L" level indicating the first mode in the decelerating mode if the motor control signal (EC) is lower than the second reference voltage Va, and at "H" level indicating the second mode if the motor control signal (EC) is higher than the second reference voltage Va. The selection signal generator 25 comprising the motor driving circuit is integrated into a semiconductor integrated circuit.

In this ninth embodiment, when a selection signal indicates the first mode, it shows a deceleration moving period by commutated-short-brake in a decelerating mode. On the other hand, when a selection signal indicates the second mode, it shows a stop period for stopping the rotation of the motor by reverse brake in a decelerating mode.

The switching control signal generator 19, receives a motor location signal from the location detection hole sensors 12~14, a switching signal from the switching signal generator 18 and an regular ON signal on its enable terminal by connecting the enable terminal to a power-supply electric potential node, for example. When a switching signal from the switching signal generator 18 indicates the accelerating mode, the switching control signal generator 19 outputs a first switching control signal based on the motor location signal, while it outputs a second switching control signal which changes in the opposite sequence to the first switching signal, in accordance with the motor location signal, when the decelerating mode is indicated. The switching control signal generator 19 comprises input nodes connected to the location detection signal input nodes Hu+, Hu−, Hv+, Hv−, Hw+ and Hw−, and three output nodes corresponding to respective U, V and W phases.

An activation signal generator 23 receives a first output signal from the output current controller 17, a switching signal from the switching signal generator 18 and a selection signal from the selection signal generator 25 and outputs an activation signal which has a specific feature as follows. When the received switching signal indicates an accelerating mode, or when the switching signal indicates a decelerating mode and the received selection signal indicated the second mode, the activation signal indicates an activated state so that base current is supplied in accordance with the received output signal from the output current supply means 17. When the received switching signal indicates a decelerating mode and the selection signal indicates the first mode, the activation signal indicates a non-activated state. In this ninth embodiment, the activation signal generator 23 consists of switching elements comprising a bipolar transistor and so on, which connects the first output terminal of the output current controller 17 with the output terminal of the activation signal generator 23 when the activated state is indicated, while the bipolar transistor breaks the conductive state when the non-activated state is indicated.

The output current controller 17, the activation signal generator 23, the power-supply side controller 20 and the earth side controller 21 constitute a base current supply means which receive the output signal from the switching control signal generator 19 and operates as follows. When a mode assignment signal indicates an accelerating mode, a base current, based on the first switching control signal which is the output signal from the switching control signal generator 19, is given to both the 1st~3rd power-supply side output transistors 1~3 and the 1st~3rd earth side output transistors 4~6. When a mode assignment signal indicates a decelerating mode and the selection signal indicates the first mode, the first control signal is outputted, which makes the 1st~3rd power-supply side output transistors 1~3 electrically floating state, that is, non-conductive state, while the first control signal supplies a base current base on a second switching control signal, which is the output signal from the switching control signal generator 19, to the 1st~3rd earth side output transistors 4~6. When a mode assignment signal indicates a decelerating mode and the selection signal indicates the second mode, the second control signal is outputted which supplies a base current based on the second switching control signal, which is the output signal from the switching control signal generator 19, to both the 1st~3rd power-supply side output transistors 1~3 and the 1st~3rd earth side output transistors 4~6.

The switching signal generator 18, the switching control signal generator 19 and the base current supply means comprise a control signal generation circuit, which receive a motor location signal, a mode assignment signal which indicates either the accelerating mode or the decelerating mode and a selection signal which indicates a first and a second mode from the selection signal generator 25, and operates as follows. When a mode assignment signal indicates an accelerating mode, the base current based on the motor location signal is applied to both the 1st~3rd power-supply side output transistors 1~3 and the 1st~3rd earth side output transistors 4~6. When a mode assignment signal indicates a decelerating mode, the control signal generation circuit outputs either the first, or the second control signal to the base electrodes of both the 1st~3rd power-supply side output transistors 1~3 and the 1st~3rd earth side output transistors 4~6, in accordance with the mode of the selection signal from the selection signal generator 25. The first control signal, regardless of the received motor location signal, makes the 1st~3rd power-supply side output transistors 1~3 non-conductive state, while the first control signal gives the base current, which generates a torque in the opposite direction to that of the forward torque, to the 1st~3rd earth side output transistors 4~6, in accordance with the received motor location signal. The second control signal gives the base current, which generates a torque in the opposite direction to that of the forward torque, to both the 1st~3rd power-supply side output transistors 1~3 and the 1st~3rd earth side output transistors 4~6, in accordance with the received motor location signal.

Referring to FIG. 29, an operation of the motor driving circuit constructed in this way is explained below. FIG. 29 is a timing chart showing a motor control signal (EC), reference voltage (ECR), second reference voltage Va and a power consumption, in the respective modes of the motor start, the transition from the decelerating mode to the accelerating mode, the transition from the accelerating mode to the decelerating mode, and the motor stop mode.

In this ninth embodiment, the accelerating mode period, the deceleration moving period in the decelerating mode period (by commutated-short-brake) and the motor stop period in the decelerating mode period (by reverse brake), are selected in accordance with the motor control signal (EC) which serves as a mode assignment signal and the reference voltage (ECR).

An accelerating mode period, namely, the motor start or the accelerating mode shown in FIG. 29 is explained. In the section A and the section B as shown in FIG. 33, for example, the motor control signal (EC) inputted into the control signal input node EC is at "L" level, and a switching signal is applied from the switching signal generator 18 to the switching control signal generator 19 so that current flows in the direction to generate a forward-direction torque (forward torque) in the motor coils of the spindle motor main body 11.

At the same time, a switching signal is applied to the second activation signal generator 23 from the switching signal generator 18. Accordingly,the second activation signal generator 23 outputs an activation signal which indicates an activated state, regardless of the inputted value of the selection signal, because the switching signal indicates an accelerating mode.

As a result, the switching control signal generator 19 receives a switching signal indicating an accelerating mode from the switching signal generator 18 and an "H" level electric potential indicating an activated state on the enable terminal. The power-supply side controller 20 receives a second activation signal indicating an activated state from the second activation signal generator 23.

This is the same state and operates in the same manner as those described in the first embodiment.

The deceleration moving period and the motor stop period in the decelerating mode period, which are the specific features in this ninth embodiment, are explained below. In the deceleration moving period and the stop period in this decelerating mode period, the motor control signal (EC) inputted into the control signal input node EC changes to a higher value than the reference voltage (ECR), where a switching signal is applied from the switching signal generator 18 to the switching control signal generator 19 for supplying a current which generates a torque in the opposite direction in the motor coils of the spindle motor main flame 11, as shown in the decelerating mode in FIG. 29. At the same time, a switching signal is applied to both the first and the second activation signal generators 22, 23.

[DECELERATION MOVING PERIOD]

In this period, a selection signal from the selection signal generator 25 is represented as [L]. Accordingly, receiving an "L" level selection signal, the second activation signal generator 23 outputs a second activation signal which indicates a non-activated state to the power-supply side controller 20.

Receiving a switching signal which indicates a decelerating mode from the switching signal generator 18 and an "H" level electric potential which indicates an activated state on the enable terminal, the signal generator 19 applies a second switching control signal to the power-supply side controller 20 as well as the earth side controller 21 so that a reverse torque is generated in the motor, in accordance with the switching state signal given to the location detection signal input nodes Hu+, Hu−, Hv+, Hv−, Hw+ and Hw−.

On the other hand, receiving an activation signal indicating a non-activated state from the activation signal generator 23, the power-supply side controller 20 makes the 1st~3rd power-supply side output power transistors 1~3 electrically floating state, that is, non-conductive state, regardless of a second switching control signal from the switching control signal generator 19.

Since the earth side controller 21 receives a second output signal from the output current controller 17 and a second signal from the switching control generator 19, the base current based on the received second switching control signal is supplied to the earth side output power transistors 4~6, in accordance with the second output received. In other words, the earth side output power transistors 4~6 are in conductive state in accordance with the second switching control signal during this period.

Accordingly, the power-supply side output power transistors 1~3 are always in non-conductive state, while the earth side output power transistors 4~6 are always in conductive state during this period according to the second switching control signal. The deceleration is carried out in the same manner as the commutated-short-brake mentioned in the second embodiment.

[DECELERATION MOVING PERIOD]

In this period, a selection signal from the selection signal generator 25 is represented as [H]. Accordingly, receiving an "H" level selection signal, the activation signal generator 23 outputs a second activation signal which indicates an activated state to the power-supply side controller 20.

Receiving a switching signal which indicates a decelerating mode from the switching signal generator 18 and an "H" level electric potential which indicates an activated state on the enable terminal, the signal generator 19 applies a second switching control signal to the power-supply side controller 20 as well as the earth side controller 21 so that a reverse torque is generated in the motor, in accordance with the switching state signal given to the location detection signal input nodes Hu+, Hu−, Hv+, Hv−, Hw+ and Hw−.

Since the power-supply side controller 20 receives a first output signal from the output current controller 17 which is an activation signal indicating an activated state from the activation signal generator 23, and a second switching control signal from the switching control signal generator 19, the base current based on the received second switching control signal is supplied to the 1st~3rd power-supply side output transistors 1~3 in accordance with the first output signal. In accordance with the second switching control signal, the 1st 3rd power-supply side output transistors 1~3 are in conductive state during this period.

Since the earth side controller 21 receives a second output signal from the output current controller 17 and a second switching control signal from the switching control signal generator 19, the base current based on the received second switching control signal flows to the earth side output power transistors 4~6 in accordance with the second output received. In other words, the earth side output power transistors 4~6 are in conductive state in accordance with the second switching control signal during this period.

Accordingly, both the power-supply side output power transistors 1~3 and the earth side output power transistors 4~6 are always in conductive state during this period according to the second switching control signal. The deceleration is carried out in the same manner as the reverse brake mentioned in the prior art.

The motor driving circuit constructed in this way gives the following effects. First, in the decelerating mode period, the deceleration is carried out by the commutated-short-brake. Accordingly, the thermal effect is reduced by shortening the decelerating time so that the power consumption in the decelerating period is reduced.

Second, in the motor stop period to stop the motor in a decelerating mode period, the deceleration is carried out by the reverse brake. Accordingly, a motor can be stopped in a short time.

Third, since the selection signal generator 25 is installed for outputting a selection signal which indicates either the deceleration moving period or the motor stop period, no new terminal is required for receiving a selection signal, and an output means for outputting a selection signal is not necessarily provided outside a semiconductor integrated circuit.

What is claimed is:

1. A motor driving circuit for a three-phase brushless motor comprising:
    an output current generation circuit comprising first, second, and third power-supply side output transistors and first, second, and third earth side output transistors for supplying output current to a brushless motor having a shaft, the motor including a plurality of Hall effect sensors for producing location detection signals indicating the angular position of the shaft, the motor for rotating a recording medium storing data at a constant line density, said output current generation circuit including:
        a control signal generation circuit comprising:
            a switching signal generator receiving a motor control signal and a reference signal and outputting a first switching signal for accelerating the motor and a second switching signal for decelerating the motor in accordance with a relationship between the motor control signal and the reference signal;
            switching control means receiving the first and second switching signals and the location detection signals for actuating and deactuating said first, second, and third power-supply side transistors and said first, second, and third earth side output transistors in a first order, based on the location detection signals, in response to the first switching signal to accelerate the motor in a first direction, and for deactuating said first, second, and third power-supply side output transistors and actuating said first, second, and third earth side output transistors in a second order, reverse to the first order, based on the location detection signals, in response to the second switching signal, to generate a torque in a second direction opposite to the first direction, thereby performing commutated-short braking of the motor.

2. The motor driving circuit according to claim 1, wherein said control signal generation circuit actuates all of said earth side output transistors in response to the second switching signal.

3. The motor driving circuit according to claim 1 comprising:
    selection signal output means coupled to said control signal generation circuit for producing a first selection signal for selecting an all-short-brake deceleration mode, a second selection signal for selecting a commutated-short-brake deceleration mode, and a third selection signal for selecting a reverse-brake deceleration mode, wherein said control signal generation circuit actuates all of said earth side output transistors, in response to the first selection signal and the second switching signal, deactuates all of said power-supply side output transistors and actuates all of said first, second, and third earth side output transistors in the second order for generating a torque in the second direction, in accordance with the location detection signals, in response to the second selection signal and the second switching signal, said control signal generation circuit actuates said first, second, and third power-supply side output transistors and said first, second, and third earth side output transistors in the second order for generating a torque in the second direction, in accordance with the location detection signals, in response to the third selection signal and the second switching signal.

4. The motor driving circuit according to claim 1 comprising:
    selection signal output means coupled to said control signal generation circuit for producing a first selection signal for selecting an all-short-brake deceleration mode and a second selection signal for selecting a commutated-short-brake acceleration mode, wherein said control signal generation circuit actuates all of said first, second, and third earth side output transistors, in response to said first selection signal and said second switching signal, said control signal generation circuit deactuates said first, second, and third power-supply side output transistors and actuates said first, second, and third earth side output transistors in the second order for generating a torque in the second direction, in accordance with a location detection signal of a brushless motors, in response to the second selection signal and the second switching signal.

5. The motor driving circuit according to claim 1 comprising:
    selection signal output means coupled to said control signal generation circuit for generating a first selection signal for selecting a commutated-short-brake deceleration mode and a second selection signal for selecting a reverse-brake deceleration mode, wherein said control signal generation circuit actuates all of said first, second, and third earth side output transistors in the second order for generating a torque in the second direction, in accordance with the location detection signals, in response to the first selection signal and the second switching signal, said control signal generation circuit actuating said first, second, and third power-supply side output transistors and said first, second, and third earth side output transistors in the second order for generating a torque in the second direction, in accordance with the location detection signals, in response to the second selection signal and the second switching signal.

6. The motor driving circuit according to claim 1 comprising:

selection signal output means coupled to said control signal generation circuit for generating a first selection signal for selecting an all-short-brake deceleration mode and a second selection signal for selecting a reverse-brake deceleration mode, wherein said control signal generation circuit actuates all of said first, second, and third earth side output transistors, in response to the first selection signal and the second switching signal, said control signal generation circuit actuating said first, second, and third power-supply side output transistors and said first, second, and third earth side output transistors in the second order for generating a torque in the second direction, in accordance with the location detection signals, in response to the second selection signal and the second switching signal.

7. A motor driving circuit for a three-phase brushless motor including a least one Hall effect sensor for producing a motor location signal indicative of the angular position of the motor, the motor for rotating a recording medium storing data at a constant line density, said motor driving circuit comprising:

an output current generation circuit comprising:
a power-supply side output transistor group comprising:
a first power-supply side output transistor connected between a power-supply electric potential node receiving a power supply electric potential and a first output node connected to the motor,
a second power-supply side output transistor connected between the power-supply electric potential node and a second output node connected to the motor, and
a third power-supply side output transistor connected between the power-supply electric potential node and a third output node connected to the motor; and
an earth side output transistor group comprising:
a first earth side output transistor connected between the first output node and a common electric potential node,
a second earth side output transistor connected between the second output node and a common electric potential node, and
a third earth side output transistor connected between the third output node and a common electric potential node;
a control signal generation circuit, receiving the motor location signal and a mode assignment signal having a first state indicating an accelerating mode and a second state indicating a decelerating mode, for supplying base current to said first, second, and third power-supply side output transistors and said first, second, and third earth side output transistors in a first order for accelerating the motor in a first direction according to the motor location signal, when said mode assignment signal indicates an accelerating mode, and for deactuating said first, second, and third power-supply side output transistors and actuating said first, second, and third earth side output transistors in a second order, reverse to the first order, based on the location signals, to generate a torque in a second direction, opposite to the first direction, thereby commutated-short braking the motor, when said mode assignment signal indicates a decelerating mode.

8. The motor driving circuit according to claim 7, wherein, when the mode assignment signal indicates a decelerating mode, said control signal generation circuit generating control signals for deactuating said first, second, and third power-supply side output transistors and for actuating said first, second, and third earth side output transistors, regardless of the motor location signal, thereby all-short braking the motor.

9. The motor driving circuit according to claim 8, wherein:

the mode assignment signal comprises a motor control signal and a reference voltage; and
said control signal generation means comprises:
switching signal generation means for receiving the motor control signal and the reference voltage, and for outputting a switching signal indicating at least one of an accelerating mode and a decelerating mode according to whether the motor control signal is larger than the reference voltage;
first activation signal generation means for receiving the switching signal from said switching signal generation means, and for outputting a first activation signal indicating an activated state when the switching signal indicates the accelerating mode, and a non-activation signal indicating a non-activated state when the switching signal indicates a decelerating mode;
switching control signal generation means receiving the switching signal from said switching signal generation means, the first activation signal from said first activation signal generation means, and the motor location signal, for outputting a switching control signal according to the motor location signal, when the first activation signal from said first activation signal generation means indicates an activated state, and the switching signal from said switching signal generation means indicates an accelerating mode, for outputting a constant electric potential regardless of the motor location signal when the first activation signal from said first activation signal generation means indicates a non-activated state; and
base current supply means for receiving an output signal from said switching control signal generation means, and for supplying a base current based on the switching control signal from said switching control signal generation means to said first, second, and third power-supply side output transistors and said first, second, and third earth side output transistors when the mode assignment signal indicates an accelerating mode, and for deactuating said first, second, and third power-supply side output transistors, and supplying a base current, based on constant electric potential from said switching control signal generation means, to said first, second, and third earth side output transistors to actuate said first, second and third earth side transistors, when the mode assignment signal indicates a decelerating mode.

10. The motor driving circuit according to claim 7, wherein:

the mode assignment signal comprises a motor control signal and a reference voltage, and said control signal generation means comprises:

switching signal generation means receiving the motor control signal as the mode assignment and the reference voltage, for outputting a switching signal indicating an accelerating mode or a decelerating mode according to whether the motor control signal is larger than the reference voltage;

switching control signal generation means receiving the switching signal from said switching signal generation means and the motor location signal, for outputting a first switching control signal based on the motor location signal when the switching signal from said switching signal generation means indicates an accelerating mode, and for outputting a second switching control signal switching in an order opposite to a switching order of the first switching control signal based on the motor location signal when the switching signal from said switching signal generation means indicates a decelerating mode; and base current supply means for supplying a base current based on the first switching control signal, from said switching control signal generation means, to said first, second, and third power-supply side output transistors and said first, second, and third earth side output transistors when the mode assignment signal indicates an accelerating mode, and for deactuating said first, second, and third power-supply side output transistors, and for supplying a base current based on the second switching control signal from said switching control signal generation means, to said first, second, and third earth side output transistors when the mode assignment signal indicates a decelerating mode.

11. The motor driving circuit according to claim 7, wherein, when the mode assignment signal indicates a decelerating mode, said control signal generation circuit supplies at least one of first, second, and third control signals to base electrodes of said first, second, and third power-supply side output transistors and said first, second, and third earth side output transistors in accordance with a mode of said received selection signal, the first control signal deactuates said first, second, and third power-supply side output transistors and actuates said first, second, and third earth side output transistors, regardless of the motor location signal, the second control signal deactuates said first, second, and third power-supply side output transistors regardless of the motor location signal, and supplies a base current for generating a torque in the second direction to said first, second, and third earth side output transistors, and said third control signal supplies a base current for generating a torque in the second direction to said first, second, and third power-supply side output transistors and said first, second, and third earth side output transistors in accordance with the motor location signal.

12. The motor driving circuit according to claim 11, wherein:

the mode assignment signal comprises a motor control signal and reference voltage; and said control signal generation means comprises:

switching signal generation means for receiving the motor control signal and the reference voltage, and for outputting a switching signal which indicates at least one of an accelerating mode and a decelerating mode according to whether the motor control signal is larger than the reference voltage;

first activation signal generation means for receiving the selection signal and the switching signal from said switching signal generation means, for outputting a first activation signal indicating an activated state when the switching signal from said switching signal generation means indicates an accelerating mode and when the selection signal indicates at least one of a second and a third mode, and indicating a non-activated state when the received selection signal indicates a first mode;

switching control signal generation means for receiving the switching signal from said switching signal generation means, the first activation signal from said first activation signal generation means and the motor location signal, and for outputting a first switching control signal according to the motor location signal when the switching signal from said switching signal generation means indicates an accelerating mode and the first activation signal from said first activation signal generation means indicates an activated state, and for outputting a second switching control signal switching in an order opposite to a switching order of the first switching control signal according to the motor location signal when the switching signal from said switching signal generation means indicates a decelerating mode and the first activation signal from said first activation signal generation means indicates an activated state, and for outputting a constant electric potential regardless of the motor location signal when the switching signal from said switching signal generation means indicates a decelerating mode and the first activation signal from said first activation signal generation means indicates a non-activated state; and base current supply means receiving an output signal from said switching control signal generation means, for supplying a base current based on a first switching control signal from said switching control signal generation means, to said first, second, and third power-supply side output transistors and said first, second, and third earth side output transistors when the mode assignment signal indicates an accelerating mode, for outputting a first control signal for deactuating said first, second, and third power-supply side output transistors for supplying a base current based on a constant electric potential from said switching control signal generation means, to said first, second, and third earth side output transistors when the mode assignment signal indicates a decelerating mode and said selection signal indicates a first mode, for outputting a second control signal for deactuating said first, second, and third power-supply side output transistors, for supplying a base current based on a second switching control signal from said switching control signal generation means, to said first, second, and third earth side output transistors when the mode assignment signal indicates a decelerating mode and the selection signal indicates a second mode, and for outputting a third control signal for supplying a base current based on a second switching control signal from said switching control signal generation means, to said first, second, and third power-supply side output transistors and said first, second, and third earth side output transistors when the mode assignment signal indicates a decelerating mode and the selection signal indicates a third mode.

13. The motor driving circuit according to claim 11, wherein:
   the mode assignment signal comprises a motor control signal and a reference voltage; and
   said control signal generation means comprises:
      switching signal generation means receiving the motor control signal and the reference voltage, and for outputting a switching signal indicating an accelerating mode or a decelerating mode according to whether the motor control signal is larger than the reference voltage;
      first activation signal generation means receiving the selection signal and the switching signal from said switching signal generation means, for outputting a first activation signal indicating an activated state when the switching signal from said switching signal generation means indicates an accelerating mode and when the selection signal indicates a second mode, and indicating a non-activated state when the selection signal indicates a first mode;
      switching control signal generation means receiving the switching signal from said switching signal generation means, the first activation signal from said first activation signal generation means and the motor location signal, for outputting a first switching control signal according to the motor location signal when the switching signal from said switching signal generation means indicates an accelerating mode and the first activation signal from said first activation signal generation means indicates an activated state, and for outputting a second switching control signal switching in an order opposite a switching order of the first switching control signal according to the motor location signal when the switching signal from said switching signal generation means indicates a decelerating mode and the first activation signal from said first activation signal generation means indicates an activated state, and for outputting a constant electric potential regardless of the motor location signal when the switching signal from said switching signal generation means indicates a decelerating mode and the first activation signal from said first activation signal generation means indicates a non-activated state; and
      base current supply means receiving an output signal from said switching control signal generation means, for supplying a base current based on a first switching control signal from said switching control signal generation means, to said first, second, and third power-supply side output transistors and said first, second, and third earth side output transistors when the mode assignment signal indicates an accelerating mode, for outputting a first control signal for deactuating said first, second, and third power-supply side output transistors, for supplying a base current based on a constant electric potential from said switching control signal generation means, to said first, second, and third earth side output transistors when the mode assignment signal indicates a decelerating mode and the selection signal indicates a first mode, for outputting a second control signal for supplying a base current based on a second switching control signal from said switching control signal generation means, to said first, second, and third power-supply side output transistors and said first, second, and third earth side output transistors when the mode assignment signal indicates a decelerating mode and the selection signal indicates a second mode.

14. The motor driving circuit according to claim 7, wherein, when said mode assignment signal indicates a decelerating mode,
   said control signal generation circuit supplies at least one of first and second control signals to base electrodes of said first, second, and third power-supply side output transistors and said first, second, and third earth side output transistors in accordance with the mode of the received selection signal, the first control signal for deactuating said first, second, and third power-supply side output transistors and actuating said first, second, and third earth side output transistors, regardless of the motor location signal, the second control signal for deactuating said first, second, and third power-supply side output transistors regardless of the motor location signal, and supplying a base current for generating a torque in the second direction to said first, second, and third earth side output transistors.

15. The motor driving circuit according to claim 14, wherein:
   the mode assignment signal comprises a motor control signal and a reference voltage; and
   said control signal generation means comprises:
      switching signal generation means receiving the motor control signal serving the reference voltage, and outputting a switching signal which indicates at least one of an accelerating mode and a decelerating mode according to whether the motor control signal is larger than the reference voltage;
      first activation signal generation means receiving the selection signal and the switching signal from said switching signal generation means, for outputting a first activation signal indicating an activated state when the switching signal from said switching signal generation means indicates an accelerating mode and when the selection signal indicates a second mode, and indicating a non-activated state when the selection signal indicates a first mode;
      switching control signal generation means receiving the switching signal from said switching signal generation means, the first activation signal from said first activation signal generation means and the motor location signal, and for outputting a first switching control signal according to the motor location signal when the switching signal from said switching signal generation means indicates an accelerating mode and the first activation signal from said first activation signal generation means indicates an activated state, and for outputting a second switching control signal which changes in an order opposite to a switching order of the first switching control signal according to the motor location signal when the switching signal from said switching signal generation means indicates a decelerating mode and the first activation signal from said first activation signal generation means indicates an activated state, and for outputting a constant potential regardless of the motor location signal when the switching signal from said switching signal generation means indicates a decelerating mode and the first activation signal from said first activation signal generation means indicates a non-activated state; and
      base current supply means receiving an output signal from said switching control signal generation means, for supplying a base current based on a first switching control signal from said switching control signal generation means, to said first, second, and third power-supply side output transistors and said first, second, and third earth side output transistors when the mode assignment signal indicates an accelerating mode, for outputting a first control signal for deactuating said first, second, and third power-supply side output transistors, for supplying a base current based on a constant electric potential from said switching control signal generation means, to said first, second, and third earth side output transistors when the mode assignment signal indicates a decelerating mode and the selection signal indicates a first mode, for outputting a second control signal for deactuating said first, second, and third power-supply side output transistors, for supplying a base current based on a second switching control signal from said switching control signal generation means, to said first, second, and third earth side output transistors when the mode assignment signal indicates a decelerating mode and the selection signal indicates a second mode.

16. The motor driving circuit according to claim 7, wherein, when the mode assignment signal indicates a decelerating mode, said control signal generation circuit supplies at least one of first and second control signals to base electrodes of said first, second, and third power-supply side output transistors and said first, second, and third earth side output transistors in accordance with a mode of the selection signal, the first control signal deactuating said first, second, and third power-supply side output transistors regardless of the motor location signal, and supplying a base current for generating a torque in the second direction to said first, second, and third earth side output transistors in accordance with the motor location signal, said second control signal supplies a base current for generating a torque in the second direction to said first, second, and third power-supply side output transistors and said first, second, and third earth side output transistors in accordance with the motor location signal.

17. The motor driving circuit according to claim 16, wherein:
the mode assignment signal comprises a motor control signal and a reference voltage, and said control signal generation means comprises:
switching signal generation means receiving the motor control signal and the reference voltage, for outputting a switching signal indicating an accelerating mode or a decelerating mode according to whether the motor control signal is larger than the reference voltage;
switching control signal generation means receiving the switching signal from said switching signal generation means and the motor location signal, for outputting a first switching control signal according to the motor location signal when the switching signal from said switching signal generation means indicates an accelerating mode, and for outputting a second switching control signal switching in an order opposite to a switching order of the first switching control signal according to the motor location signal, when the switching signal from said switching signal generation means indicates a decelerating mode; and
base current supply means receiving an output signal from said switching control signal generation means, for supplying a base current based on a first switching control signal from said switching control signal generation means, to said first, second, and third power-supply side output transistors and said first, second, and third earth side output transistors when the mode assignment signal indicates an accelerating mode, for outputting a first control signal for deactuating said first, second, and third power-supply side output transistors, for supplying a base current based on a second switching control signal from said switching control signal generation means, to said first, second, and third earth side output transistors when the mode assignment signal indicates a decelerating mode and the selection signal indicates a first mode, for outputting a second control signal for supplying a base current based on a second switching control signal from said switching control signal generation means, to said first, second, and third power-supply side output transistors and said first, second, and third earth side output transistors when the mode assignment signal indicates a decelerating mode and the selection signal indicates a second mode.

18. The motor driving circuit according to claim 7, wherein, when the mode assignment signal indicates a decelerating mode, said control signal generation circuit supplies at least one of first and second control signals to base electrodes of said first, second, and third power-supply side output transistors and said first, second, and third earth side output transistors in accordance with a mode of the selection signal, said first control signal deactuates said first, second, and third power-supply side output transistors and said first, second, and third earth side output transistors, regardless of the motor location signal, and said second control signal supplies a base current for generating a torque in the second direction to said first, second, and third power-supply side output transistors and said first, second, and third earth side output transistors in accordance with the motor location signal.

* * * * *